(12) United States Patent
Del Campo

(10) Patent No.: US 11,952,903 B2
(45) Date of Patent: Apr. 9, 2024

(54) MICROTURBINE AND METHOD OF MANUFACTURE

(71) Applicant: Osvaldo Del Campo, Buenos Aires (AR)

(72) Inventor: Osvaldo Del Campo, Buenos Aires (AR)

(73) Assignee: GALILEO TECHNOLOGIES CORP., Arcadia, CA (US)

( * ) Notice: Subject to any disclaimer, the term of this patent is extended or adjusted under 35 U.S.C. 154(b) by 618 days.

(21) Appl. No.: 16/908,726

(22) Filed: Jun. 22, 2020

(65) Prior Publication Data

US 2021/0254491 A1 Aug. 19, 2021

Related U.S. Application Data

(63) Continuation-in-part of application No. 16/190,062, filed on Nov. 13, 2018, now abandoned, which is a continuation-in-part of application No. 14/075,607, filed on Nov. 8, 2013, now abandoned.

(51) Int. Cl.
| | |
|---|---|
| *F02C 7/04* | (2006.01) |
| *F01D 15/10* | (2006.01) |
| *H02K 7/18* | (2006.01) |
| *H02K 11/33* | (2016.01) |

(52) U.S. Cl.
CPC ............... *F01D 15/10* (2013.01); *F02C 7/04* (2013.01); *H02K 7/1823* (2013.01); *H02K 11/33* (2016.01)

(58) Field of Classification Search
CPC .... F02C 1/007; F02C 1/04; F02C 3/20; Y02E 20/14; Y02E 20/30; Y02E 20/36; Y02T 10/16; Y02T 10/163; Y02T 10/166; F01N 5/02; B60Y 2400/204; B60Y 2400/431; B60Y 2400/44

See application file for complete search history.

(56) References Cited

U.S. PATENT DOCUMENTS

| | | |
|---|---|---|
| 6,604,360 B1 | 8/2003 | Vuk |
| 6,938,417 B2 | 9/2005 | Watanabe |
| 6,981,377 B2 | 1/2006 | Vaynberg |
| 9,175,601 B2 | 11/2015 | Markoski |
| 9,181,871 B2 | 11/2015 | Larsson |

(Continued)

*Primary Examiner* — Arun Goyal
(74) *Attorney, Agent, or Firm* — Allen D Hertz, P. A.; Allen D. Hertz

(57) ABSTRACT

A microturbine comprising a turbine. a compressor, and an electric generator operating on a single shaft. The microturbine is designed segmenting the assembly into three subassemblies: a micro turbine engine subassembly, a turbine air sourcing housing subassembly, and a compressor air supply and electronics subassembly. The configuration enables efficient assembly, maintenance and repairs, as the operational components can be diagnosed at a high level and the subassembly can be exchanged quickly to optimize uptime. The micro turbine engine subassembly includes an integrated ceramic compressor and turbine assembly and a generator installed in a single unit that is slideably inserted within an interior of the turbine air sourcing housing subassembly. The compressor air supply and electronics subassembly is assembled to a respective end of the turbine air sourcing housing subassembly. The microturbine creates compressed air, heated air, and electrical power.

18 Claims, 30 Drawing Sheets

(56) References Cited

U.S. PATENT DOCUMENTS

| | | |
|---|---|---|
| 2004/0020206 A1 | 2/2004 | Sullivan |
| 2004/0261285 A1 | 12/2004 | Harada |
| 2006/0066113 A1* | 3/2006 | Ebrahim ............... H02P 9/30 |
| | | 290/52 |
| 2006/0187593 A1 | 8/2006 | Mahawili |
| 2007/0084205 A1 | 4/2007 | Teets et al. |
| 2007/0137215 A1 | 6/2007 | Kishida |
| 2012/0017591 A1 | 1/2012 | Leveson |
| 2013/0056993 A1 | 3/2013 | Newcomb |
| 2014/0005844 A1 | 1/2014 | Newcomb |
| 2014/0353975 A1 | 12/2014 | Newcomb |
| 2015/0128557 A1 | 5/2015 | Del Campo |
| 2016/0195017 A1* | 7/2016 | Vick ..................... F02C 3/14 |
| | | 60/39.511 |
| 2018/0156112 A1* | 6/2018 | Mohseni ............... F02C 7/16 |

* cited by examiner

MICROTURBINE AND METHOD OF MANUFACTURE

CROSS-REFERENCE TO PRIORITY APPLICATION

This application is a Continuation-In-Part which claims priority to:
U.S. Non-Provisional Utility patent application Ser. No. 16/190,062 filed on Nov. 13, 2018;
wherein Non-Provisional Utility patent application Ser. No. 16/190,062 is a Continuation-In-Part claiming priority to U.S. Non-Provisional Utility patent application Ser. No. 14/075,607 filed on Nov. 8, 2013,
wherein the entire contents of each are incorporated herein by reference.

FIELD OF THE INVENTION

The present invention relates generally to energy generating systems. More specifically, the present invention relates to a microscale energy cogeneration system having a design for improved assembly methods, where the microscale energy cogeneration system can be used in a variety of applications, including residential setting to supplement or substitute for a conventional utility electrical supply system and, further, can be used as part of an energy supply network. Even more particularly, the present invention is referred to as a distributed energy cogeneration method with which it is possible to generate electricity and heat water and air. The same module can be adapted for us in an electrically powered vehicle such as an automobile, a drone, and the like, an energy bank, or any other application.

DESCRIPTION OF RELATED ART

Micro Turbine engines are used to drive or rotate an electric power generator. It is desired that these power generating systems maintain maximum uptime. Reliability of these power generating systems is critical, as the applications of the power generating systems demand constant electrical output. When the power generating systems requires servicing or repairs, the down time needs to be minimized. The current Micro Turbine engine designs are complex and tedious to assemble, disassemble, service, repair, and/or reassemble. The complexity further impacts repair processes of the assembly, as the assembly processes and disassembly processes affects the longevity of downtime of the power generating system.

One key element of the Micro Turbine engines is the shaft and the associated blade assemblies. Each Micro Turbine engine includes a compressor blade assembly and a turbine blade assembly assembled to an engine shaft. Each of the blade assemblies is complex and needs to maintain reliability over extreme operating conditions, including temperature, speed (Revolutions per Minute (RPM's)), pressure, and the like. The extreme operating conditions introduce immense stresses and strains on the blades, thus the quality of the blades is critical to maintain the required reliability of the blades during operation.

Cogeneration is a highly efficient means of generating heat and electric power at the same time from the same energy source. Displacing fossil fuel combustion with heat that would normally be wasted in the process of power generation reaches efficiencies that can triple, or even quadruple, conventional power generation. In general, cogeneration systems are adapted to generate both electricity and heat from a single energy source. Such a cogeneration system can recover exhaust gas heat or waste heat of cooling water generated from an engine or turbine during an electricity generation operation, so that the cogeneration system can achieve an increase in energy efficiency of 70 to 80% over other systems.

By virtue of such an advantage, the cogeneration system has recently been highlighted as an electricity and heat supply source for buildings. In particular, the cogeneration system exhibits highly-efficient energy utilization in that the recovered waste heat is mainly used to heat/cool a confined space and to heat water. Although cogeneration has been in use for nearly a century, in the mid-1980s relatively low natural gas prices made it a widely attractive alternative for new power generation. In fact, gas-fired cogeneration is largely responsible for the decline in conventional power plant construction that occurred in North America during the 1980s. Cogeneration accounted for a large proportion of all new power plant capacity built in North America during much of the period in the late 1980s and early 1990s.

Cogeneration equipment can be fired by fuels other than natural gas. There are installations in operation that use wood, agricultural waste, peat moss, and a wide variety of other fuels, depending on local availability.

The environmental implications of cogeneration stem not just from its inherent efficiency, but also from its decentralized character. Because it is impractical to transport heat over any distance, cogeneration equipment must be located physically close to its heat user. A number of environmentally positive consequences flow from this fact: power tends to be generated close to the power consumer, reducing transmission losses, stray current, and the need for distribution equipment significantly. Cogeneration plants tend to be built smaller, and to be owned and operated by smaller and more localized companies than simple cycle power plants. As a general rule, they are also built closer to populated areas, which cause them to be held to higher environmental standards. In northern Europe, and increasingly in North America, cogeneration is at the heart of district heating and cooling systems. District heating combined with cogeneration has the potential to reduce human greenhouse gas emissions by more than any other technology except public transportation.

To understand cogeneration, it is necessary to know that most conventional power generation is based on burning a fuel to produce steam. It is the pressure of the steam which actually turns the turbines and generates power, in an inherently inefficient process. Because of a basic principle of physics, no more than one third of the energy of the original fuel can be converted to the steam pressure which generates electricity. Cogeneration, in contrast, makes use of the excess heat, usually in the form of relatively low-temperature steam exhausted from the power generation turbines. Such steam is suitable for a wide range of heating applications, and effectively displaces the combustion of carbon-based fuels, with all their environmental implications.

Today, existing electric generating technologies include large scale steam turbines producing electricity with a relatively low efficiency rate. The large scale steam turbines often emit undesirable byproducts, such as sulfur oxides, nitrous oxides, ashes, and mercury. Additionally, these large scale steam turbines release a large amount of heat, which is generally released into lakes often disrupting the environment.

More recently, it has been found that smaller scale turbines, such as micro-turbines, fueled by natural gas can operate with greater efficiency. During operation, the micro-turbines do not pollute to the same degree as large scale steam turbines and instead elements such as carbon dioxide and water are emitted, with only very low amounts of nitrogen oxides. Additionally, the heat recovery from operation of the micro-turbines is useful for heating water.

In many parts of the world there is a lack of electrical infrastructure. Installation of transmission and distribution lines to deliver the product to the consumer is very costly, especially in third world countries. Moreover, the electrical infrastructure in many countries is antiquated and overworked, resulting in "brownouts" and "blackouts." Consequently, there is a need for an energy generating system that can produce energy in a standalone system or that can be integrated into existing systems.

Even though there are several cogeneration systems in the market, all of them involve an important investment that makes this technology inaccessible for home owner users or portable applications. Also, it is very costly to escalate these types of systems, as the installation of several turbines together to supply a bigger demand or interconnecting a set of turbines for balancing out the generation of electricity in a determined area is not yet possible.

Assembly, maintenance, and repair costs are excessively high due to the designs of existing electric generating technologies. Currently offered electric generating technologies are complex and expensive to manufacture, maintain, and repair.

Therefore, even though the above cited technologies of the prior art address some of the energy generation needs of the market, a new, improved and economical microscale energy cogeneration system is still desired. It is desired to provide an electric generating technology that is designed for ease of assembly, maintenance and repair. It is also desired to provide an electric generating technology that is scalable.

BRIEF SUMMARY OF THE INVENTION

This invention is directed to a micro turbine assembly that can be used independently of a conventional utility electrical supply system or can be integrated into a conventional electrical supply system to supplement the system or contribute to the energy supply as part of a network.

In one aspect, the micro turbine assembly includes a turbine engine.

In a second aspect, the turbine engine comprises a turbine blade assembly secured to an engine shaft.

In another aspect, the turbine blade assembly comprises a series of ceramic blades.

In another aspect, the turbine blade assembly comprises a series of ceramic blades, wherein the turbine blade assembly is fabricated using a three-dimensional ceramic printing process.

In yet another aspect, the 3D printing process is accomplished by any suitable ceramic 3D printing process. The following is one example of a suitable ceramic 3D printing process:

Certain 3D Printing ceramics can be fueled with a special, ultra-fine alumina silica ceramic powder. To create ceramic prints, an industrial-grade printing technology is used. A 3D ceramic model is built one layer at a time, starting at the bottom. After the printer's rolling mechanism has spread a very thin layer of ceramic powder on a basis, a print head places organic binder at specified locations. This process is repeated until the 3D design is printed completely.

As with 'normal' ceramics, the model now has to be 'baked', so after the model has bathed in ultrafine powder, it is put into a drying oven to strengthen the material. The model will however still be fragile after this process and the state it is in afterwards is called the 'green state'.

Once dry, the excess powder is removed from the model and it is now ready to get fired in an oven to really gain some strength. At this point, a pre-glaze coating is applied, which is dried and then fired another time. The last step involves one more glazing and firing session so that the model gets a smooth and glossy coating in a multitude of possible colors.

In another aspect, the turbine blade assembly comprises a series of metal blades.

In another aspect, the turbine blade assembly comprises a series of metal blades, wherein the turbine blade assembly is fabricated using a three-dimensional metal printing process.

In yet another aspect, the 3D printing process is accomplished by any suitable metal 3D printing process. The following is one example of a suitable metal 3D printing process:

The 3D metal printing process is a multi-layered additive approach, just like other forms of 3D printing and requires the design to be sliced very finely on the horizontal plane before it can start to be built. The 3D metal printer receives instructions from a computer, instructing the Laser what shape to trace out across a vat of metal powder. The Laser then pulses and heats up the powder which subsequently creates a solid form of the object. This is how 3D printing in metal begins.

Once this initial base has been laid out, the 3D metal printing process begins again, adding each layer, which is typically no more than 0.1 mm thick. This very gradual additive process enables metal 3D printers to create a final product, using heat from the Laser to form a solid shape from the powder. This process is known either as Direct Metal Laser Sintering (DMLS) or Selective Laser Melting (SLM), depending on the heat used and whether the powder is melted completely or just heated enough to fuse together.

Additional post processing can be employed to improve the grain structure of the final product.

In another aspect, the turbine blade assembly comprises a series of metallic blades, wherein the turbine blade assembly is fabricated using a three-dimensional printing process.

In yet another aspect, the turbine engine comprises a turbine blade assembly secured to a first portion of the engine shaft.

In yet another aspect, the turbine engine comprises a turbine blade assembly secured to a first end of the engine shaft.

In yet another aspect, the micro turbine assembly includes a compressor.

In yet another aspect, the turbine engine comprises a compressor blade assembly secured to the engine shaft.

In yet another aspect, the turbine engine comprises a compressor blade assembly provided on the engine shaft.

In another aspect, the compressor blade assembly comprises a series of ceramic blades.

In another aspect, the compressor blade assembly comprises a series of ceramic blades, wherein the compressor blade assembly is fabricated using a three-dimensional ceramic printing process.

In another aspect, the compressor blade assembly comprises a series of metal blades.

In another aspect, the compressor blade assembly comprises a series of metal blades, wherein the compressor blade assembly is fabricated using a three-dimensional metal printing process.

In yet another aspect, the turbine engine comprises a compressor blade assembly provided at a second portion of the engine shaft.

In yet another aspect, the turbine engine comprises a compressor blade assembly secured to the second portion of the engine shaft, where a gap is provided between the first portion of the engine shaft and the second portion of the engine shaft.

In yet another aspect, the turbine engine comprises a magnetic rotor secured to a third portion of the engine shaft.

In yet another aspect, the turbine engine comprises a magnetic rotor provided at a third portion of the engine shaft.

In yet another aspect, the turbine engine comprises a magnetic rotor shaft located between the magnetic rotor and the engine shaft.

In yet another aspect, the turbine engine comprises a magnetic rotor provided at the third portion of the engine shaft, where a gap is provided between the second portion of the engine shaft and the third portion of the engine shaft.

In yet another aspect, the second portion of the engine shaft is located between the first portion of the engine shaft and the third portion of the engine shaft.

In yet another aspect, a thrust bearing is integrally formed as a feature of the engine shaft.

In yet another aspect, the thrust bearing is assembled to the engine shaft.

In yet another aspect, the thrust bearing includes a first axial facing surface and a second axial facing surface.

In yet another aspect, the thrust bearing includes a first axial facing surface and a second axial facing surface, wherein at least one of the first axial facing surface and the second axial facing surface is planar, wherein the plane is substantially perpendicular to a rotational axis of the engine shaft.

In yet another aspect, the thrust bearing includes a first axial facing surface and a second axial facing surface, wherein each of the first axial facing surface and the second axial facing surface is planar, wherein the plane is substantially perpendicular to a rotational axis of the engine shaft.

In yet another aspect, a thrust bearing is located at a second end of the engine shaft, wherein the first end of the shaft and the second end of the shaft are opposite one another.

In yet another aspect, the thrust bearing is secured to a fourth portion of the engine shaft.

In yet another aspect, the thrust bearing is provided at the fourth portion of the engine shaft, where a gap is provided between the third portion of the engine shaft and the fourth portion of the engine shaft.

In yet another aspect, the third portion of the engine shaft is located between the second portion of the engine shaft and the fourth portion of the engine shaft.

In yet another aspect, the turbine blade assembly is assembled to the engine shaft by heating the turbine blade assembly and/or cooling the engine shaft, sliding the turbine blade assembly onto the engine shaft, and then cooling the entire assembly.

In yet another aspect, the compressor blade assembly is assembled to the engine shaft by heating the compressor blade assembly and/or cooling the engine shaft, sliding the compressor blade assembly onto the engine shaft, and then cooling the entire assembly.

In yet another aspect, the engine shaft further comprises a central bore extending centrally along a rotational axis of the engine shaft. The turbine blade assembly includes a frustum shaped surface concentric about a rotational axis of the turbine blade assembly, where the frustum or tapered shaped surface is contiguous with a central bore extending through the turbine blade assembly. The shaft includes a frustum or tapered surface having an angle or shape that is substantially the same as the frustum or tapered shaped surface of the turbine blade assembly. The frustum or tapered shaped surface of the turbine blade assembly is slideably assembled onto the frustum or tapered shaped surface of the engine shaft. An end cap can be employed to retain the turbine blade assembly on the engine shaft. The end cap applies a retention force, retaining the frustum or tapered shaped surface of the turbine blade assembly and the frustum or tapered shaped surface of the engine shaft against one another. The end cap can be assembled to an adjoining rod inserted into a bore formed in the engine shaft or onto a distal end of the engine shaft. When included, the adjoining rod can be secured within the bore of the engine shaft by an assembly locking bolt.

In yet another aspect, the adjoining rod can be formed to include a recession formed along an elongated central portion of the circumference of the adjoining rod. An insertion end is formed having a peripheral shape that slideably engages with the surface defining the bore formed in the engine shaft. A turbine end is formed having a peripheral shape that slideably engages with the surface defining the bore formed through the turbine blade assembly. The recession extends between the peripheral shape of the insertion end and the peripheral shape of the turbine end.

In yet another aspect, the adjoining rod includes a through bore, wherein the assembly locking bolt is inserted through the through bore of the adjoining rod.

In yet another aspect, the turbine blade assembly includes a plurality of blades, wherein at least one blade of the plurality of blades includes an internal ray port passing therethrough.

In yet another aspect, the turbine blade assembly includes a plurality of blades, wherein each of two or more blades of the plurality of blades includes an internal ray port passing therethrough.

In yet another aspect, the turbine blade assembly includes a plurality of blades, wherein each of the blades of the plurality of blades includes an internal ray port passing therethrough.

In yet another aspect, the internal ray port passing through a respective blade of a plurality of blades of a turbine blade assembly has an inlet opening proximate an end having a wider diameter of the blade assembly and an outlet opening proximate an end having a narrower diameter of the blade assembly, wherein a size of the inlet opening is larger compared to a size of the outlet opening.

In yet another aspect, the internal ray port passing through a respective blade of a plurality of blades of a turbine blade assembly has an inlet opening proximate an end having a wider diameter of the blade assembly and an outlet opening proximate an end having a narrower diameter of the blade assembly, wherein the cross sectional size of the internal ray port gradually decreases as the internal ray port extends from the inlet opening to the outlet opening.

In yet another aspect, the internal ray port passing through a respective blade of a plurality of blades of a turbine blade assembly has an inlet opening proximate an end having a wider diameter of the blade assembly and an outlet opening proximate an end having a narrower diameter of the blade assembly, wherein a center of the inlet opening is located radially outward of a center of the outlet opening.

In yet another aspect, the micro turbine assembly includes three distinct subassemblies.

In view of an assembly arrangement, the micro turbine assembly includes three distinct subassemblies, which includes: a micro turbine engine subassembly, a micro turbine air sourcing housing subassembly, and a compressor air supply and electronics subassembly.

In a second aspect, the micro turbine engine subassembly includes the engine shaft assembly, a compressor shroud, and a magnetic winding stator.

In another aspect, the micro turbine engine subassembly includes the engine shaft assembly, the compressor shroud, the magnetic winding stator, and an engine housing.

In yet another aspect, the micro turbine engine subassembly includes the engine shaft assembly, a combustion chamber, a turbine spacer, the compressor shroud, and the magnetic winding stator.

In yet another aspect, the micro turbine engine subassembly includes the engine shaft assembly, the combustion chamber, the turbine spacer, the compressor shroud, the magnetic winding stator, and the engine housing.

In yet another aspect, the micro turbine engine subassembly includes the engine shaft assembly, the combustion chamber, the turbine spacer, the compressor shroud, a first thrust bearing backing plate, a second thrust bearing backing plate, and the magnetic winding stator.

In yet another aspect, the micro turbine engine subassembly includes the engine shaft assembly, the combustion chamber, the turbine spacer, the compressor shroud, the first thrust bearing backing plate, the second thrust bearing backing plate, the magnetic winding stator, and the engine housing.

In yet another aspect, the micro turbine engine subassembly includes the engine shaft assembly, the combustion chamber, the turbine spacer, the compressor shroud, the first thrust bearing backing plate, the second thrust bearing backing plate, the magnetic winding stator, a motor stator spacer, and the heat sink body.

In yet another aspect, the micro turbine engine subassembly includes the engine shaft assembly, the combustion chamber, the turbine spacer, the compressor shroud, the first thrust bearing backing plate, the second thrust bearing backing plate, the magnetic winding stator, the motor stator spacer, the heat sink body, and the engine housing.

In yet another aspect, the micro turbine air sourcing housing subassembly includes a compressor exhaust scroll and an engine housing.

In yet another aspect, the micro turbine air sourcing housing subassembly includes a turbine air intake scroll, the compressor exhaust scroll, and the engine housing.

In yet another aspect, the micro turbine air sourcing housing subassembly includes the compressor exhaust scroll, a radial turbine shroud, and the engine housing.

In yet another aspect, the micro turbine air sourcing housing subassembly includes the turbine air intake scroll, the compressor exhaust scroll, the radial turbine shroud, and the engine housing.

In yet another aspect, the compressor air supply and electronics subassembly includes a compressor air supply housing.

In yet another aspect, the compressor air supply and electronics subassembly includes a compressor air supply housing assembly interface member affixed to the compressor air supply housing at an assembly end of the compressor air supply and electronics subassembly. A compressor air supply housing assembly airflow passageway is formed through the compressor air supply housing assembly interface member.

In yet another aspect, the compressor air supply and electronics subassembly includes a planar transformer and the compressor air supply housing.

In yet another aspect, the compressor air supply and electronics subassembly includes a multilevel inverter, the planar transformer and the compressor air supply housing.

In yet another aspect, the compressor air supply and electronics subassembly includes the multilevel inverter, power output cables, the planar transformer and the compressor air supply housing.

In yet another aspect, the compressor air supply and electronics subassembly includes a digital signal processor, the multilevel inverter, power output cables, the planar transformer and the compressor air supply housing.

In yet another aspect, the micro turbine assembly is assembled by inserting the micro turbine engine subassembly into the micro turbine air sourcing housing subassembly, and assembling the compressor air supply and electronics subassembly to the micro turbine air sourcing housing subassembly.

In yet another aspect, the micro turbine assembly is assembled by inserting the micro turbine engine subassembly into the micro turbine air sourcing housing subassembly at an assembly end of the micro turbine air sourcing housing subassembly towards a radial turbine shroud of the micro turbine air sourcing housing subassembly, and assembling the compressor air supply and electronics subassembly to the assembly end of the micro turbine air sourcing housing subassembly.

In yet another aspect, the micro turbine assembly is assembled by assembling the compressor air supply housing assembly interface member of the compressor air supply and electronics subassembly to the assembly end of the engine housing of the micro turbine air sourcing housing subassembly.

In yet another aspect, multiple micro turbine assemblies can be networked with one another forming a matrix to collectively supplying a single electrical output.

In yet another aspect, multiple micro turbine assemblies can be networked with one another forming a matrix to collectively supplying a single electrical output by inserting multiple micro turbine assemblies into an enclosure having multiple micro turbine assembly receptacles.

In yet another aspect, the enclosure having multiple micro turbine assembly receptacles further comprising a fuel supply manifold, wherein the fuel supply manifold is configured to transfer fuel from a fuel source to each micro turbine assembly receptacle of the multiple micro turbine assembly receptacles.

In yet another aspect, the fuel supply manifold includes a fuel supply coupler or connector at a distal end of the fuel supply manifold and a fuel delivery port located within each micro turbine assembly receptacle of the multiple micro turbine assembly receptacles.

In yet another aspect, the enclosure having multiple micro turbine assembly receptacles further comprising an exhaust collection manifold, wherein the exhaust collection manifold is configured to transfer exhaust from each micro turbine assembly receptacle of the multiple micro turbine assembly receptacles to an exhaust vent.

In yet another aspect, the exhaust collection manifold includes an exhaust discharge coupler or connector at a distal end of the exhaust collection manifold and an exhaust receiving port located within each micro turbine assembly receptacle of the multiple micro turbine assembly receptacles.

In yet another aspect, the enclosure having multiple micro turbine assembly receptacles further comprising an electrical power collection harness, wherein the electrical power collection harness is configured to transfer electric power generated by each micro turbine assembly located within each respective micro turbine assembly receptacle of the multiple micro turbine assembly receptacles to a series of system electrical output terminals for connectivity to an electrically powered device.

In yet another aspect, the exhaust collection manifold includes an exhaust discharge coupler or connector at a distal end of the exhaust collection manifold and an exhaust receiving port located within each micro turbine assembly receptacle of the multiple micro turbine assembly receptacles.

In yet another aspect, the electric power generating bank can be integrated into a vehicle.

In yet another aspect, the electric power generating bank can be integrated into a land vehicle.

In yet another aspect, the electric power generating bank can be integrated into a land vehicle, wherein the land vehicle is an automobile, a race car, a truck, a motorcycle, a bicycle, a golf cart, a go-cart, a tractor, a farming vehicle, a construction vehicle, a front loader, a military vehicle, a crane, and the like.

In yet another aspect, the electric power generating bank comprising one or more micro turbine assembly receptacles can be integrated into lawn equipment, including a lawn mower, a leaf blower, an edger, a line trimmer, and the like; other low horsepower driven equipment including: a pressure washer, outdoor lighting, and the like.

This invention is directed to a microscale energy cogeneration system that can be used independently of a conventional utility electrical supply system or can be integrated into a conventional electrical supply system to supplement the system or contribute to the energy supply as part of a network.

In another form of the present invention, a microscale energy cogeneration method includes steps of converting the energy produced by the combustion chamber into mechanical energy and converting the mechanical energy produced by the turbine into electrical energy.

An important aspect of the present invention is a microscale energy cogeneration system designed to produce between 1 to 5 kWh, more particularly 1 to 3 kWh, and more specifically 3 kWh using a portable and modular unit.

It is an object of the present invention to provide a microscale energy cogeneration system that is capable of heating tap water and heating air at the same time with high efficiency.

In another aspect of the invention, the generator may be an electric generator producing alternating electric current during the operation of the microscale energy cogeneration system. The fuel for the microscale energy cogeneration system may be natural gas, diesel, gasoline, and liquefied petroleum gas (LPG), among others.

According to another aspect of the invention, the microscale energy cogeneration system further includes an exhaust passage downstream from the micro/nano-turbine delivering high temperature exhaust air from the micro/nano-turbine and a heat exchanger receiving the high temperature exhaust air for heat transfer. A water heating system for converting tap water into hot water may be coupled to a heat exchange exhaust for releasing lower temperature exhaust air. The system is modular and portable and is able to generate electricity, hot water and hot air at the same time with efficiency higher than 85%.

In yet another aspect of the invention, the microscale energy cogeneration system may include another heat exchanger for coupling the present system to the heating system of a house.

In yet another aspect of the invention, the microscale energy cogeneration system may be scaled up to form a set of interconnected micro/nano-turbines that can be used to provide the same user with more energy or to balance out the energy demand of a group of houses in a residential area.

In another aspect of the invention, the microscale energy cogeneration system may be portable or may be compatible for integration with a plurality of energy systems to provide the electrical distribution system with power and further may be configured for integration into a heating system, a cooling system and/or a water heating system.

Another aspect of the present invention provides a microscale energy cogeneration system that creates an energy source that produces efficient and clean electric energy, produces heat for heating, produces hot water, does not create pollution or vibrations, and does not need any maintenance over the years.

Also another aspect of this invention comprises a microscale energy cogeneration system that is smart, modular and portable, which can be managed remotely through Internet.

Also another aspect of this invention comprises a microscale energy cogeneration system that has a 3 kWh, 110/220 V AC, 12/24 VDC output, using different fuels including natural gas, diesel, gasoline and LPG.

Also another aspect of this invention consists of a microscale energy cogeneration system that generates electricity, 700 liters of hot water per hour, and hot air for heating a building.

In summary, the present invention is related to a microscale energy cogeneration method comprising the steps of:

(a) at least a micro/nano-turbine set for converting fuel into mechanical energy, and a generator for converting mechanical energy produced by the micro/nano-turbine into electrical energy in the range of 1 to 5 kWh; further comprising an exhaust passage downstream from the micro/nano-turbine delivering high temperature exhaust air from the micro/nano-turbine; and (b) at least one heat exchanger receiving high temperature exhaust air from the exhaust passage for heat transfer; the heat exchanger may be used to heat water and/or air of a house; a water heating system may be coupled to the heat exchanger for converting tap water into hot water and/or cool heating air into hot air. The portable micro/nano-turbine set may be scaled up by interconnecting several units at the same time and/or interconnecting different units of different users for balancing out the energy demand of those users.

Also, the present invention is related to a microscale energy cogeneration system comprising at least a micro/nano-turbine set and a generator set; an exhaust passage downstream from the micro/nano-turbine delivers high temperature exhaust air from the micro/nano-turbine; and at least one heat exchanger receiving high temperature exhaust air from the exhaust passage for heat transfer.

Also the present invention is related to a microscale distributed energy cogeneration method comprising the steps of:

(a) Connecting a fuel provider to a micro/nano-turbine, (b) Connecting the micro/nano-turbine to a micro electric generator;

(c) Connecting the micro electric generator to the electrical grid of a facility.

(d) Connecting a heat exchanger apparatus to an exhaust passage downstream from the micro/nano-turbine, and (e) Connecting the heating system of the house to the heat exchanger apparatus.

These and other aspects, features, and advantages of the present invention will become more readily apparent from the attached drawings and the detailed description of the preferred embodiments, which follow.

BRIEF DESCRIPTION OF THE SEVERAL VIEWS OF THE DRAWINGS

The preferred embodiments of the invention will hereinafter be described in conjunction with the appended drawings provided to illustrate and not to limit the invention, where like designations denote like elements, and in which:

FIG. 25 presents an isometric view of the water processing system, originally introduced in FIG. 23, the illustration introducing functional components of the water processing system;

DETAILED DESCRIPTION OF THE INVENTION

Figure 1:
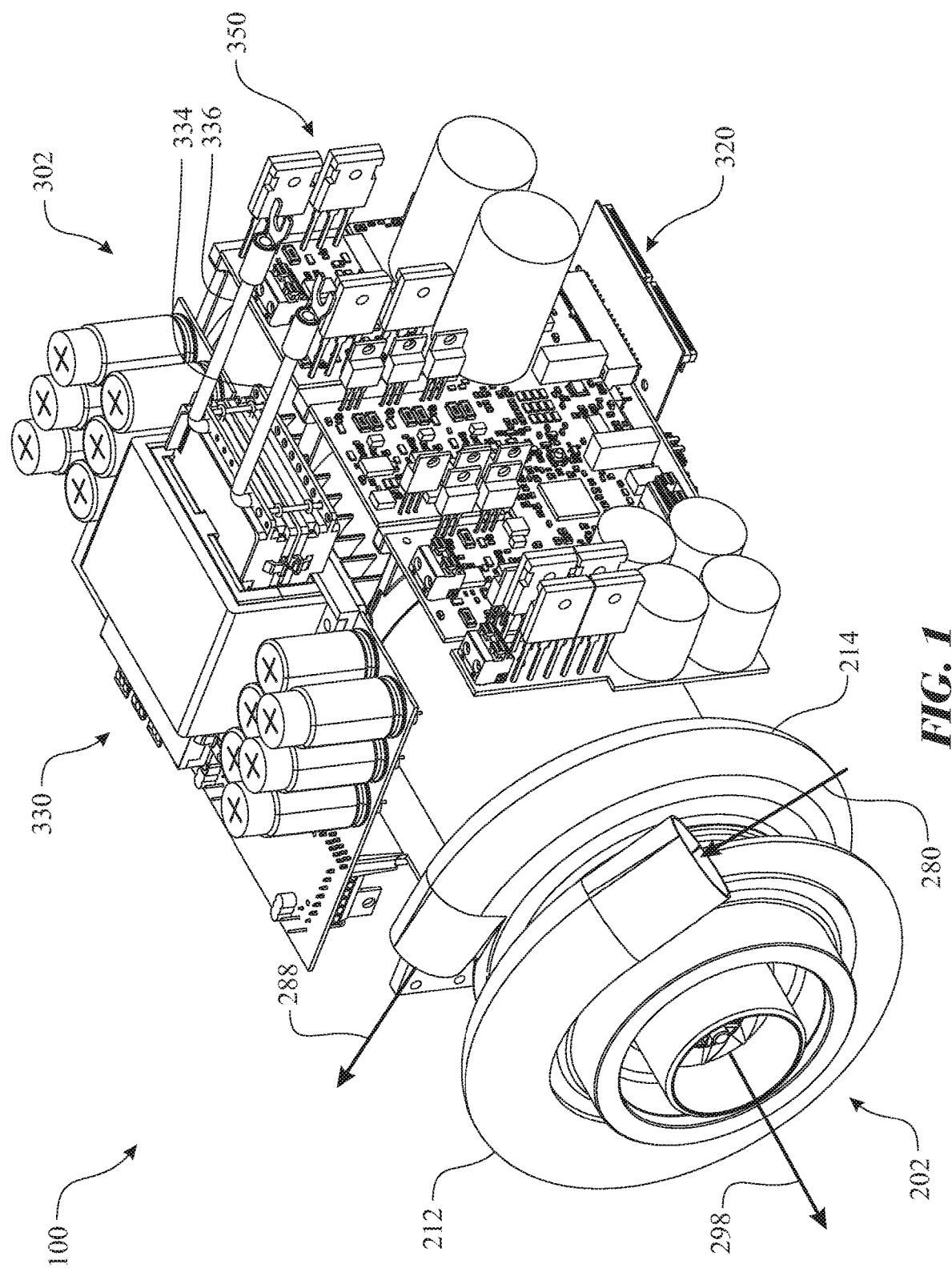
FIG. 1 presents a front, first side isometric view of an exemplary micro/nano-turbine driven energy generating system in accordance with the present invention.

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Furthermore, there is no intention to be bound by any expressed or implied theory presented in the preceding technical field, background, brief summary or the following detailed description. It is also to be understood that the specific devices illustrated in the attached drawings, and described in the following specification, are simply exemplary embodiments of the inventive concepts defined in the appended claim. Hence, specific dimensions and other physical characteristics relating to the embodiments disclosed herein are not to be considered as limiting, unless the claims expressly state otherwise.

Figure 2:
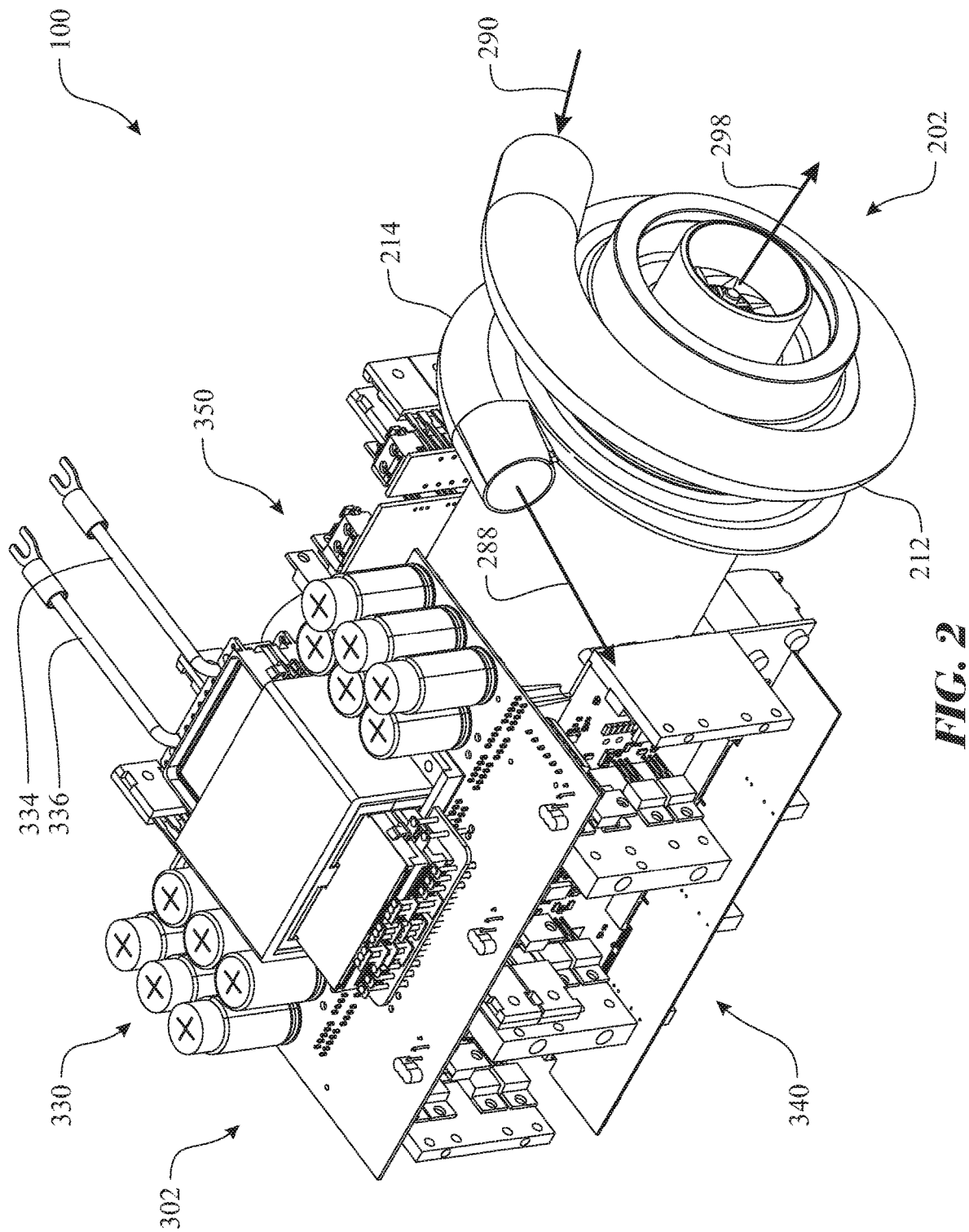
FIG. 2 presents a front, first side isometric view of the exemplary micro/nano-turbine driven energy generating system, originally introduced in FIG. 1.
Figure 3:
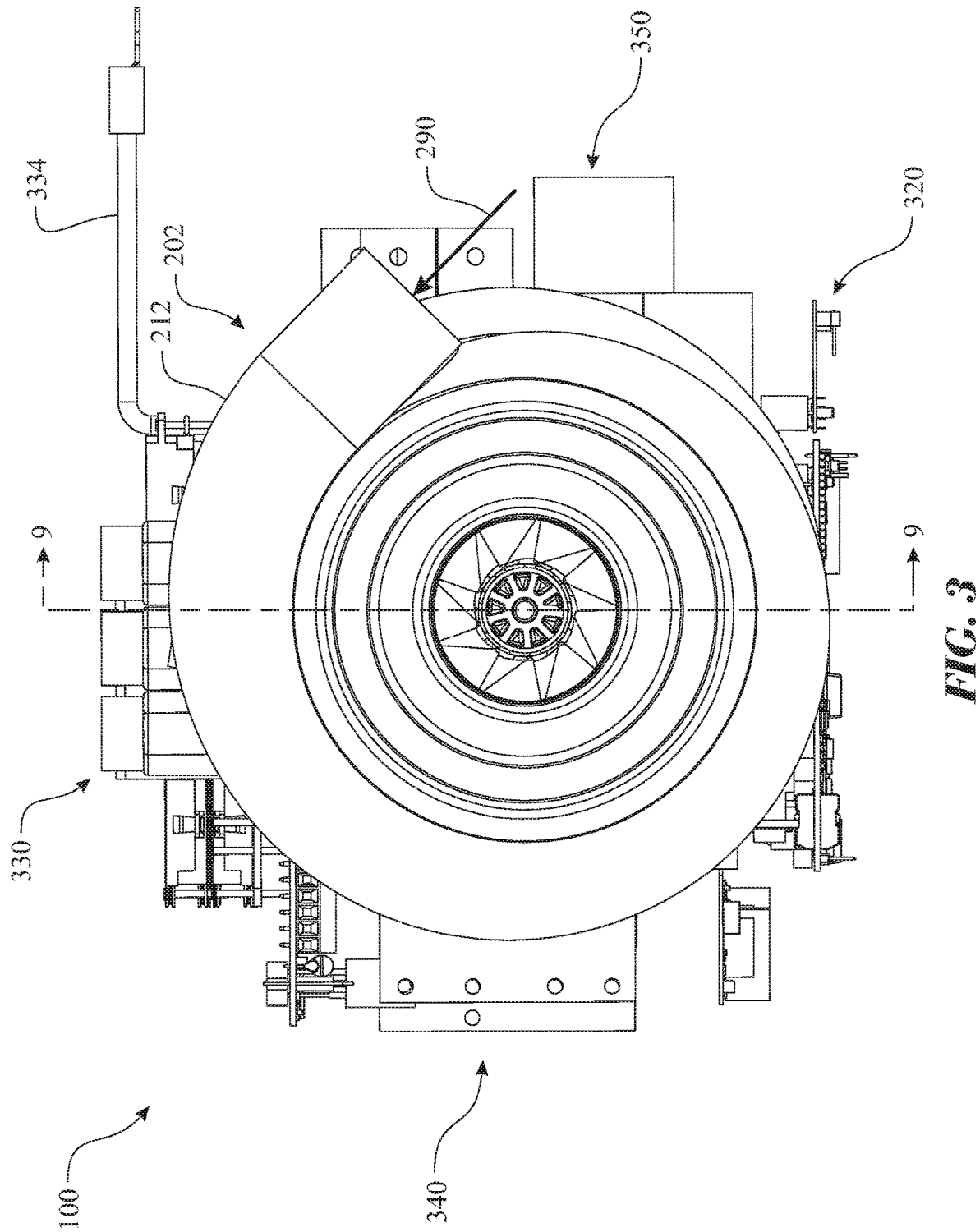
FIG. 3 presents a front elevation view of the exemplary micro/nano-turbine driven energy generating system, originally introduced in FIG. 1.

The present invention can be referred to as a micro turbine assembly 100, as illustrated in FIGS. 1 through 16. Details of the micro turbine assembly 100 are presented in a first isometric view of the micro turbine assembly 100 illustrated in FIG. 1, a second isometric view of the micro turbine assembly 100 illustrated in FIG. 2, and a front view of the micro turbine assembly 100 illustrated in FIG. 3. Exploded assembly views and cross section views providing additional details are presented in FIGS. 4 through 10.

Figure 4:
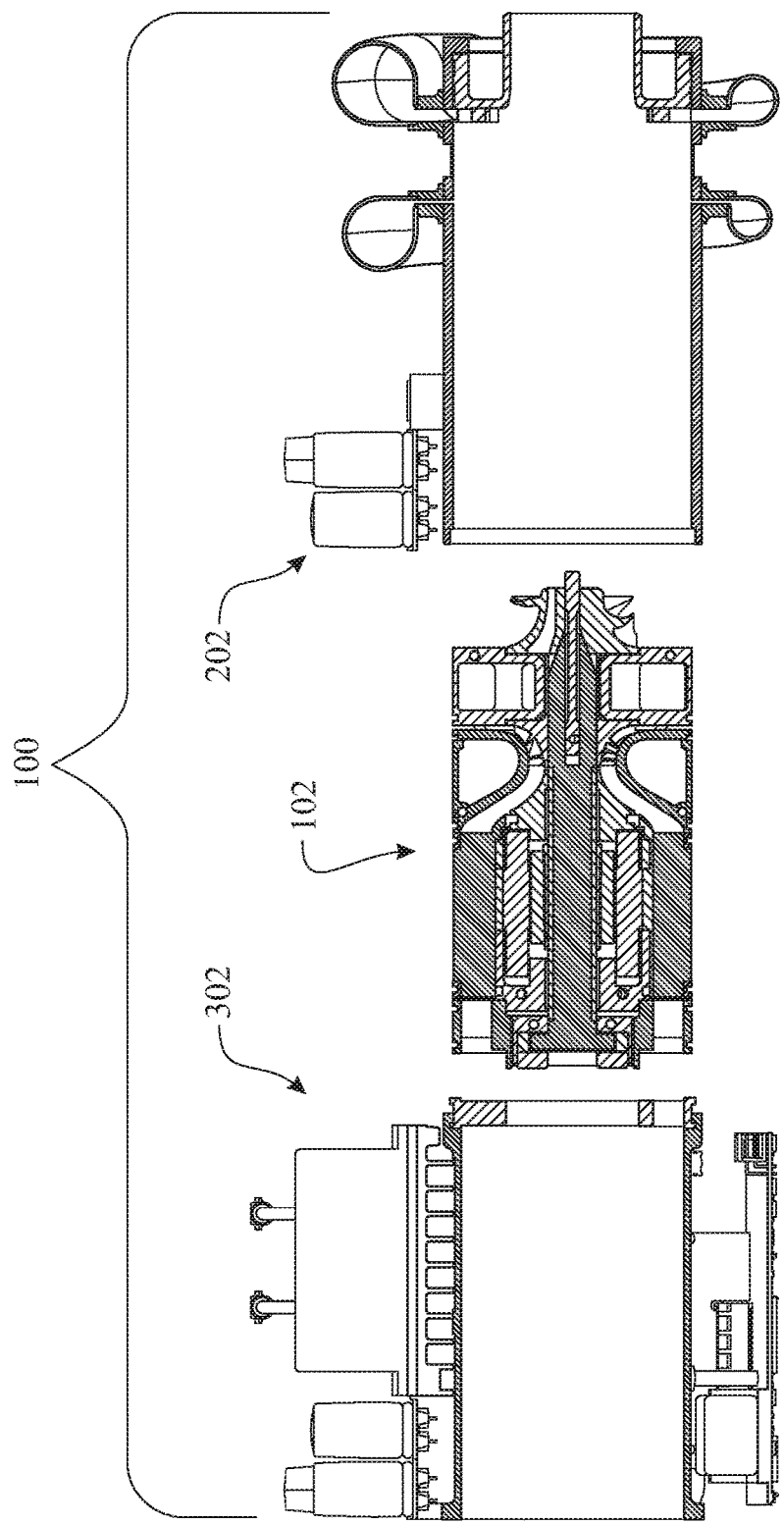
FIG. 4 presents a sectioned exploded assembly side elevation view of the exemplary micro/nano-turbine driven energy generating system, originally introduced in FIG. 1, the illustration presenting three distinct subassemblies.

The exemplary micro turbine assembly 100 includes elements designed to optimize a process of assembling the micro turbine assembly 100, maintaining the micro turbine assembly 100, and repairing the micro turbine assembly 100. This is accomplished by designing the micro turbine assembly 100 to include three (3) subassemblies: a micro turbine engine subassembly 102, a micro turbine air sourcing housing subassembly 202, and a compressor air supply and electronics subassembly 302, as best illustrated in FIG. 4. This assembly design configuration enables the quick assembly and quick disassembly, for manufacturing, maintenance, and repairs, where the primary functional components are provided as a single subassembly, or the micro turbine engine subassembly 102. The micro turbine engine subassembly 102 can be removed and replaced with a different subassembly, enabling maximum uptime, while separately servicing the removed micro turbine engine subassembly 102 without interruption of operation of the micro turbine assembly 100. This is accomplished by including the majority of the functional and wear components within a cartridge or single subassembly that is slideably inserted into the micro turbine air sourcing housing subassembly 202.

Figure 9:
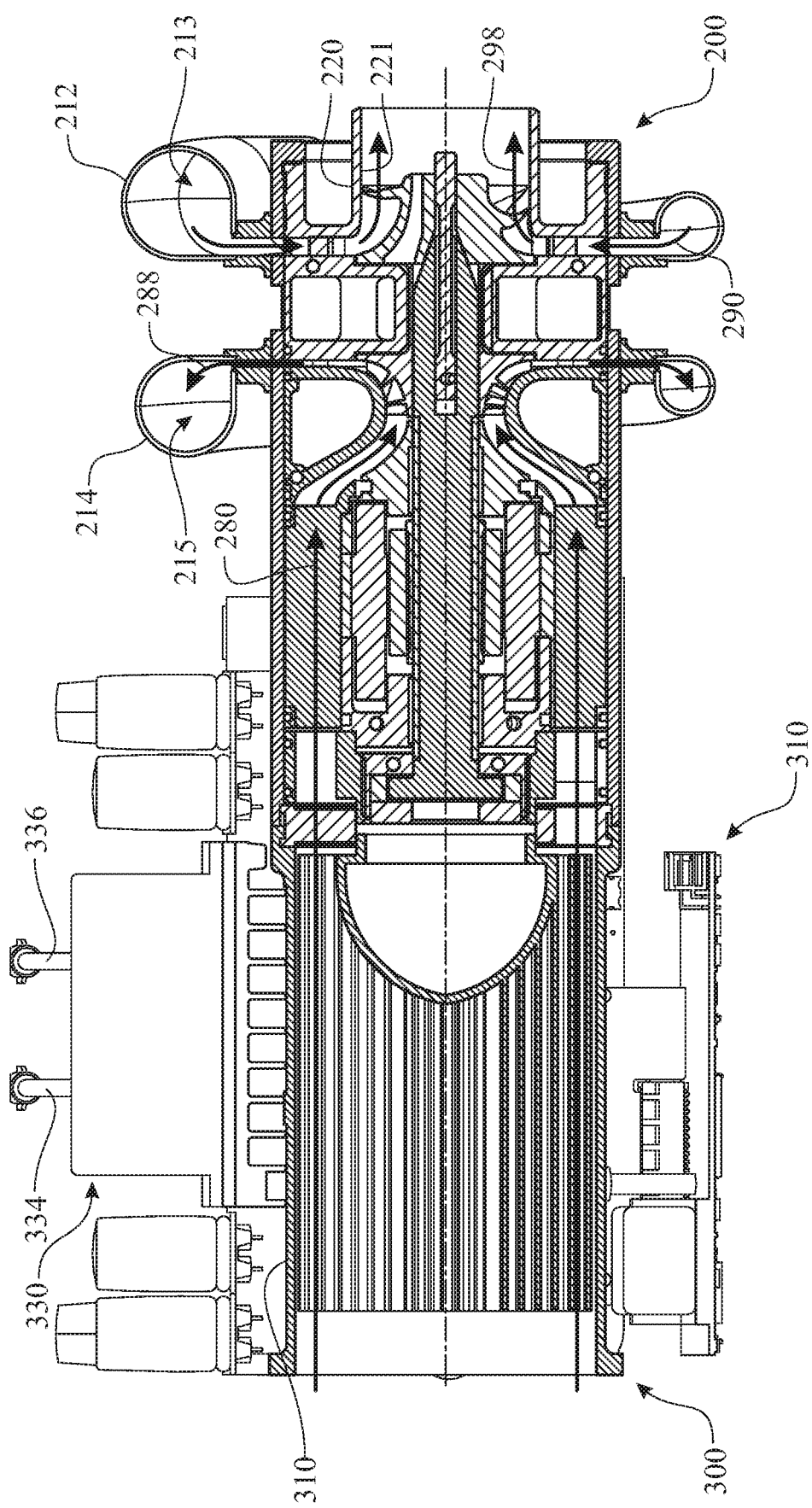
FIG. 9 presents a sectioned assembly side elevation view of the exemplary micro/nano-turbine driven energy generating system, originally introduced in FIG. 1, the illustration excluding sectioning of the electronic components.
Figure 10:
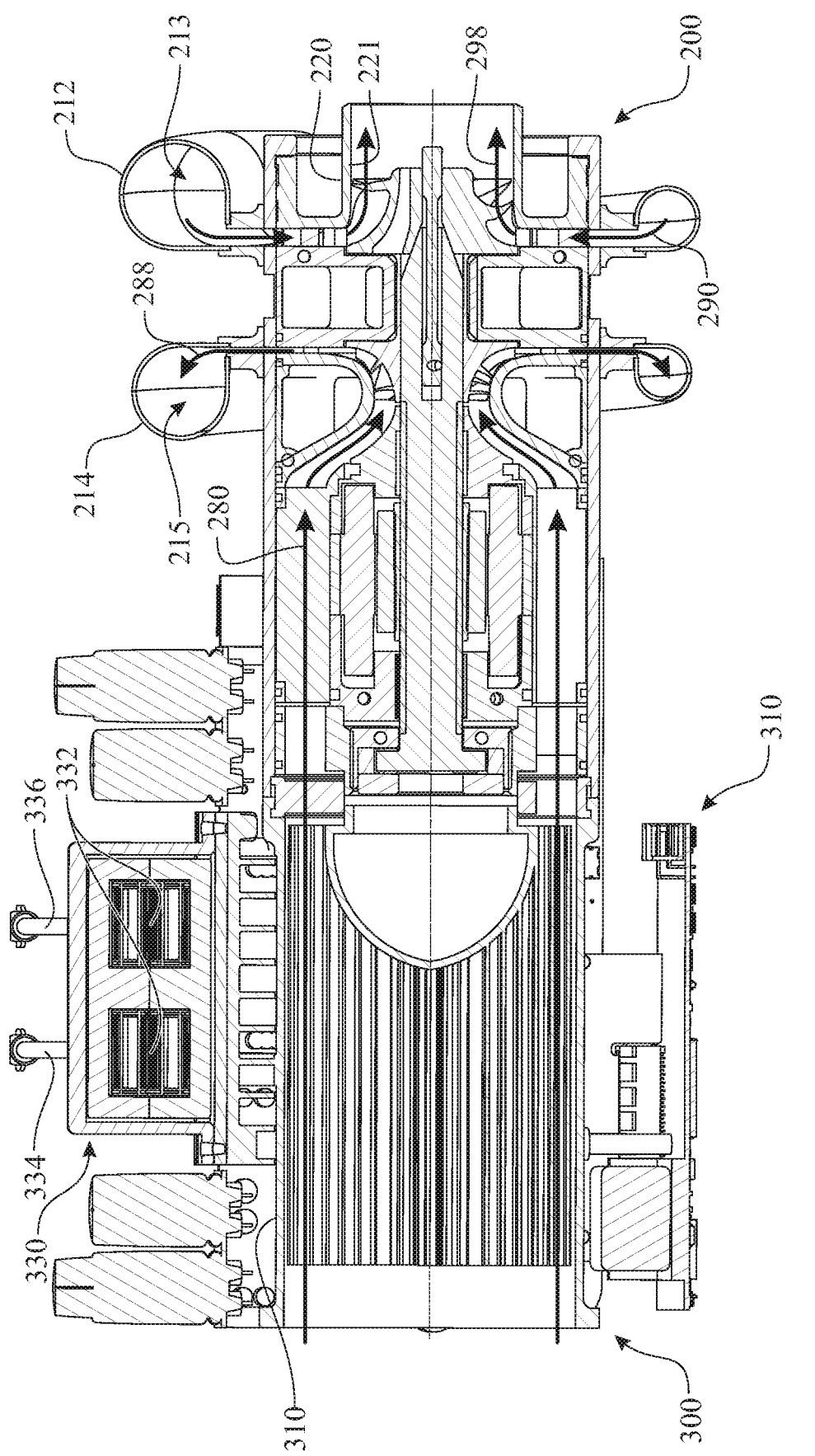
FIG. 10 presents a sectioned assembly side elevation view of the exemplary micro/nano-turbine driven energy generating system, originally introduced in FIG. 1, the illustration including sectioning of the electronic components.

The design of the micro turbine engine subassembly 102 is such to align mating features of the micro turbine air sourcing housing subassembly 202. For example, a compressor air supply passageway 126 (defined by a compressor shroud 120 and a compressor side case foil 122) of the micro turbine engine subassembly 102 aligned with and provides an airtight seal with a compressor exhaust scroll interior surface 215 defined by a compressor exhaust scroll 214 of the micro turbine air sourcing housing subassembly 202, as shown in FIGS. 9 and 10. A series of micro turbine engine subassembly seals 182 can be seated in grooves of elements that seal against the engine housing interior surface 211. Elements in the exemplary illustrations that seal against the engine housing interior surface 211 include the turbine spacer 110, the compressor shroud 120, the heat sink body 160, and the thrust foil system holder 146. The micro turbine engine subassembly seal 182 can be in any suitable form and of any suitable material. One exemplary micro turbine engine subassembly seal 182 is an O-ring fabricated of a material capable of withstanding high temperatures. Similarly, a ceramic turbine 420 is positioned to align with the radial turbine shroud 220 of the micro turbine air sourcing housing subassembly 202.

The micro turbine engine subassembly 102 integrates several distinct functional elements into a single subassembly. The primary components include an integrated ceramic compressor and turbine assembly 400, comprising a ceramic turbine 420 and a metallic compressor 430 each secured to and rotating concurrently with a ceramic turbine and compressor shaft 410; an electric power generator comprising at least one magnetic winding stator 150 and at least one magnetic rotor 450 in radial registration with one another; a compressor air supply passageway 126 defined by a compressor shroud 120 and a compressor side case foil 122, and an axial shaft retention arrangement, where a spacer thrust bearing ceramic integrated shaft 440 of the ceramic turbine and compressor shaft 410 is axially retained by a thrust foil bearing 140. The micro turbine engine subassembly 102 can additionally include slide bearings or roller bearings located between an outer surface of the ceramic turbine and compressor shaft 410 and a stationary element within the micro turbine engine subassembly 102. The ceramic turbine and compressor shaft 410 is preferably fabricated of a ceramic material. The use of the ceramic material for the ceramic turbine and compressor shaft 410 provides the rigidity and low weight necessary for the micro turbine assembly 100 to work at high rotational speeds. In addition, the ceramic material for the ceramic turbine and compressor shaft 410 minimizes internal heat transfer.

In more detail, the axial shaft retention arrangement employs a thrust foil bearing 140 encased between a first back plate thrust bearing 142 and a second backing plate thrust bearing 144. Each of the first back plate thrust bearing 142 and the second backing plate thrust bearing 144 extends radially inward of an interior surface of the thrust foil bearing 140, wherein a surface of the first back plate thrust bearing 142 contacting a ceramic spacer thrust bearing first axial facing surface 442 (FIGS. 11-13) of the spacer thrust bearing ceramic integrated shaft 440 retains the integrated ceramic compressor and turbine assembly 400 in a first axial direction and a surface of the second backing plate thrust bearing 144 contacting a ceramic spacer thrust bearing second axial facing surface 444 (FIGS. 11-13) of the spacer thrust bearing ceramic integrated shaft 440 retains the integrated ceramic compressor and turbine assembly 400 in a second axial direction, wherein the first axial direction and the second axial direction are opposite one another.

Figure 11:
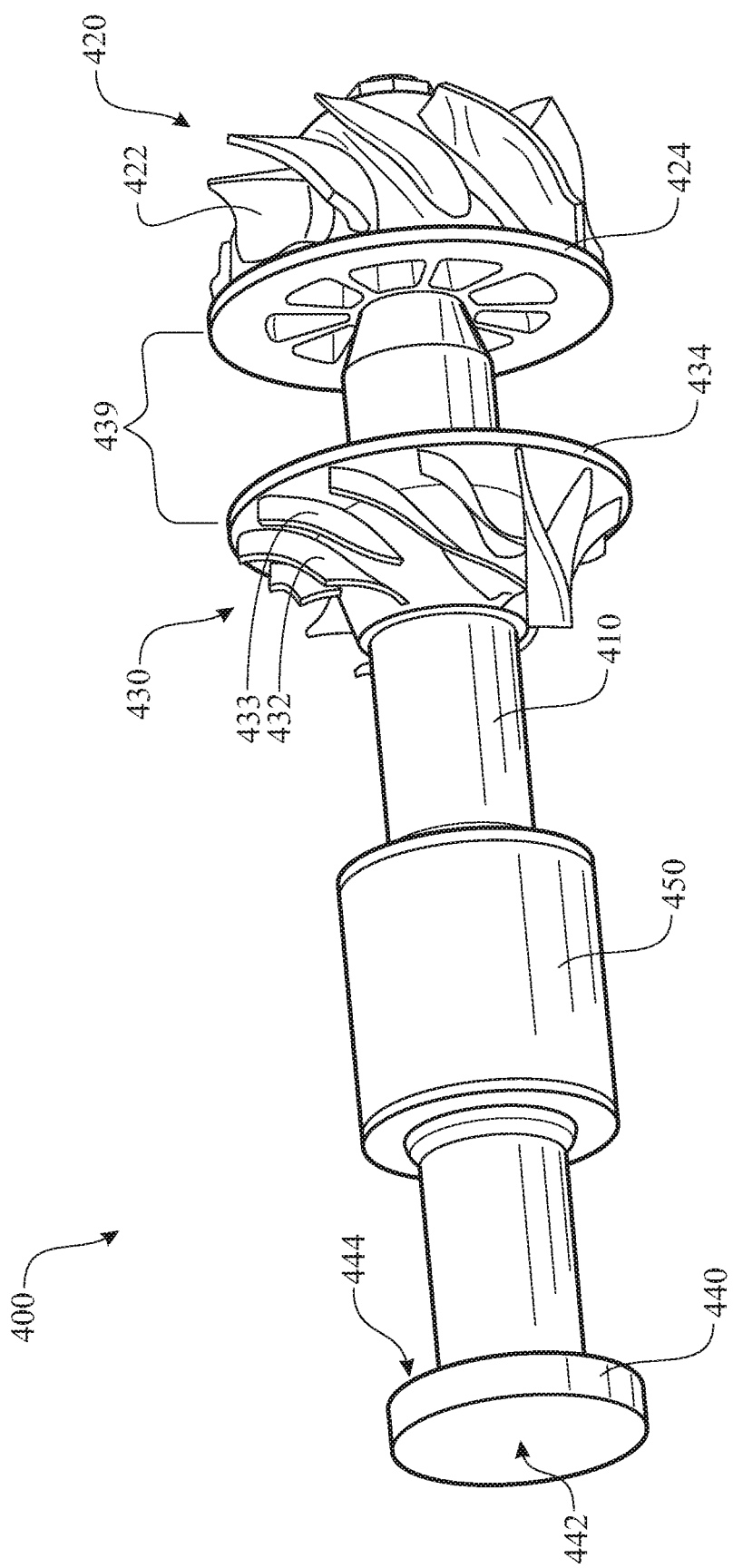
FIG. 11 presents a side, rear isometric view of a first exemplary engine shaft assembly, wherein the first exemplary engine shaft assembly includes ceramic components.
Figure 12:
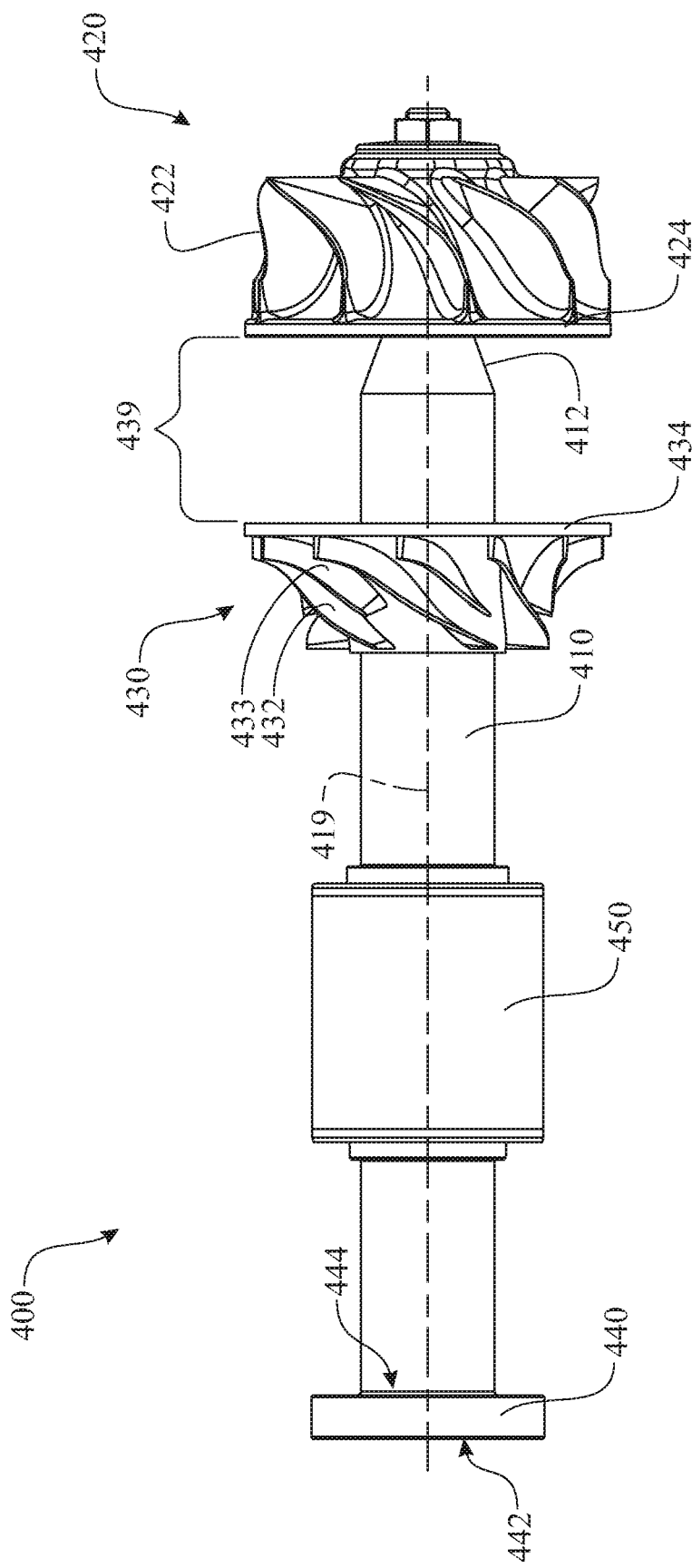
FIG. 12 presents a side elevation view of the first exemplary engine shaft assembly, originally introduced in FIG. 11.
Figure 13:
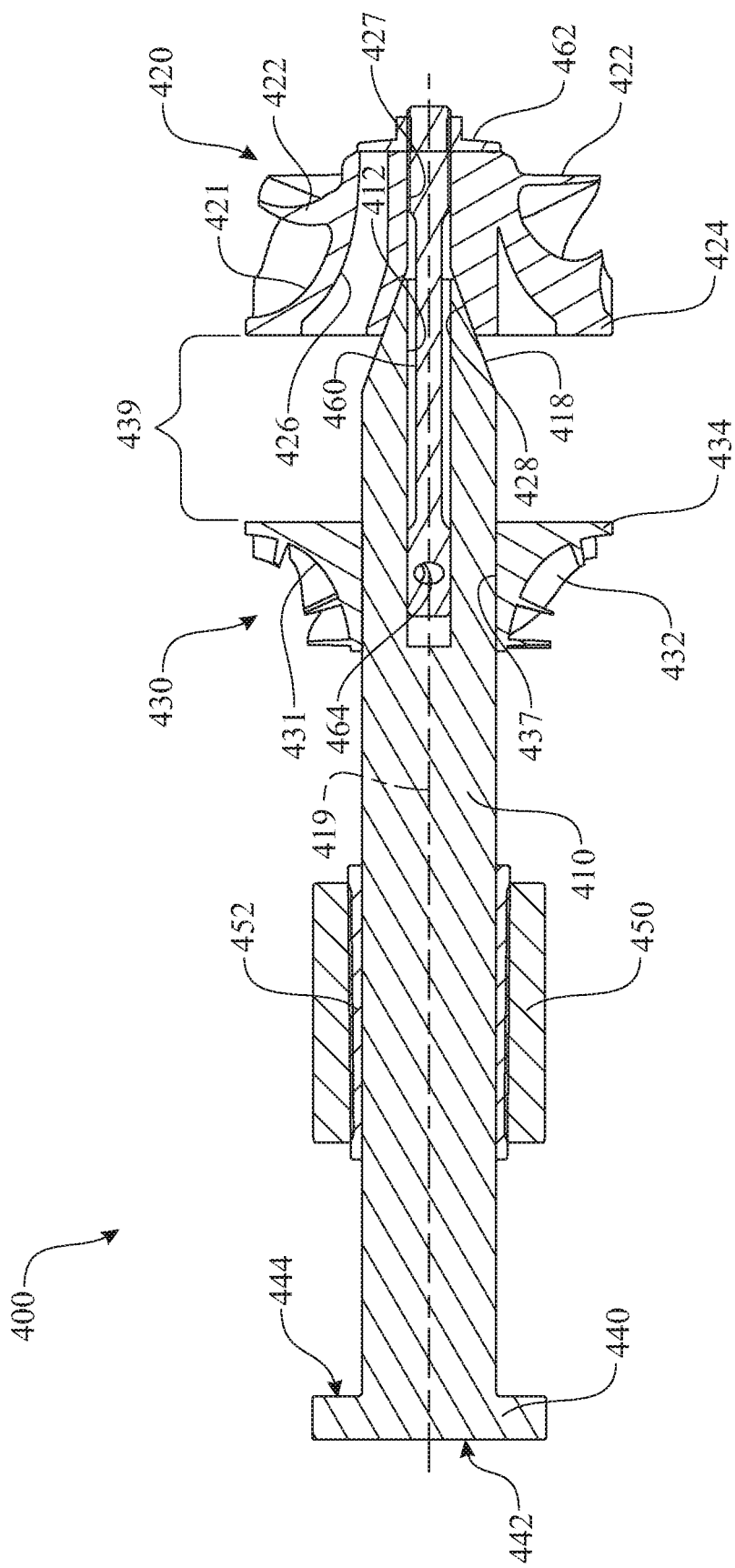
FIG. 13 presents a sectioned side elevation view of the first exemplary engine shaft assembly, originally introduced in FIG. 11.

The integrated ceramic compressor and turbine assembly 400 is detailed in FIGS. 11 through 13. The integrated ceramic compressor and turbine assembly 400 includes the ceramic turbine 420 and the metallic compressor 430 assembled to the ceramic turbine and compressor shaft 410 with a turbine and compressor blade assemblies axial gap 439 extending between facing surfaces of the ceramic turbine 420 and the metallic compressor 430. The ceramic turbine 420 includes an axial base ceramic turbine base 421. The ceramic turbine base 421 extends axially circumscribing the ceramic turbine and compressor shaft 410. A bore 427, comprising a turbine blade assembly conical bore 428 at an installation end, is formed extending through the ceramic turbine base 421 in an axial direction, as illustrated in FIG. 13. The ceramic turbine base 421 is formed having a concave, arched exterior surface, wherein a first axial end of the concave arched exterior surface is located proximate the ceramic turbine blade assembly gap 424 and a second axial end of the concave arched exterior surface is located proximate the distal end of the ceramic turbine 420. A ceramic turbine blade assembly gap or flange 424 can be formed at the facing surface of the ceramic turbine 420. Similarly, a metallic compressor blade gap or flange 434 can be formed at the facing surface of the metallic compressor 430.

At least two turbine blade assembly internal ray ports 426 are formed extending through the ceramic turbine base 421; each of the at least two turbine blade assembly internal ray ports 426 are oriented in an axial direction of the ceramic turbine 420, extending through the ceramic turbine blade assembly gap 424 and continuing through the distal end of the ceramic turbine base 421, wherein an installation end of the ceramic turbine base 421 and a distal end of the ceramic turbine base 421 are at opposite ends from one another. The turbine blade assembly internal ray port 426 is shaped having a first cross sectional shape at the exposed surface of the ceramic turbine blade assembly gap 424 and a second cross sectional shape at the distal end of the ceramic turbine base 421, wherein the first cross sectional shape has a larger cross sectional area compared to a cross sectional area of the second cross sectional shape. The turbine blade assembly internal ray port 426 is designed to reduce an overall weight of the ceramic turbine 420, thus increasing rotational speed while reducing a torque required to rotate the ceramic turbine 420.

The turbine blade assembly conical bore 428 is of a size and shape to snugly engage with a ceramic turbine and compressor shaft conical shaped end 418 formed at a respective end of the ceramic turbine and compressor shaft 410. A ceramic turbine and compressor shaft bore 412 is formed extending into the ceramic turbine and compressor shaft 410 from the respective end of the ceramic turbine and compressor shaft 410. A ceramic turbine adjoining rod 460 is inserted into the ceramic turbine and compressor shaft bore 412 and secured using a ceramic turbine and compressor shaft assembly locking element 464. The ceramic turbine and compressor shaft assembly locking element 464 can be in a form of a pin, a bolt, a biased latching ball, and the like. The ceramic turbine and compressor shaft assembly locking element 464 is designed to axially retain the ceramic turbine adjoining rod 460 within the ceramic turbine and compressor shaft bore 412. The ceramic turbine and compressor shaft assembly locking element 464 can be designed to additionally rotationally retain the ceramic turbine adjoining rod 460 respective to the ceramic turbine and compressor shaft 410. The distal end of the ceramic turbine adjoining rod 460 is of a size and shape to snugly engage with the turbine blade assembly cylindrical bore 427 of the ceramic turbine base 421. A recess can optionally be formed along an axial portion of the ceramic turbine adjoining rod 460 between the installation end of the ceramic turbine adjoining rod 460 and the distal end of the ceramic turbine adjoining rod 460, reducing weight and limiting a length of engagement between the ceramic turbine adjoining rod 460 and the ceramic turbine and compressor shaft bore 412 for ease of assembly.

The ceramic turbine 420 comprises a plurality of ceramic turbine blades 422. Each of the ceramic turbine blade 422 having an arched shape curving about a radial axis. Each of the ceramic turbine blades 422 having a second, less pronounced arched shaped component curving about an axial axis. An edge of each ceramic turbine blade 422 that is distal from the ceramic turbine blade assembly gap 424 leads an edge of each ceramic turbine blade 422 proximate the ceramic turbine blade assembly gap 424 in a direction of rotation. The edge of each ceramic turbine blade 422 proximate the ceramic turbine blade assembly gap 424 abuts and is contiguous with the ceramic turbine blade assembly gap 424.

The ceramic turbine 420 can be manufactured of any suitable ceramic material, using any suitable manufacturing process. The ceramic turbine 420 is subjected to extreme high temperatures, an extreme range of temperatures, high rotational forces, high radial or Centripetal forces, high tangential forces resulting from combustion within the combustion chamber, and the like. One exemplary material is a ceramic. The ceramic is capable of withstanding the wide temperature ranges and sudden temperature changes. The ceramic is also capable of sustaining the subjection to high rotational forces, high radial or Centripetal forces, high tangential forces resulting from combustion within the combustion chamber, and the like. It is also understood that the turbine 420 can be fabricated of other materials suitable for the operating conditions of the 100 #, including stainless steel, or any combination of suitable materials, such as ceramic and stainless steel.

The ceramic turbine 420 is retained upon the ceramic turbine adjoining rod 460 and the ceramic turbine and compressor shaft 410 by a ceramic turbine shaft assembly end cap 462. The ceramic turbine shaft assembly end cap 462 can be assembled to the distal end of the ceramic turbine adjoining rod 460 using any suitable securing configuration. This can include a threaded interface; an adhesive; a bonding agent; a material transition, such as welding; a compression fit, an interference fit, and the like. A compression fit or interference fit can be assembled by cooling the ceramic turbine and compressor shaft 410 and/or ceramic turbine adjoining rod 460 (shrinking the ceramic turbine and compressor shaft 410 and/or ceramic turbine adjoining rod 460) and elevating the temperature of the ceramic turbine 420 (expanding the ceramic turbine 420), enabling the bore 427 to slide onto the respective end of the ceramic turbine adjoining rod 460. When the temperatures of the ceramic turbine 420, the ceramic turbine and compressor shaft 410 and/or the ceramic turbine adjoining rod 460 equalize, the interface between the bore 427 and the respective end of the ceramic turbine adjoining rod 460 creates a solid mechanical joint. The same process can be used to assemble the ceramic turbine shaft assembly end cap 462 onto the respective end of the ceramic turbine adjoining rod 460.

A spacer thrust bearing ceramic integrated shaft 440 is formed at a distal end of the ceramic turbine and compressor shaft 410. In the exemplary embodiment, the spacer thrust bearing ceramic integrated shaft 440 is unitarily formed at an end of the ceramic turbine and compressor shaft 410 opposite the ceramic turbine 420. The spacer thrust bearing ceramic integrated shaft 440 extends radially outward from a general diameter of the ceramic turbine and compressor shaft 410, creating a flange. The spacer thrust bearing ceramic integrated shaft 440 includes a ceramic spacer thrust bearing first axial facing surface 442 on an outer or far surface and a ceramic spacer thrust bearing second axial facing surface 444 on an inner or forward surface. Each of the ceramic spacer thrust bearing first axial facing surface 442 and the ceramic spacer thrust bearing second axial facing surface 444 would be sized and shaped to engage with the first back plate thrust bearing 142 and the second backing plate thrust bearing 144 respectively. The spacer thrust bearing ceramic integrated shaft 440 is preferably fabricated of SAE 4140 chromium-molybdenum alloy steel.

Figure 6:
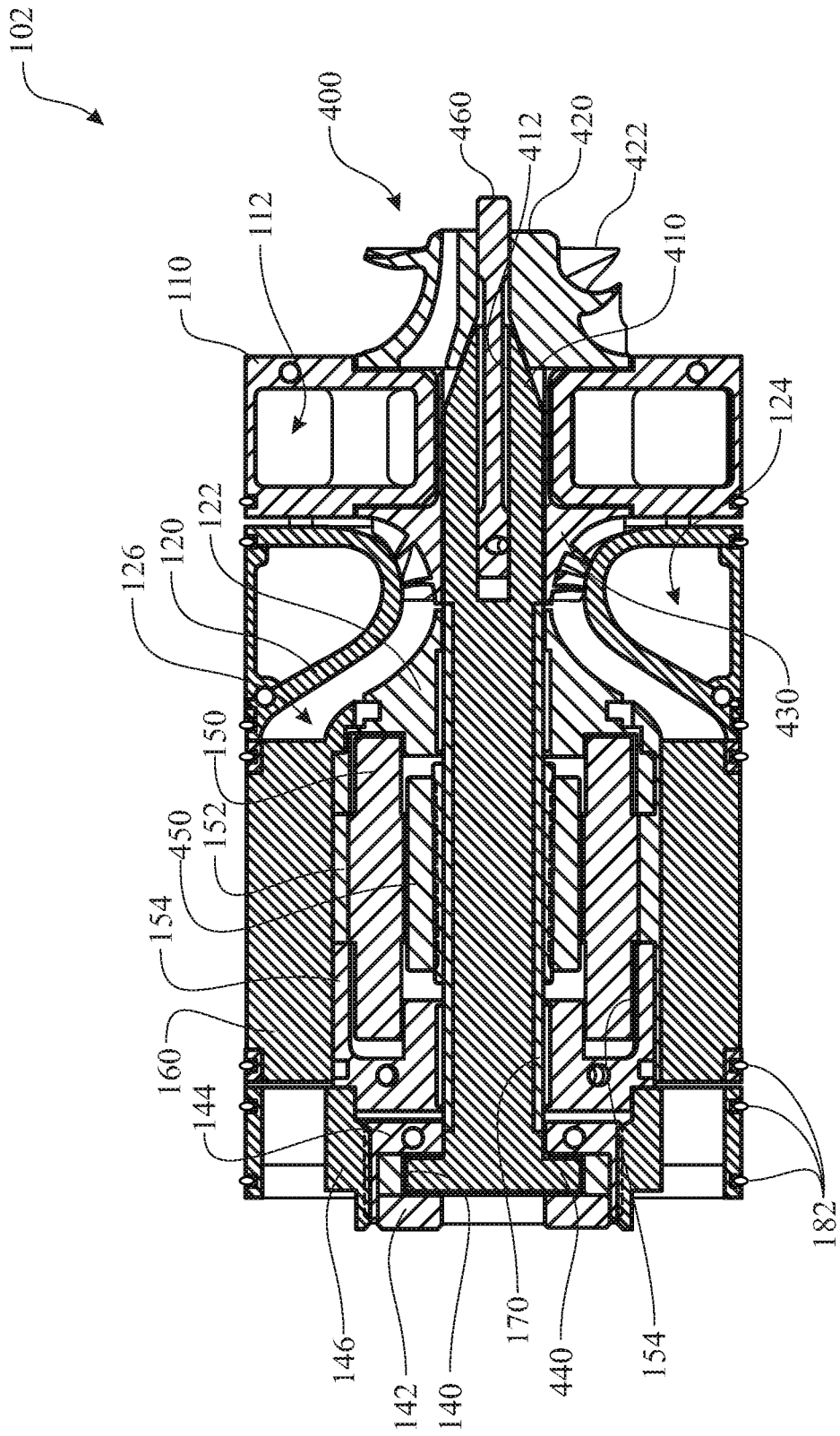
FIG. 6 presents a sectioned side elevation view of an exemplary micro turbine engine subassembly of the exemplary micro/nano-turbine driven energy generating system, originally introduced in FIG. 1.
Figure 7:
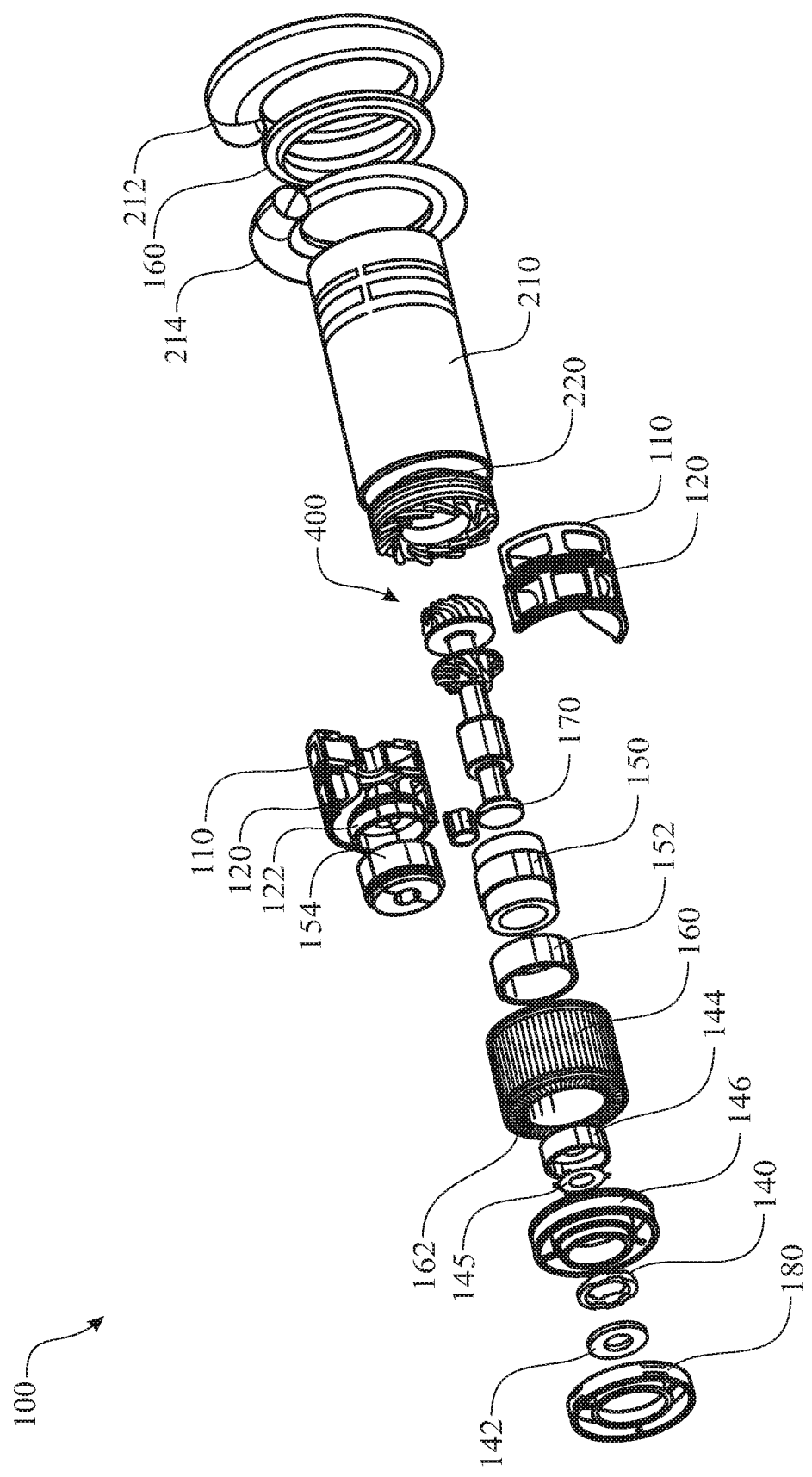
FIG. 7 presents an exploded side isometric view of the exemplary micro turbine engine subassembly, originally introduced in FIG. 1, the illustration presenting three distinct subassemblies.
Figure 8:
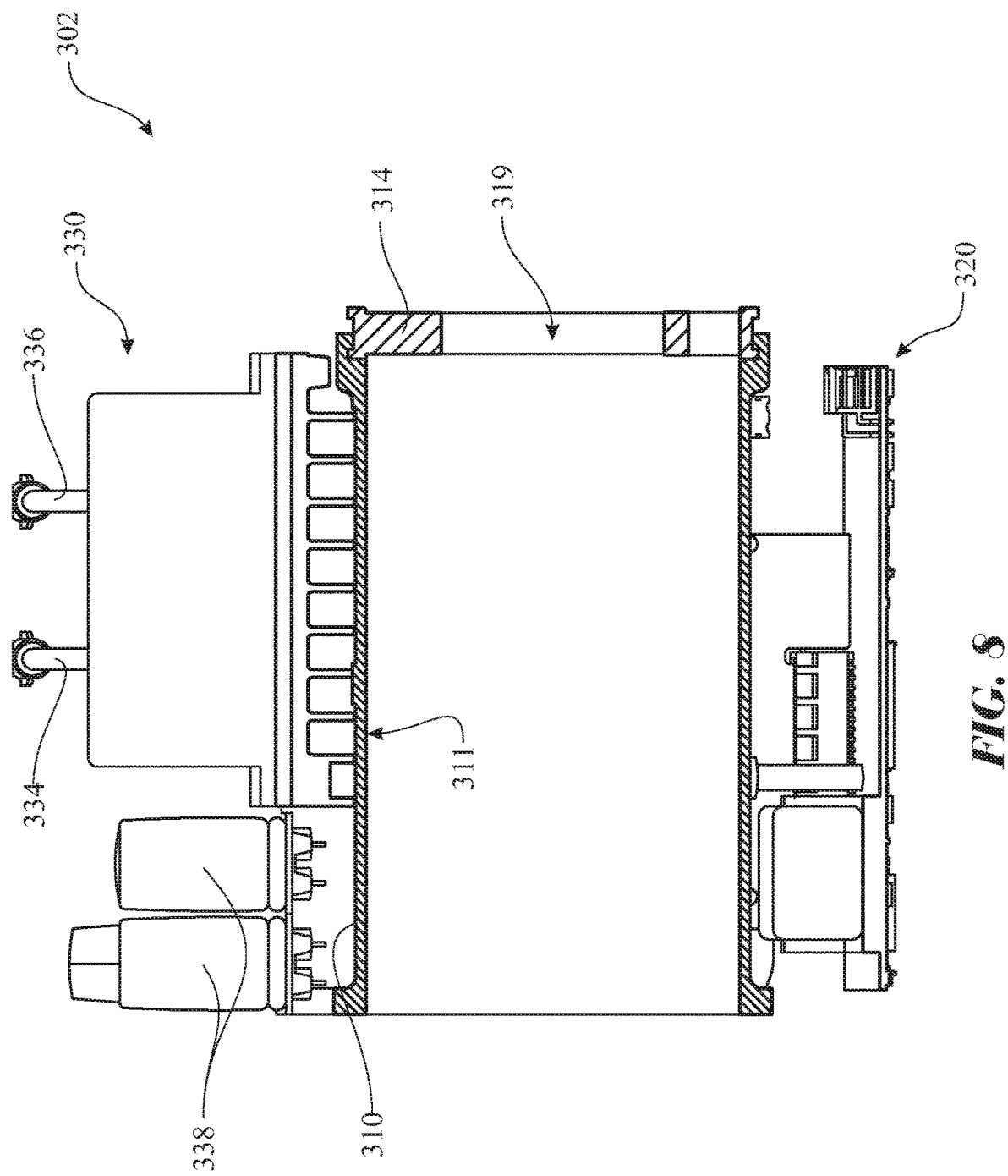
FIG. 8 presents a sectioned side elevation view of an exemplary compressor air supply and electronics subassembly of the exemplary micro/nano-turbine driven energy generating system, originally introduced in FIG. 1.

A magnetic rotor 450 is assembled to an exterior surface of the ceramic turbine and compressor shaft 410 at a location between the metallic compressor 430 and the spacer thrust bearing ceramic integrated shaft 440. A rotor turbine shaft 452 can be installed between the magnetic rotor 450 and the exterior surface of the ceramic turbine and compressor shaft 410. The magnetic rotor 450 would be axially located along the ceramic turbine and compressor shaft 410 to align with a magnetic winding stator 150 when the integrated ceramic compressor and turbine assembly 400 is assembled into the micro turbine engine subassembly 102, as illustrated in FIG. 6. The magnetic rotor 450 is preferably fabricated of SAE 1010 carbon steel or an equivalent material. The rotor turbine shaft 452 is preferably fabricated of a ceramic material. The use of the ceramic material for the rotor turbine shaft 452 provides the rigidity and low weight necessary for the micro turbine assembly 100 to work at high rotational speeds. In addition, the ceramic material for the rotor turbine shaft 452 minimizes internal heat transfer.

The metallic compressor 430 is similar to the ceramic turbine 420. The metallic compressor 430 includes a metallic compressor base 431 comprising a metallic compressor blade cylindrical bore 437 passing axially therethrough. The metallic compressor base 431 is shaped having a larger diameter at a turbine end of the metallic compressor 430 and a smaller diameter at an air intake or supply end of the metallic compressor 430. A metallic compressor blade gap 434 is formed at a broadest diameter end of the metallic compressor 430. A plurality of metallic compressor larger blades 432 extend outward from an exterior surface of the metallic compressor base 431. Similarly, a plurality of metallic compressor smaller blades 433 extend outward from the exterior surface of the metallic compressor base 431. The metallic compressor larger blades 432 and the metallic compressor smaller blades 433 are arranged in a spatially, alternating arrangement. Each of the metallic compressor larger blade 432 is shaped having a twisted blade shape, where a portion of metallic compressor larger blade 432 proximate the air intake or supply side of the metallic compressor larger blade 432 is curved with a center of curvature located on a trailing rotation side of the blade 432 and a compressed air delivery side of the metallic compressor larger blade 432 is curved with a center of curvature located on an leading rotation, opposite side of the blade 432. Each of the metallic compressor smaller blade 433 is shaped the same as the metallic compressor larger blade 432, but smaller in length. Optionally, each of the metallic compressor smaller blade 433 can also be smaller in a radial dimension or height compared to the metallic compressor larger blade 432. Each of the metallic compressor larger blades 432 and the metallic compressor smaller blades 433 preferably abuts a surface of the metallic compressor blade gap 434 and extend rearward or towards the smaller diameter side of the metallic compressor base 431. Each of the metallic compressor larger blades 432 can terminate at a position that is substantially towards, proximate, or against the edge of the smaller diameter end of the metallic compressor base 431.

Elements of the micro turbine engine subassembly 102 can be designed to be installed about the integrated ceramic compressor and turbine assembly 400. The elements of the micro turbine engine subassembly 102 can have an interior diameter that is greater than an exterior diameter of the spacer thrust bearing ceramic integrated shaft 440, where the spacer thrust bearing ceramic integrated shaft 440 can be inserted through a bore of the respective element. Conversely, elements having an interior diameter that is smaller than the exterior diameter of the spacer thrust bearing ceramic integrated shaft 440, are generally designed having two (or more) sections that are assembled about the integrated ceramic compressor and turbine assembly 400. Examples of this are shown in an exemplary exploded assembly view illustrated in FIG. 7.

The micro turbine engine subassembly 102 further comprises a turbine spacer 110. The turbine spacer 110 is preferably fabricated of stainless steel. The turbine spacer 110 is located to a larger diameter side of the ceramic turbine 420. A combustion chamber 112 defined by an interior surface of the turbine spacer 110. An igniter (not illustrated) can be integrated into the turbine spacer 110 in a manner where the igniter initiates combustion of fuel within the combustion chamber 112.

A compressor side case foil 122 and a thrust side case foil 154 are assembled circumscribing the respective sections of the ceramic turbine and compressor shaft 410. The compressor shroud 120, the compressor side case foil 122 and the thrust side case foil 154 are each preferably fabricated of SAE 4140 chromium-molybdenum alloy steel. Bearings, such as a ceramic shaft bearing 170 can be installed between opposing surface of the compressor side case foil 122 and the ceramic turbine and compressor shaft 410 and similarly, such as the ceramic shaft bearing 170, between opposing surface of the thrust side case foil 154 and the ceramic turbine and compressor shaft 410. The bearings are preferably capable of supporting elevated temperatures and high rotational speeds, generally between 40,000 and 120,000 revolutions per minute (RPM's). The motor stator spacer 152 is assembled in conjunction with the assembly of the compressor side case foil 122 and the thrust side case foil 154. A motor stator spacer 152 and a heat sink body 160 are subsequently assembled, encapsulating the thrust side case foil 154. A compressor shroud 120 is carefully assembled to the subassembly in a manner to avoid damaging the metallic compressor 430. Features of the turbine spacer 110 and/or the heat sink body 160 or other elements, such as a sleeve housing, can be used to maintain the compressor shroud 120 at a desired alignment within the micro turbine engine subassembly 102. The design of the compressor shroud 120 includes a hollow section 124, preferably strengthened by a series of ribs, to lighten the shroud 120. An interior surface of the compressor shroud 120 defines one side of the compressor air supply passageway 126.

The first back plate thrust bearing 142, the second backing plate thrust bearing 144, the thrust foil bearing 140, and a foil thrust bearing 145 can be assembled, surrounding the spacer thrust bearing ceramic integrated shaft 440. The thrust bearing assembly is supported by the thrust foil system holder 146. The combination of the first back plate thrust bearing 142, the second backing plate thrust bearing 144, the thrust foil bearing 140, and the a foil thrust bearing 145, axially retain the integrated ceramic compressor and turbine assembly 400 in position within the micro turbine engine subassembly 102. Other structural elements are assembled to finish the assembly process of the micro turbine engine subassembly 102. A motor system lock 180 can be assembled to a radial turbine shroud 220 to retain the turbine motor components within the engine housing 210.

Figure 5:
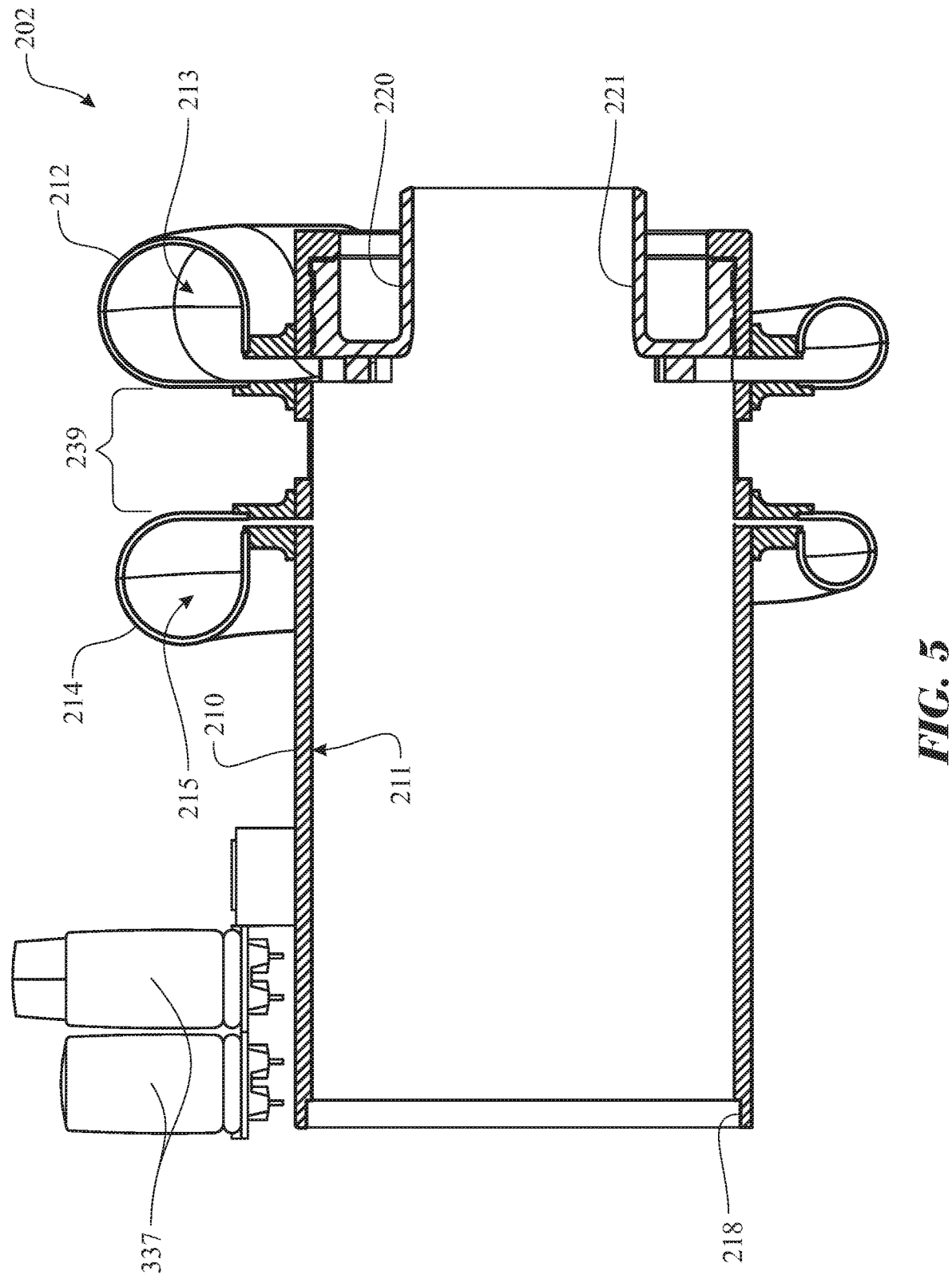
FIG. 5 presents a sectioned side elevation view of an exemplary micro turbine air sourcing housing subassembly of the exemplary micro/nano-turbine driven energy generating system, originally introduced in FIG. 1.

Details of the micro turbine air sourcing housing subassembly 202 are presented in FIG. 5. The micro turbine air sourcing housing subassembly 202 provides an enclosure and interfacing elements for the micro turbine engine subassembly 102. An engine housing 210 provides an enclosure for the micro turbine engine subassembly 102 and structural support for the elements of the micro turbine air sourcing housing subassembly 202. The micro turbine engine subassembly 102 is installed, being seated against an engine housing interior surface 211 of the engine housing 210. A turbine air intake scroll 212, providing the turbine air intake conduit interior surface 213, is assembled to engine housing 210 at a located in registration with a series of airflow passageways for delivery of an air supply to the turbine 420. Similarly, a compressor exhaust scroll 214, providing the compressor exhaust scroll interior surface 215, is assembled to engine housing 210 at a located in registration with a series of airflow passageways for receiving an exhaust from the compressor 430. A radial turbine shroud 220 is assembled within the interior of the engine housing 210 at a turbine end of the engine housing 210. Exhaust from the turbine 420 is discharged through a port defined by a radial turbine shroud interior surface 221 of the radial turbine shroud 220. If suitable, electrical components, such as a transformer capacitors 337, can be assembled to the engine housing 210. Additional features, such as a micro turbine air sourcing housing subassembly to compressor air supply and electronics subassembly mounting interface 218, can be integrated (as shown) or assembled to (as suggested) to the engine housing 210, where the features further support assembly of the micro turbine engine subassembly 102 and the compressor air supply and electronics subassembly 302 to the micro turbine air sourcing housing subassembly 202. A turbine scroll and compressor scroll axial gap 239 extends between facing edges of the turbine air intake scroll 212 and the compressor exhaust scroll 214. The engine housing 210 is preferably fabricated of AISI 304 stainless steel. The radial turbine shroud 220 is preferably fabricated of Inconel 800HT.

The compressor air supply and electronics subassembly 302 is provided to provide filtration to sourced air and provide support for the various electrical elements of the system. Since the compressor air supply and electronics subassembly 302 remains at a cooler temperature during operation, it is advantageous to assemble more temperature sensitive components to the compressor air supply and electronics subassembly 302. The compressor air supply and electronics subassembly 302 includes a compressor air supply housing 310. The compressor air supply housing 310 provides an exterior surface and an interior surface 311. A compressor air supply housing assembly interface member 314 is assembled to an assembly end of the compressor air supply housing 310. The compressor air supply housing assembly interface member 314 aids in assembly between the compressor air supply and electronics subassembly 302 and the micro turbine air sourcing housing subassembly 202. A compressor air supply housing assembly airflow passageway 319 is provided through the compressor air supply housing assembly interface member 314, enabling airflow to pass through the compressor air supply housing 310 and into the micro turbine engine subassembly 102. In the exemplary micro turbine assembly 100, a digital signal processor 320, a planar transformer 330, a multilevel inverter 340, and a controller assembly 350 (FIG. 1) are assembled to an exterior of the compressor air supply housing 310. Electric power is generated by the generator (150, 450) and transferred to the planar transformer 330. The sourced electric power is then converted to a useable form by the planar transformer 330. The planar transformer 330 delivers the converted, useable power to a desired power recipient by power conductors, such as a positive power output conductor 334 and a ground power output conductor 336.

Operation of the micro turbine assembly 100 is illustrated in FIGS. 9 and 10. The combustion chamber 112 is in fluid communication with airflow supplied through a turbine air intake conduit interior surface 213 of a turbine air intake scroll 212 of the micro turbine air sourcing housing subassembly 202. Airflow (air supply for turbine 290 illustrated in FIGS. 9 and 10) to the ceramic turbine 420 is provided by the turbine air intake scroll 212 via the turbine air intake conduit interior surface 213 of the micro turbine air sourcing housing subassembly 202. The sourced airflow is combined with fuel in a desired mixture and combusted in a combustion chamber, such as the combustion chamber 112. The combustion process elevates the temperature of the exhaust, expanding the mixture. Since the expanded mixture is restrained with a volume, the expanded air escapes at a high velocity. The escaping air passes across the ceramic turbine 420, driving the ceramic turbine 420 to rotate accordingly about an engine shaft rotational axis 419 (FIGS. 12 and 13). The rotation of the ceramic turbine 420 causes the ceramic turbine and compressor shaft 410 to rotate, which rotates the metallic compressor 430 and the magnetic rotor 450. Rotation of the metallic compressor 430 drives a compression process. Rotation of the magnetic rotor 450 generates electric power. Turbine exhaust 298 from the turbine is vented through a tunnel formed within the radial turbine shroud interior surface 221.

Airflow to the compressor (air supply for compressor 280 illustrated in FIGS. 9 and 10) is provided through elements of the micro turbine engine subassembly 102. This includes an airflow passageway through the thrust foil system holder 146 leading into a heat sink body 160. The heat sink body 160 is preferably fabricated of 5051 Aluminum. The heat sink body 160 includes a number of heat sink body airflow passageways 162 (illustrated in FIG. 7), which feeds air to the compressor air supply passageway 126. Air flowing through the heat sink body 160 is heated by heat generated by the magnetic winding stator 150. Conversely, the air cools the magnetic winding stator 150 via the heat sink body 160. The compressor air supply passageway 126 is defined between facing surfaces of a compressor shroud 120 and a compressor side case foil 122. The compressor air supply passageway 126 delivers airflow to a smaller diameter end of the metallic compressor 430. The airflow is compressed by the change in diameter of the compressor air supply passageway 126 and the rotation of the metallic compressor 430. The compression of the sourced air elevates the temperature of the air and exhausts heated air 288. The compressed, heated air 288 is delivered to a desired destination through a compressor exhaust scroll interior surface 215 of a compressor exhaust scroll 214 of the micro turbine air sourcing housing subassembly 202. In one configuration the compressed air can be routed to an intake for the turbine. In another configuration, the heated air can be used to boil water. It is understood that the heated air can be used for any suitable application.

Rotation of the ceramic turbine and compressor shaft 410 rotates the magnetic rotor 450 about the engine shaft rotational axis 419. The rotational motion causes the magnetic rotor 450 to pass across a stationary magnetic winding stator 150. In a common configuration, the micro turbine engine subassembly 102 would include a plurality of magnetic rotors 450 spatially arranged about a circumference of the ceramic turbine and compressor shaft 410. Similarly, the micro turbine engine subassembly 102 includes a plurality of magnetic winding stator 150 spatially arranged about the engine shaft rotational axis 419. Each of the magnetic winding stator 150 is supported by a motor stator spacer 152. This transition operates as a generator to generate electric power. The motor stator spacer 152 is preferably fabricated of SAE 4140 chromium-molybdenum alloy steel.

Figure 17:
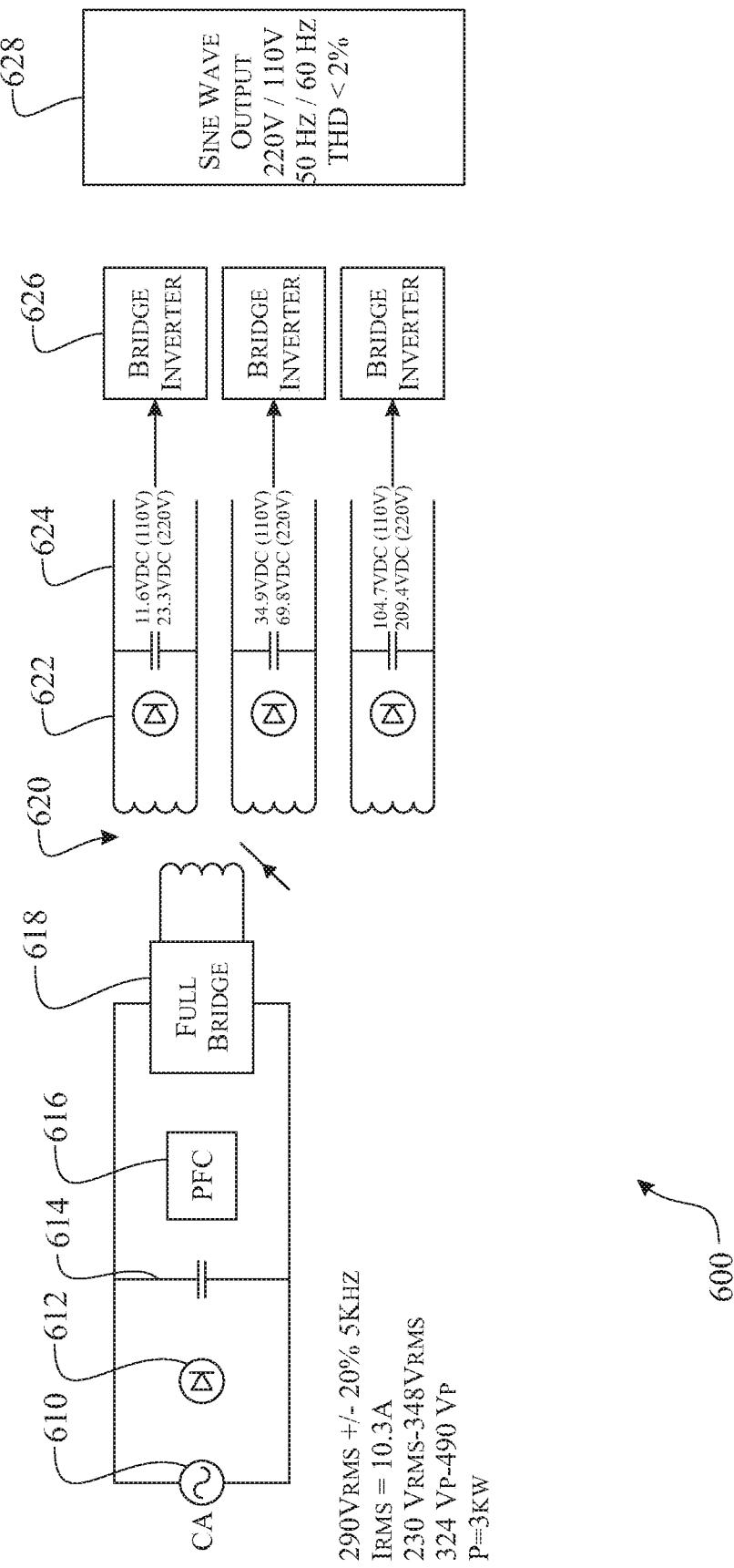
FIG. 17 presents an exemplary schematic diagram illustrating an exemplary process for converting a mechanical motion into an electric power output.
Figure 18:
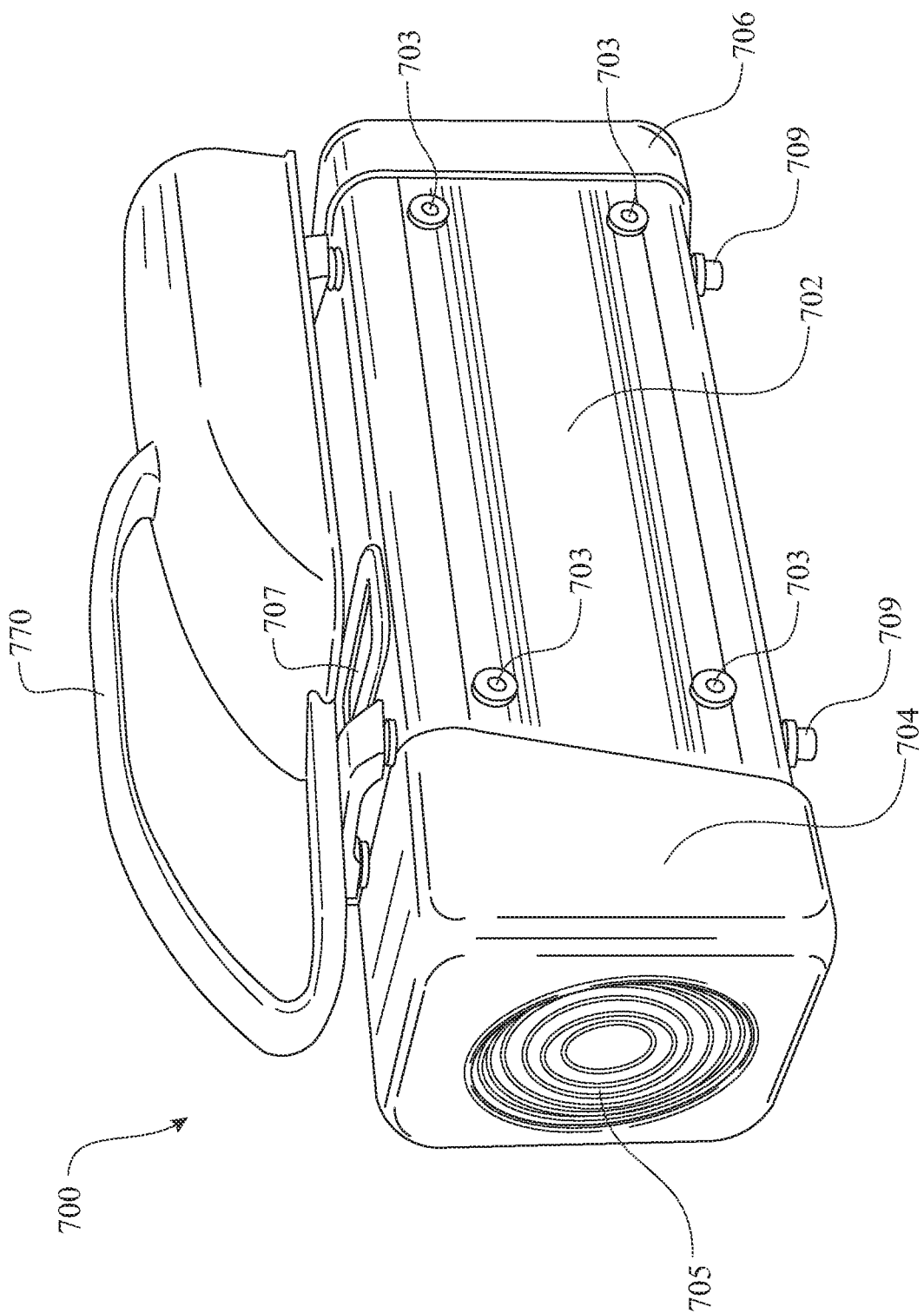
FIG. 18 presents front, side perspective view of an exemplary micro/nano-turbine driven energy generating system in accordance with the present invention.
Figure 19:
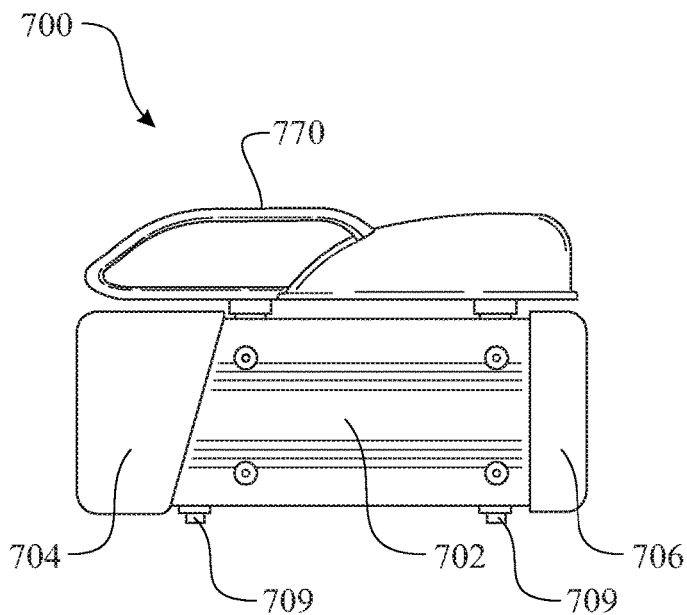
FIG. 19 presents a side elevation view of the micro/nano-turbine driven energy generating system, originally introduced in FIG. 18.
Figure 20:
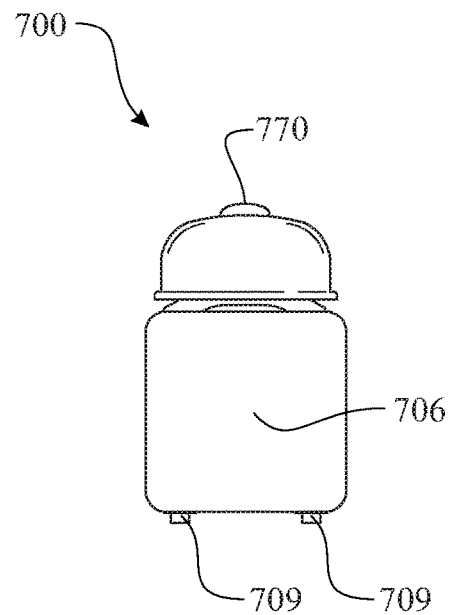
FIG. 20 presents a rear elevation view of the micro/nano-turbine driven energy generating system, originally introduced in FIG. 18.
Figure 21:
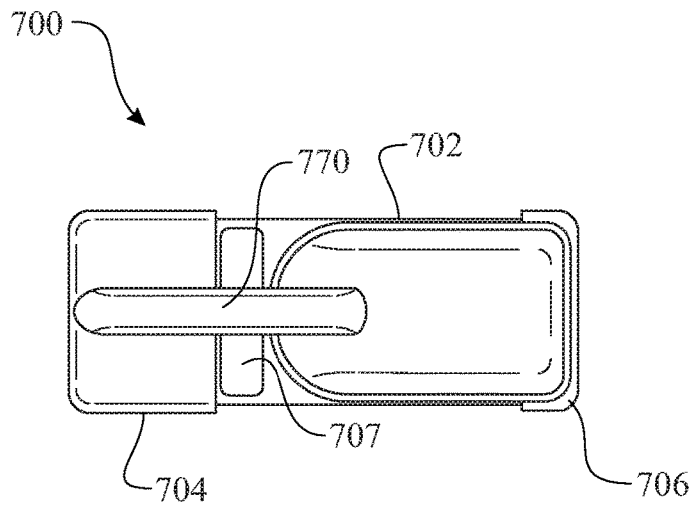
FIG. 21 presents a top plan view of the micro/nano-turbine driven energy generating system, originally introduced in FIG. 18.
Figure 22:
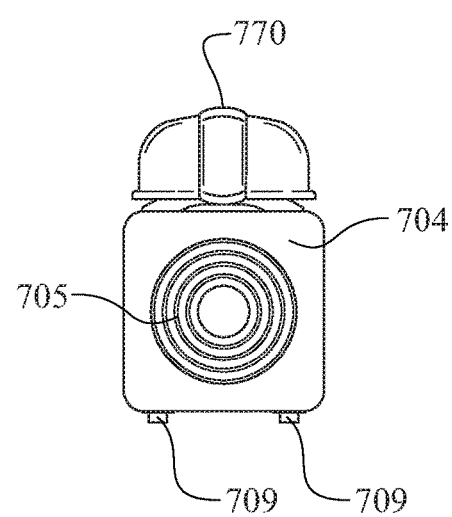
FIG. 22 presents a front elevation view of the micro/nano-turbine driven energy generating system, originally introduced in FIG. 18.

Details of the planar transformer 330 are provided in an electrical power generation schematic 600, illustrated in FIG. 17. Electrical power is sourced from the generator 610 (150, 450 of 100). The sourced, raw electric power is initially processed through a primary rectifier 612. The rectified power is stored in a primary filter capacitor 614 and processed through a power factor correction (PFC) 616. The electric power is then provided to a full bridge 618 for wireless transfer to a secondary rectifier 622 via a transformer 620. The secondary rectifier 622 can segment the power into different states via secondary filter capacitors 624. Electric power is then processed through a respective series of output full bridges 626, resulting in a sine wave power output 628. The sine wave power output 628 can then be supplied to a desired electric power recipient, such as line power. The electrical power generation schematic 600 is one exemplary configuration of the electrical power generation schematic 600. It is understood that any electric power processing circuit can be utilized to provide a desired electric output.

Figure 14:
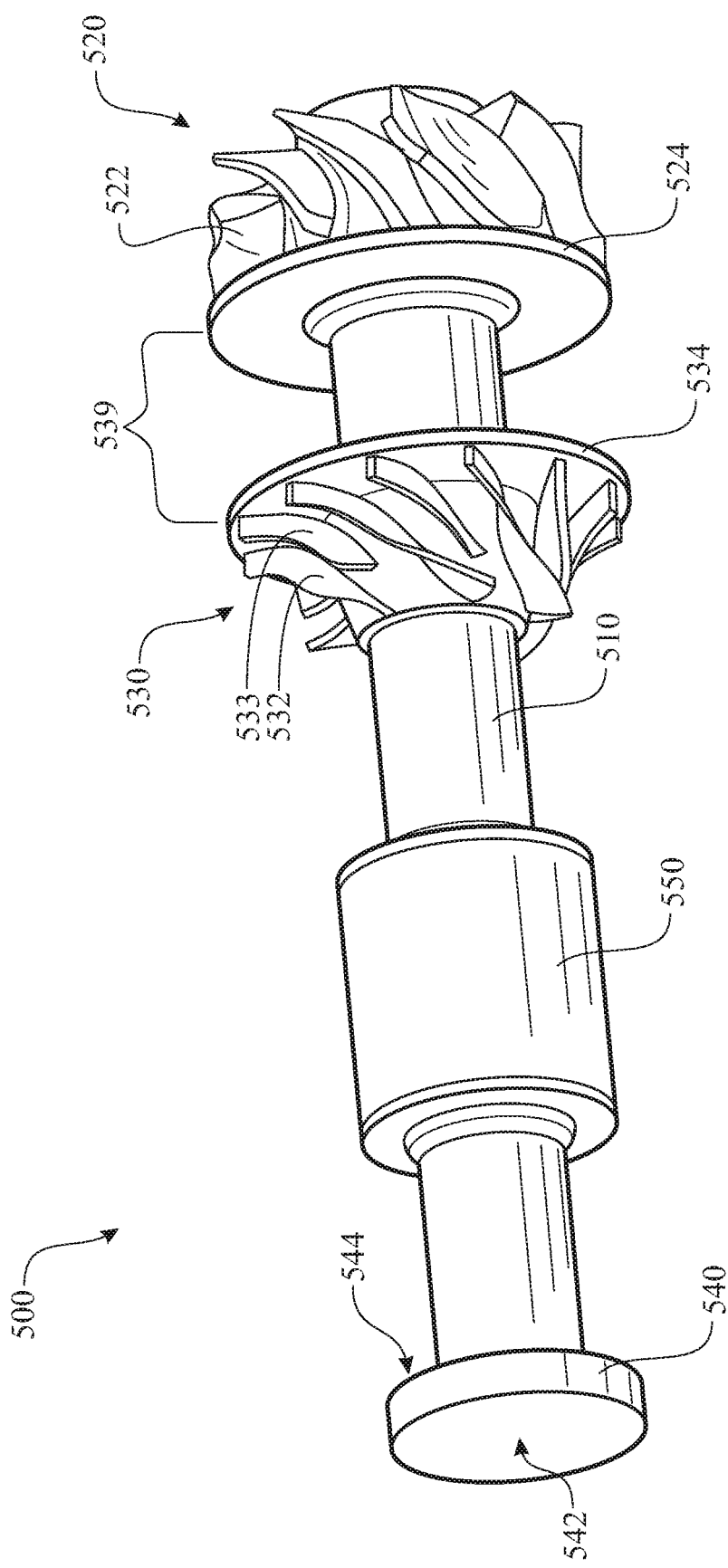
FIG. 14 presents a side, rear isometric view of a second exemplary engine shaft assembly, wherein the second exemplary engine shaft assembly includes ceramic components.
Figure 15:
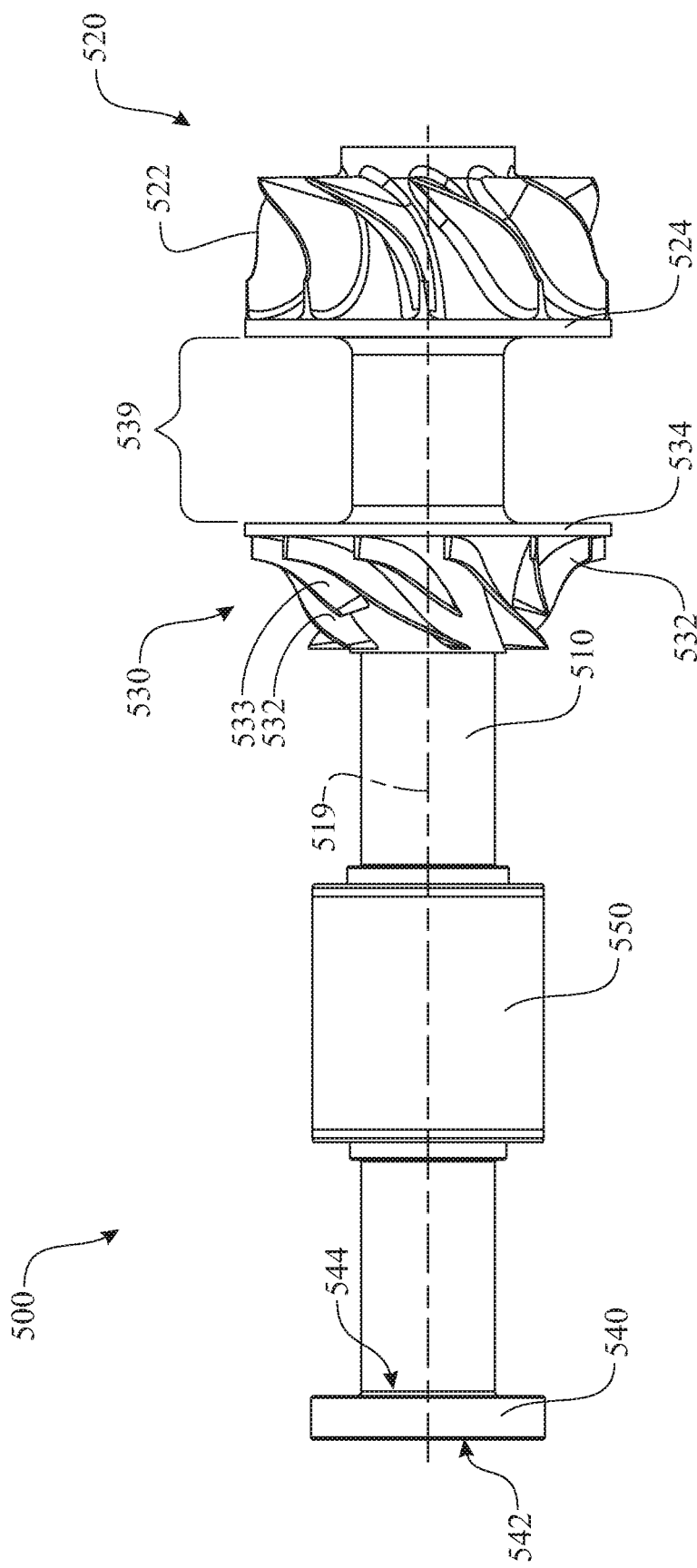
FIG. 15 presents a side elevation view of the second exemplary engine shaft assembly, originally introduced in FIG. 14.
Figure 16:
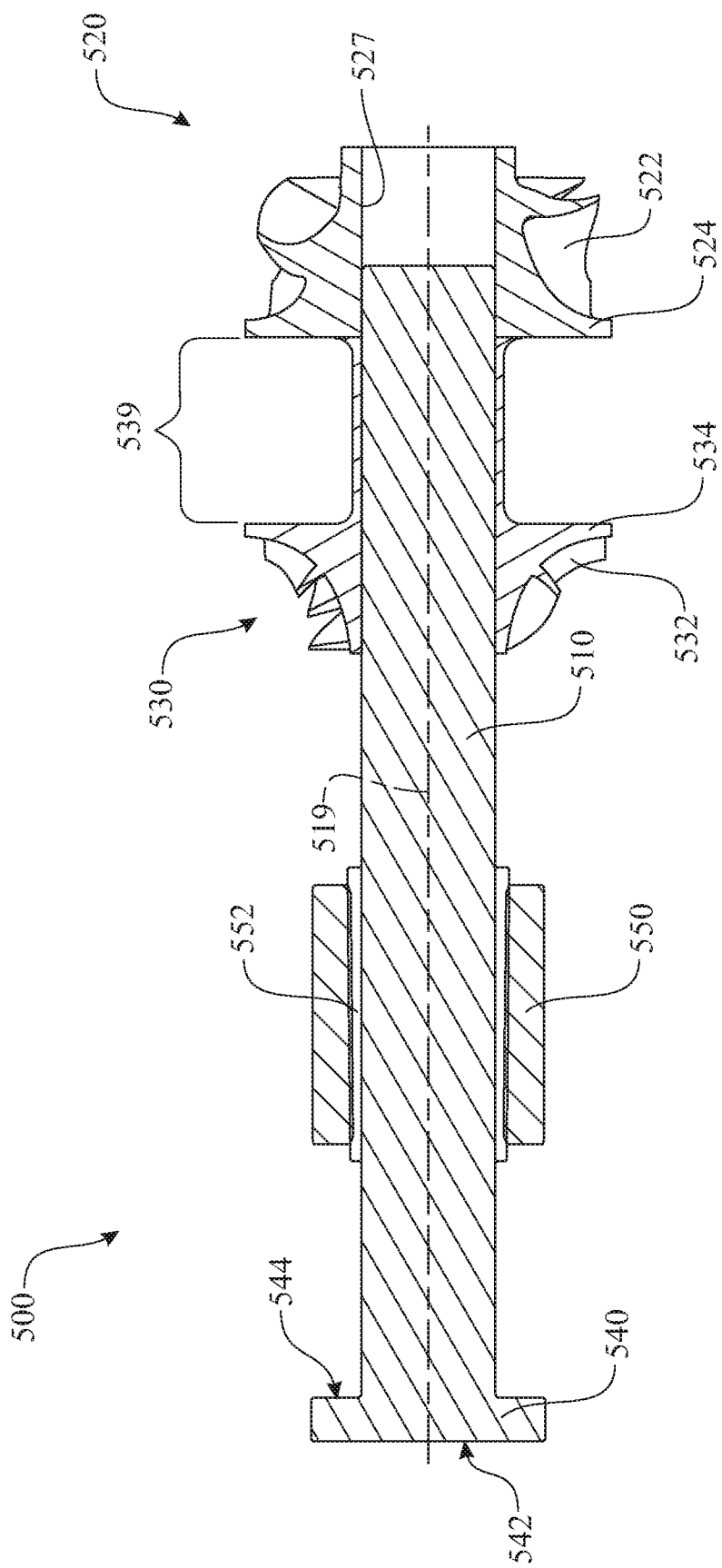
FIG. 16 presents a sectioned side elevation view of the second exemplary engine shaft assembly, originally introduced in FIG. 14.

The exemplary embodiment described above includes an integrated ceramic compressor and turbine assembly 400. The integrated ceramic compressor and turbine assembly 400 is one exemplary integrated compressor and turbine assembly. A second exemplary compressor and turbine assembly is identified as a metallic turbine and compressor shaft assembly 500, which is illustrated in FIGS. 14, 15, and 16. The metallic turbine and compressor shaft assembly 500 and the integrated ceramic compressor and turbine assembly 400 comprise a number of like elements. Like elements of the metallic turbine and compressor shaft assembly 500 and the integrated ceramic compressor and turbine assembly 400 are numbered the same, where the elements of the metallic turbine and compressor shaft assembly 500 are preceded by the numeral "5". In the exemplary illustration, the metallic turbine and compressor shaft assembly 500 includes a metallic turbine blade assembly 520 having a cylindrical bore 527 for assembly to an exterior surface of the metallic turbine and compressor shaft 510. The metallic turbine blade assembly 520 and the metallic compressor blade assembly 530 can be fabricated as a unitary assembly. The metallic turbine blade assembly 520 and the metallic compressor blade assembly 530 can be assembled to the metallic turbine and compressor shaft 510 using any suitable assembly techniques, including those described above for the integrated ceramic compressor and turbine assembly 400. Insertion of the turbine spacer 110 between the metallic turbine blade assembly 520 and the metallic compressor blade assembly 530 retains the metallic turbine blade assembly 520 and the metallic compressor blade assembly 530 in proper axial registration. The metallic turbine blade assembly 520 and the metallic compressor blade assembly 530 are preferably fabricated of a metal. The metallic turbine blade assembly 520 and the metallic compressor blade assembly 530 can be manufactured by any suitable manufacturing process to provide components capable of withstanding stresses and strains associated with the wide temperature ranges and sudden temperature changes as well as a capability of sustaining the subjection to high rotational forces, high radial or Centripetal forces, high tangential forces resulting from combustion within the combustion chamber, and the like.

The present invention is referred to an exemplary microscale energy cogeneration system 700, as illustrated in FIGS. 18 through 22 and 24.

The microscale energy cogeneration system 700 is preferably of a size and design enabling portability, being easily transportable between locations. Its general compact size, its light weight and can include a handle 770, which is especially useful for that purpose. The micro/nano-turbine 722 is preferably dimensioned such that it may be portable and has an output in a range to 1 to 5 kilowatts per hour and more preferably in a range of 2 to 4 kWh. In addition, the micro/nano-turbine 722 may be configured to have an efficiency of at least 70%, more preferably at least 80%, and more typically, in a range of 80% to 86%.

The present microscale energy cogeneration system 700 is compatible for integration with other energy systems and systems requiring energy, as explained below.

Gaseous heat energy is provided from the combustor chamber 750 to the micro/nano-turbine 722, which converts the provided gaseous heat energy into mechanical energy. The turbine 722 rotates a micro electric generator 724. The rotational motion of the micro electric generator 724 converts this mechanical energy into a generated electrical power output 732. The generated electrical power output 732 created can be supplied to an electrical grid of a home or house, an electrical grid of a group of houses, a building, a business, a group of business, a hybridizing car, a boat, an outdoor application, or any other electric power consuming entity.

The microscale energy cogeneration system 700 includes an energy generating system housing 702. The energy generating system housing 702 is preferably fabricated of a section of an extruded, hollow stock of material, such as aluminum. Various features are machined into the section of extruded stock. This can include a series of features to receive component mounting hardware 703, such as bolts, screws, rivets, brackets, and the like to assembly operational components to the energy generating system housing 702. Another feature can include a series of features for assembly of a series of energy generating system feet 709. Each energy generating system foot 709 is preferably fabricated of a pliant material, such as rubber, wherein the pliancy is provided to absorb vibrations generated during operation of the microscale energy cogeneration system 700. The series of energy generating system feet 709 can be individually assembled to the energy generating system housing 702 or assembled to a supporting bracket, wherein the supporting bracket is then assembled to the energy generating system housing 702. It is preferred that the series of energy generating system feet 709 be assembled directly or indirectly to a lower or bottom panel of the energy generating system housing 702, a lower or bottom portion of the frontal end cap 704, and/or a lower or bottom portion of the rear end cap 706. Alternatively, the feet 709 can be integrally formed in the frontal end cap 704 and the rear end cap 706.

A frontal end cap 704, preferably comprising a ventilation grill 705, is secured to a front end of the energy generating system housing 702. A frontal end cap 704 is secured to a front end of the energy generating system housing 702. Each of the frontal end cap 704 and the rear end cap 706 are preferably slideably assembled to an exterior surface of the energy generating system housing 702. The frontal end cap 704 and the rear end cap 706 can then be secured to the energy generating system housing 702 by any suitable method, such as an adhesive, one or more mechanical fasteners, a mechanical interference, and the like. It is preferred that at least one of the frontal end cap 704 and the rear end cap 706 is removably assembled to the energy generating system housing 702. The removability of the at least one of the frontal end cap 704 and the rear end cap 706 from the energy generating system housing 702 enables access to the operational components for servicing and/or repairs.

A handle 770 or a handle assembly 770 is assembled to the energy generating system housing 702 (as shown), the frontal end cap 704 and/or the rear end cap 706. It is preferred that the handle 770 be removable from the energy generating system housing 702. This eases access to the heated air exhaust port 707.

The energy generating system housing 702 can be modified to introduce a heated air exhaust port 707. The heated air exhaust port 707 is preferably formed through an upper panel of the energy generating system housing 702, as the heated air exhaust port 707 is designed to transfer heat, and the optimal location would be along an upper panel of the energy generating system housing 702, as heat naturally rises. An exhaust transfer element 708 can be assembled to the upper panel of the energy generating system housing 702 providing a conduit for the heated gases passing through the exhaust transfer element 708 to another unit. The exhaust transfer element 708 can be removable to accommodate the handle 770.

Figure 24:
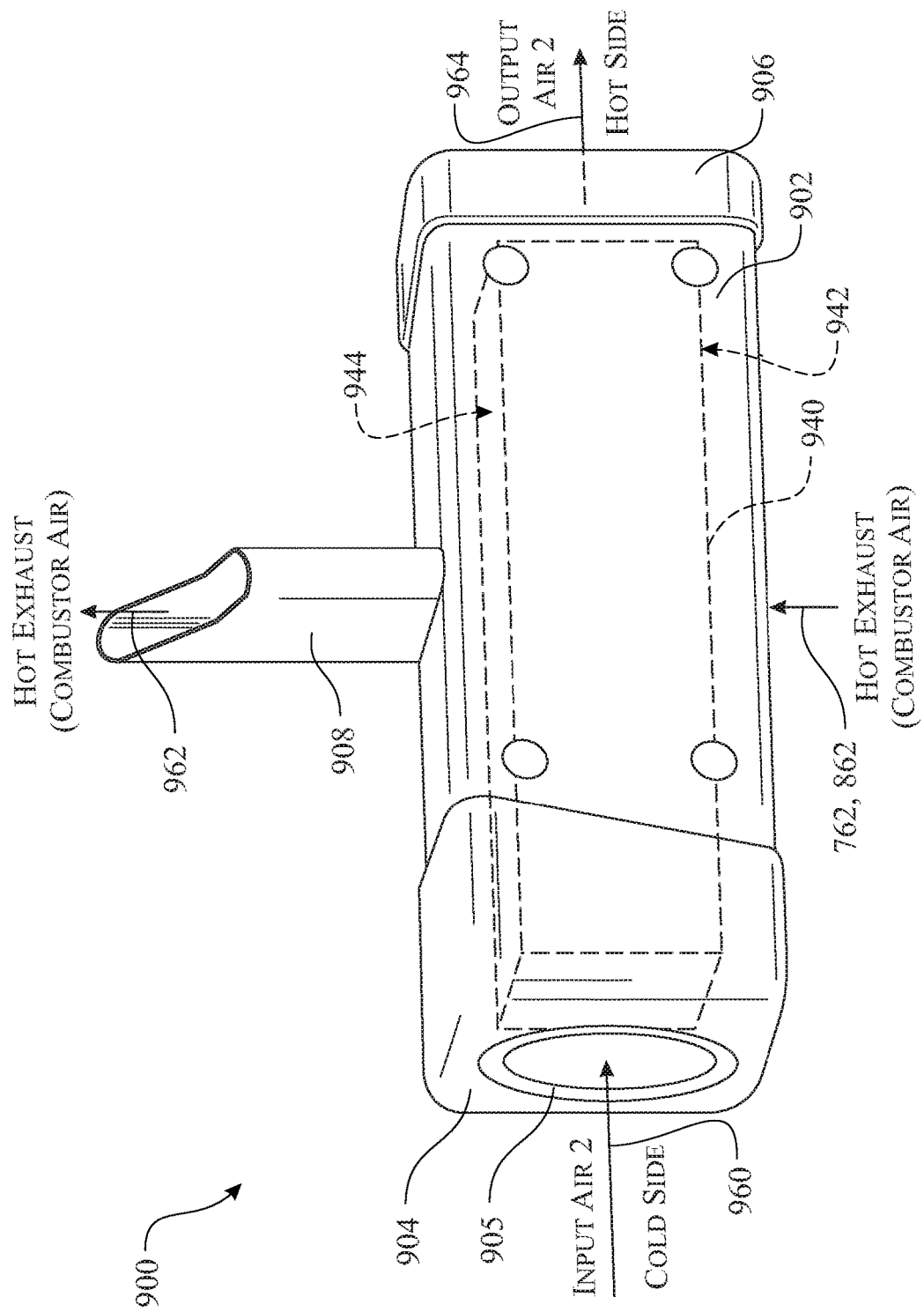
FIG. 24 presents an isometric view of the micro/nano-turbine driven energy generating system, originally introduced in FIG. 18, the illustration introducing functional components of the micro/nano-turbine.
Figure 23:
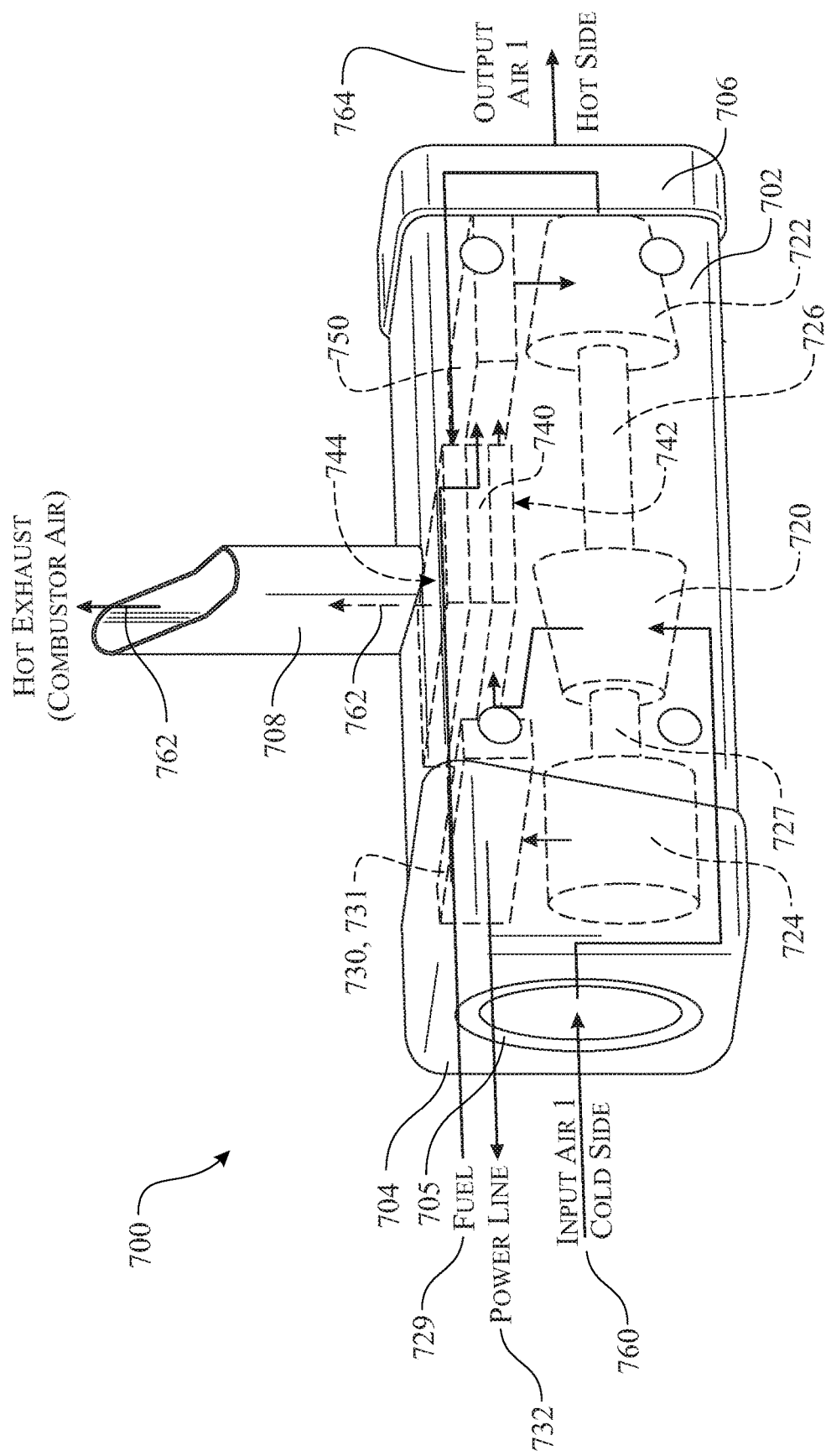
Figure 27:
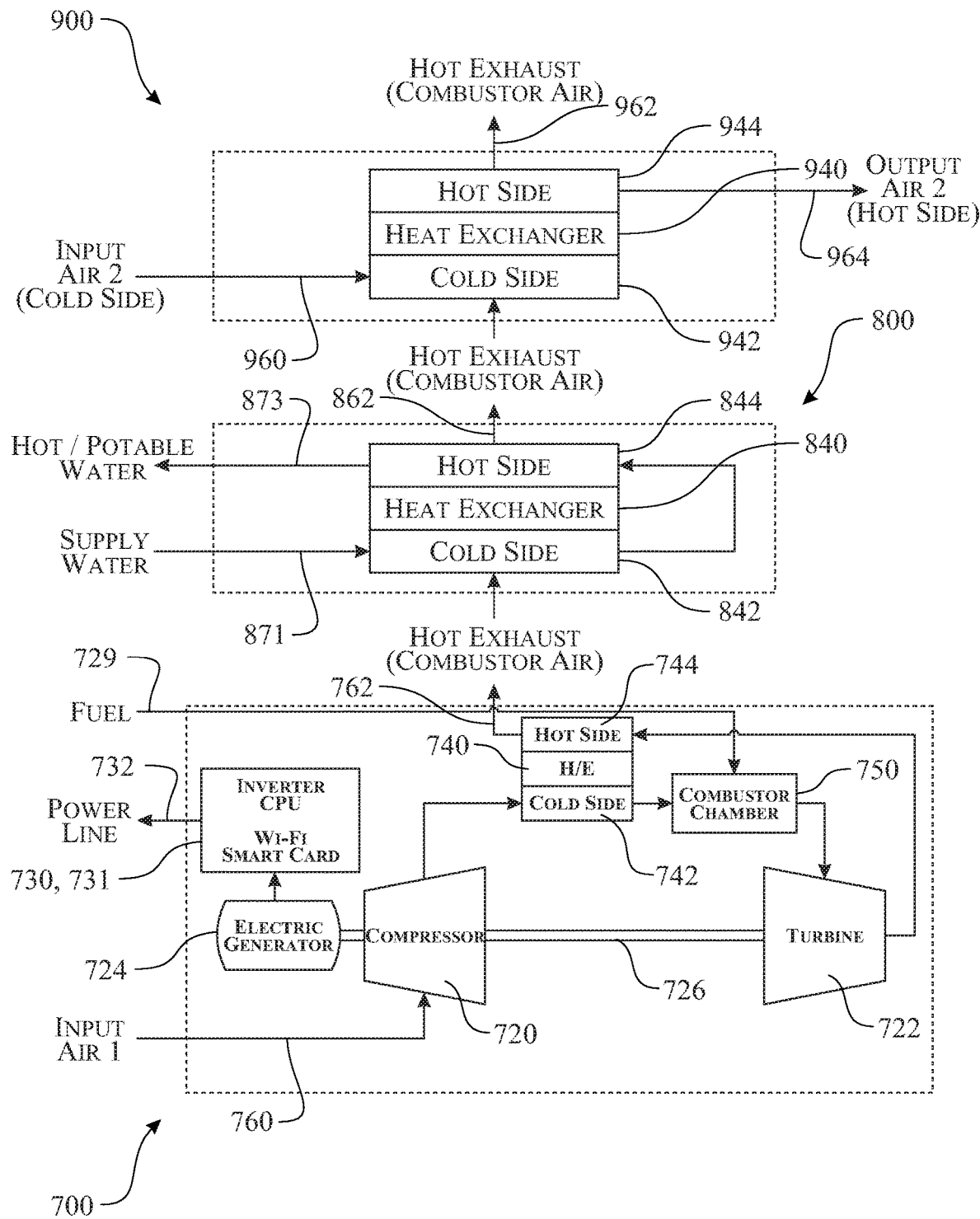
FIG. 27 presents an operational schematic diagram, representative of the micro/nano-turbine energy generating system in combination with the water processing system and the air heating system in accordance with the arrangement of the energy generating system originally introduced in FIG. 23.

Operational components of the microscale energy cogeneration system 700 are illustrated in an isometric schematic illustration presented in FIG. 24 and a schematic diagram illustrated in FIG. 27. Operational components include a compressor 720, a micro/nano-turbine 722, an micro electric generator 724, a heat exchanger 740, and a combustor chamber 750. An inverter central processing unit (CPU) 730 and a Wired or wireless communication circuit 731 can be included to providing electrical management of generated power and, separately of interest, a communication link to provide information to a support system, service personal, a third party, or any other desired recipient.

The micro/nano-turbine 722 drives the system. The micro/nano-turbine 722 is rotationally coupled to a compressor 720 by a turbine shaft 726. The micro electric generator 724 is rotationally coupled to either the compressor 720 and/or the micro/nano-turbine 722 by a generator shaft 727. The turbine shaft 726 and the generator shaft 727 can be a continuous shaft, separate shafts, separate shaft segments coupled by a universal joint, and the like. Gears, transmission or any other rotational conversion element (not shown) can be integrated between any two or each of the three rotating elements 720, 722, 724 to modify a rotational speed, a torque, or to suit any other design element. Support of each of these elements would be provided in accordance with any known suitable operational component support design, including brackets, bearings, bushings, mechanical fasteners, adjustable features, and the like. Specific details of compressor 720, the micro/nano-turbine 722, and the micro electric generator 724 are not provided as they do not form part of the present invention. Any suitable compressor 720, any suitable micro/nano-turbine 722, and any suitable micro electric generator 724 that are available in the market can be used in the microscale energy cogeneration system 700.

A fuel supply 729 is provided to a combustor chamber 750, where the fuel is used to generate a rotational force causing a rotational motion of the micro/nano-turbine 722. The fuel 729 can be natural gas, diesel, gasoline, liquefied petroleum gas (LPG), and the like. The rotational motion of the micro/nano-turbine 722 drives a rotation of the compressor 720. The rotational motion of the micro/nano-turbine 722 also drives a rotation of the micro electric generator 724. Compressed air provided by the compressor 720 is then exposed to a heat exchanger (cold side) 742 of a heat exchanger 740, cooling the compressed air. The chilled compressed air is transferred to the combustor chamber 750. The use of chilled compressed air in combination with the fuel 729 improves the efficiency of the combustion process used to drive the micro/nano-turbine 722. The heated air discharged from the turbine is directed towards a heat exchanger (hot side) 744 of the heat exchanger 740.

The arrangement between the compressor 720, the micro/nano-turbine 722 and the micro electric generator 724 can be modified to suit the engineer and/or designer of the system.

The micro electric generator 724 as usual may include a rotating rotor and a stator. The rotor may be a permanent magnet positioned rotatably within the stator and rotates relative to the stator during the operation of micro/nano-turbine 722. Mechanical energy can be transferred to the generator shaft 727 from micro/nano-turbine 722 to the rotor, so that the generator shaft 727, the micro/nano-turbine 722 and the rotor of the micro electric generator 724 rotate in unison at speeds, for example, of up to 700,000 RPM's or more.

The rotational motion of the micro electric generator 724 generates an electric power output. The electric power output can be forwarded directly as a generated electrical power output 732 to a power line or passed through a generated electrical power output 732 before being output as the generated electrical power output 732. The inverted power can be used to operate a wired or wireless communication circuit 731. The wired or wireless communication circuit 731 provides a communication link, which enables conveyance of data respective to the microscale energy cogeneration system 700 to a third party, a monitoring computer, a service person, and the like. The data can include operating data, such as electrical power output 732, consumption of fuel 729, rotational speed of the micro/nano-turbine 722, the compressor 720, and/or the micro electric generator 724, operating temperature, any vibrations, lubrication status, and the like. The wired communication circuit 731 can operated in accordance with any suitable wired communication protocol, including Universal Serial Bus (USB), serial communication, parallel communication, Ethernet, and the like. The wireless communication circuit 731 can operated in accordance with any suitable wireless communication protocol, including Wi-Fi, Bluetooth, Zigbee, any radio frequency (RF), Near Field Communications (NFC), radio frequency identification (RFID), and the like.

The generated electrical power output 732 can be used immediately, stored for later use, or delivered to a network for distribution within the network, such as an electric company grid. Storage of the generated electrical power output 732 can be provided by batteries or any other suitable storage medium.

Air is provided into the microscale energy cogeneration system 700 by an input air to nano-turbine 760. The input air to nano-turbine 760 enters through the ventilation grill 705 of the frontal end cap 704. The hot output gases from the micro/nano-turbine 722 are fed into the heat exchanger (cold side) 742 of the heat exchanger 740 and subsequently forwarded to the heated air exhaust port 707 to exhaust the hot exhaust air (combustor) 762. The hot output gases from the micro/nano-turbine 722 are directed towards the heat exchanger (hot side) 744 of the heat exchanger 740 and are used to draw heat from the heat exchanger (cold side) 742 of the heat exchanger 740.

A first optional element of the system is a water processing system 800. Operational components of the water processing system 800 are illustrated in an isometric schematic illustration presented in FIG. 25 and a schematic diagram illustrated in FIG. 27. The water processing system 800 and the microscale energy cogeneration system 700 include a number of like elements. Like elements are numbered in a similar manner, where like elements of the water processing system 800 and the microscale energy cogeneration system 700 are numbered the same, except the reference characters of the elements of the water processing system 800 are preceded by the numeral "2". The housing of the water processing system 800 is similar to the housing of the microscale energy cogeneration system 700. The hot exhaust air (combustor) 762 is transferred from the microscale energy cogeneration system 700 to the water processing system 800 by the exhaust transfer element 708. The hot exhaust air (combustor) 762 is directed towards a heat exchanger (hot side) 842 of a heat exchanger 840 located within an interior of the energy generating system housing 802. Water 871 is supplied to the heat exchanger 840 by a hot water heater or boiler 870. The hot water heater or boiler 870 transitions into a condenser 872. The condenser 872 passes through a heat exchanger (cold side) 844 of the heat exchanger 840. As the water 871 passes through the hot water heater or boiler 870, and continues into the condenser 872, the output from the water processing system 800 is potable water 873. Since only a portion of the heat from the hot exhaust air (combustor) 762 is absorbed by the heat exchanger 840, the residual heated gases are passed along as a hot exhaust air 862 through an exhaust transfer element 808 of the water processing system 800.

The water processing system 800 can be modified to provide heated air to a water system. For example, the water system may provide hot air to an internal or external hot water heater or water boiler 870. The water can then be forwarded to a separate condenser to produce potable water 873. The water heater would be connected to an exhaust heat conduit from heat exchanger, similar to the heating duct 976 of the heating system 970 (Shown in FIG. 23).

Figure 26:
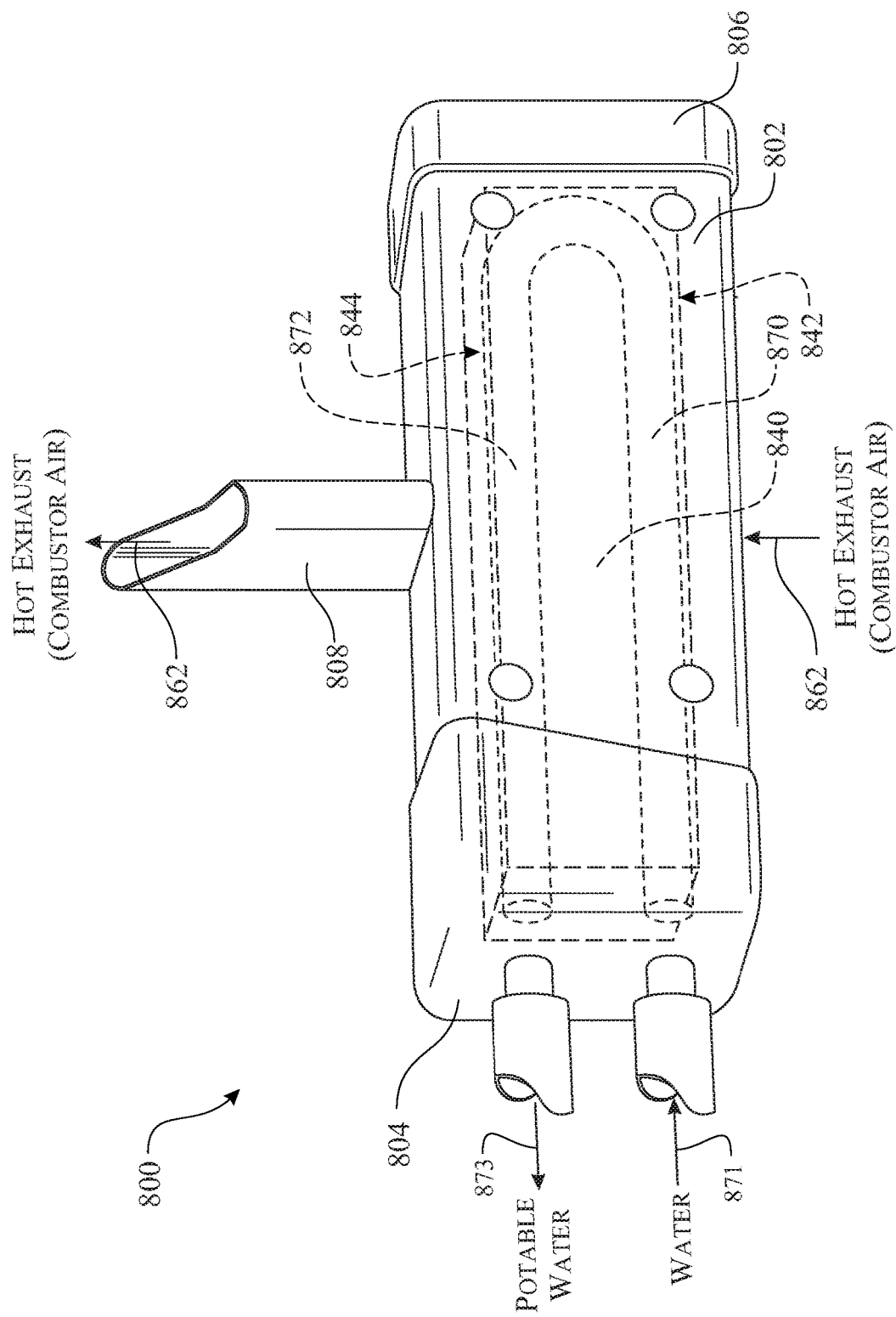
FIG. 26 presents an isometric view of the air heating system, originally introduced in FIG. 23, the illustration introducing functional components of the air heating system.

The microscale energy cogeneration system 700 may be additionally used to support an air heating system. Another optional element of the system is an air heating system 900. Operational components of the air heating system 900 being illustrated in an isometric schematic illustration presented in FIG. 26 and a schematic diagram illustrated in FIG. 27. The air heating system 900 and the microscale energy cogeneration system 700 include a number of like elements. Like elements are numbered in a similar manner, where like elements of the air heating system 900 and the microscale energy cogeneration system 700 are numbered the same, except the reference characters of the elements of the air heating system 900 are preceded by the numeral "3". The housing of the air heating system 900 is similar to the housing of the air heating system 900. The hot exhaust air (combustor) 762 or the hot exhaust air 862 is transferred from the microscale energy cogeneration system 700 or the water processing system 800 to the air heating system 900 by the respective exhaust transfer element 708 or the exhaust transfer element 808. The hot exhaust air (combustor) 762, 862 is directed towards a heat exchanger (hot side) 942 of a heat exchanger 940 located within an interior of the energy generating system housing 902. Input air 960 is directed towards the heat exchanger 940. As the input air to the heat exchanger 960 passes across the heat exchanger 940, the temperature of the air increases. The air is discharged as an output air (hot side) 964. The input air to the heat exchanger 960, converting into the output air (hot side) 964 can be contained within a ducting (not shown) that passes through the heat exchanger 940. Conversely, the hot exhaust air (combustor) 762, 862 passes through and/or around the heat exchanger, with the residually heated air being discharged as a hot exhaust air 962 through the exhaust transfer element 808.

Figure 23:
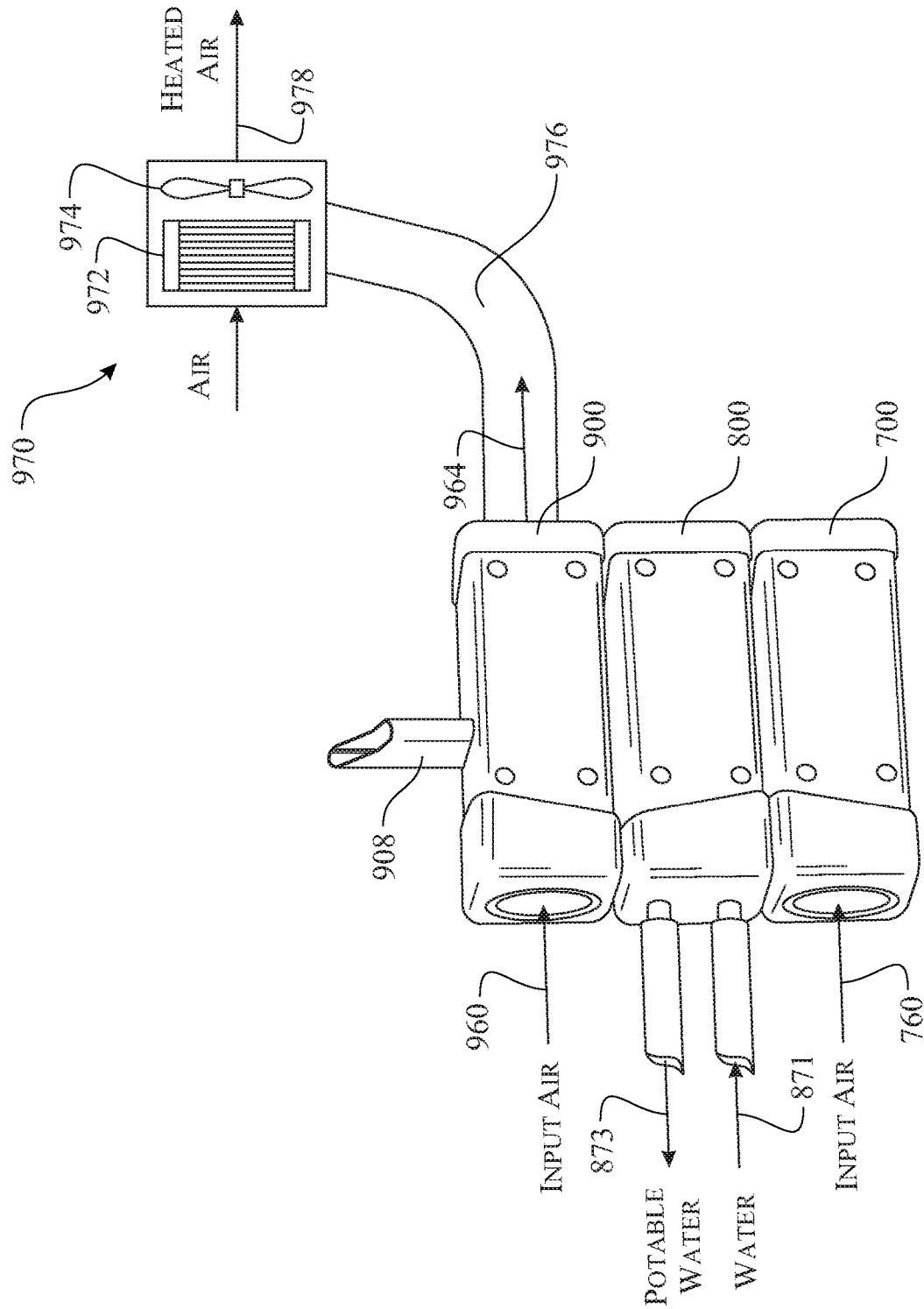
FIG. 23 presents an isometric view of the micro/nano-turbine driven energy generating system in combination with a water processing system and an air heating system installed within a household application through which tap water and/or air is heated using exhaust gases of the micro/nano-turbine.

A heating system 970 may use exhaust heat to provide exhaust heat and/or output heat 978 for a location or building. The heating system 970 can be connected to a discharge port of the microscale energy cogeneration system 700 to receive the output air (hot side) 764 (configuration understood by description, but not shown) or a discharge port of the air heating system 900 to receive the output air (hot side) 964 by a heating duct 976, as illustrated in FIG. 23. The heating system 970 would receive high temperature exhaust air 762, 862 from the exhaust passage downstream from the micro/nano-turbine 722 or the water processing system 800 for heat transfer. In this manner, the microscale energy cogeneration system may assist with heating requirements for a location or building.

As shown in the exemplary embodiment, the output air (hot side) 964 flows towards a heat exchanger 972. Air is drawn into the heating system 970 by a fan setup 974 and passes through the heat exchanger 972. As the air passes through the heat exchanger 972, the air is warmed. The air can also combine with the output air (hot side) 964 to further increase the overall temperature of the air being discharged as an exhaust and/or output heat 978.

Figure 28:
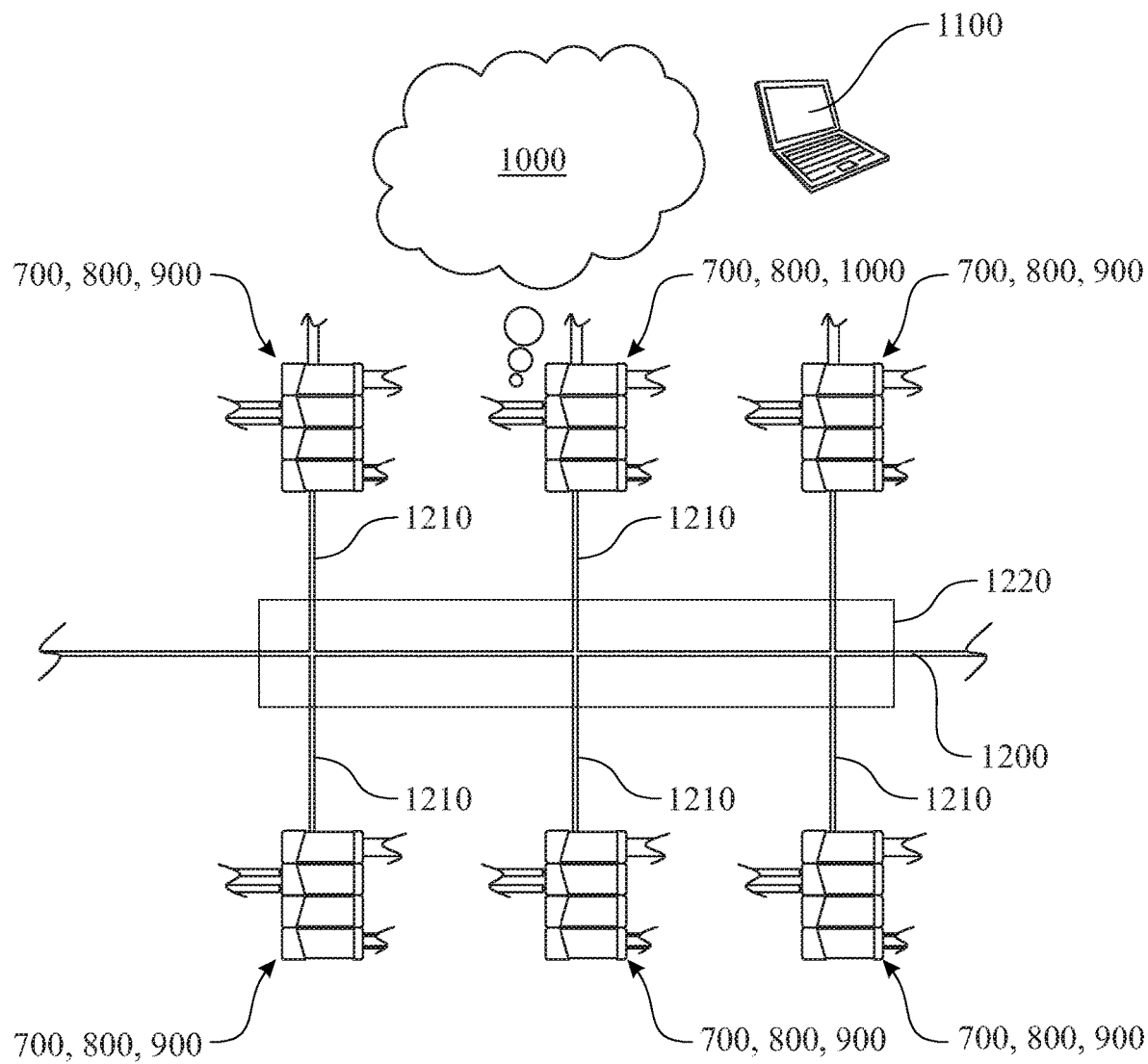
FIG. 28 presents a schematic view of an energy generating system connected to the power grid with which the different energy generating systems may interact with the grid by taking energy if the particular application requires so, or may provide the grid with energy if the application is not requiring energy.

FIG. 28 is a schematic diagram of the microscale energy cogeneration system 700 connected to the electrical power grid 1200.

As shown in FIG. 28, the present microscale energy cogeneration system 700 may be attached by a power line 1210 to a switchboard controller and meter 7220. The switchboard controller and meter assists in the distribution of electric power to a building or location. Generally, the instant load from a microscale energy cogeneration system 700 follows the controller of a standard home electrical box. The present nano-turbine microscale energy cogeneration system 700 is easily compatible with all standard configurations for electrical box controllers.

The system may also be controlled using a Transmission Control Protocol/Internet Protocol (TCP/IP) network 1000 through a control center 1 700. Accordingly, the microscale energy cogeneration system 700 may take energy from the grid 1200 if necessary, or provide energy to the grid 1200 if the consumption of the local system is lower than the energy produced by it. The main feature of the present system comprises its ability to scale up by connecting several units for the same user, or several units may be interconnected as a grid for balancing out the energy demand of a specific set of users.

As generally noted above, the nano-turbine microscale energy cogeneration system 700 may be integrated into a house, to supplement or substitute an existing energy system. It should be noted that the energy system can be integrated into all types and sizes of buildings and structures as well as locations requiring energy. As would be understood, the system 700 may either include fewer components and systems or may include additional components or systems.

The energy system 700 can integrate any one or more of the heating, cooling, water heating and electrical systems into a mobile and portable unit. As would be understood from the above description, the energy system 700 is powered by different types of fuel. Using nano/microscale energy cogeneration system 700, energy system can fulfill the electrical, heating, cooling and/or hot water, and/or potable water needs for a location, building or structure. It may also be used for hybridizing cars, boating power, outdoor applications, and home use applications.

The home energy system 700 can provide at least part of, if not all the electrical needs of a single location, structure or building, such as house. The energy system 700 is integrated with the grid 1200 at a junction box or switchboard controller and meter to distribute electrical load in a location. Either the energy system or grid 1200 can be the primary system with the other system serving as an auxiliary or support system. When the energy system produces more electricity than required, the electrical load can be stored in a storage device, such as some type of battery, or returned back to the power grid 1200. In systems that are not connected to the electric company, like a system setup located in a remote location, surplus electrical load can be delivered to a specific location over a local grid 1200. Alternatively, if surplus electrical load is returned to the grid 1200, a house with surplus electricity can designate a specific house or location to receive the electrical load through the electric company's grid. This sharing of electrical loads allows two locations to exchange electrical loads at a cost lower than purchasing from the electric company.

Figure 29:
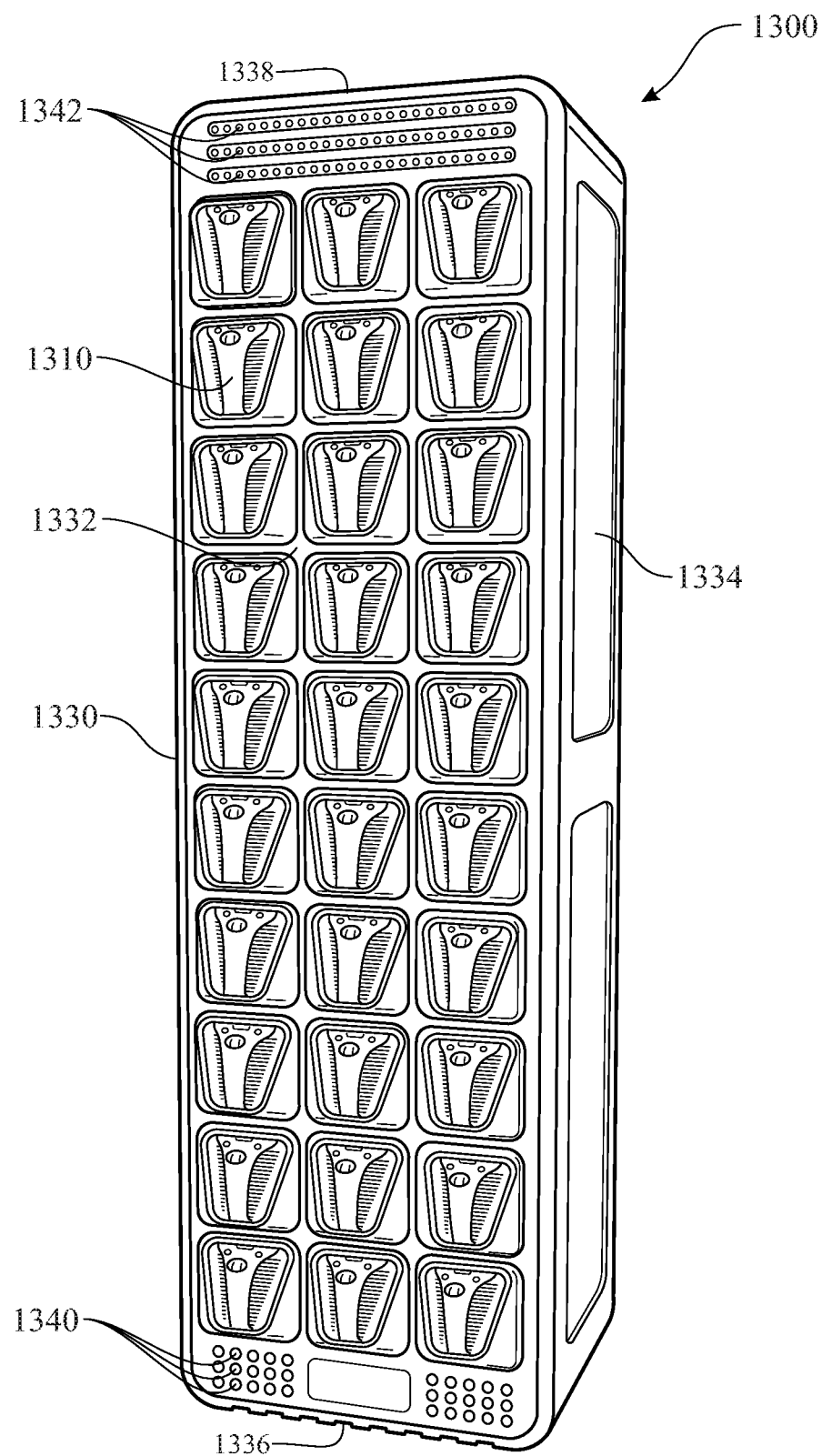
FIG. 29 presents an isometric front view of an exemplary power bank, the exemplary power bank comprising a series of micro turbine assembly receptacles.
Figure 30:
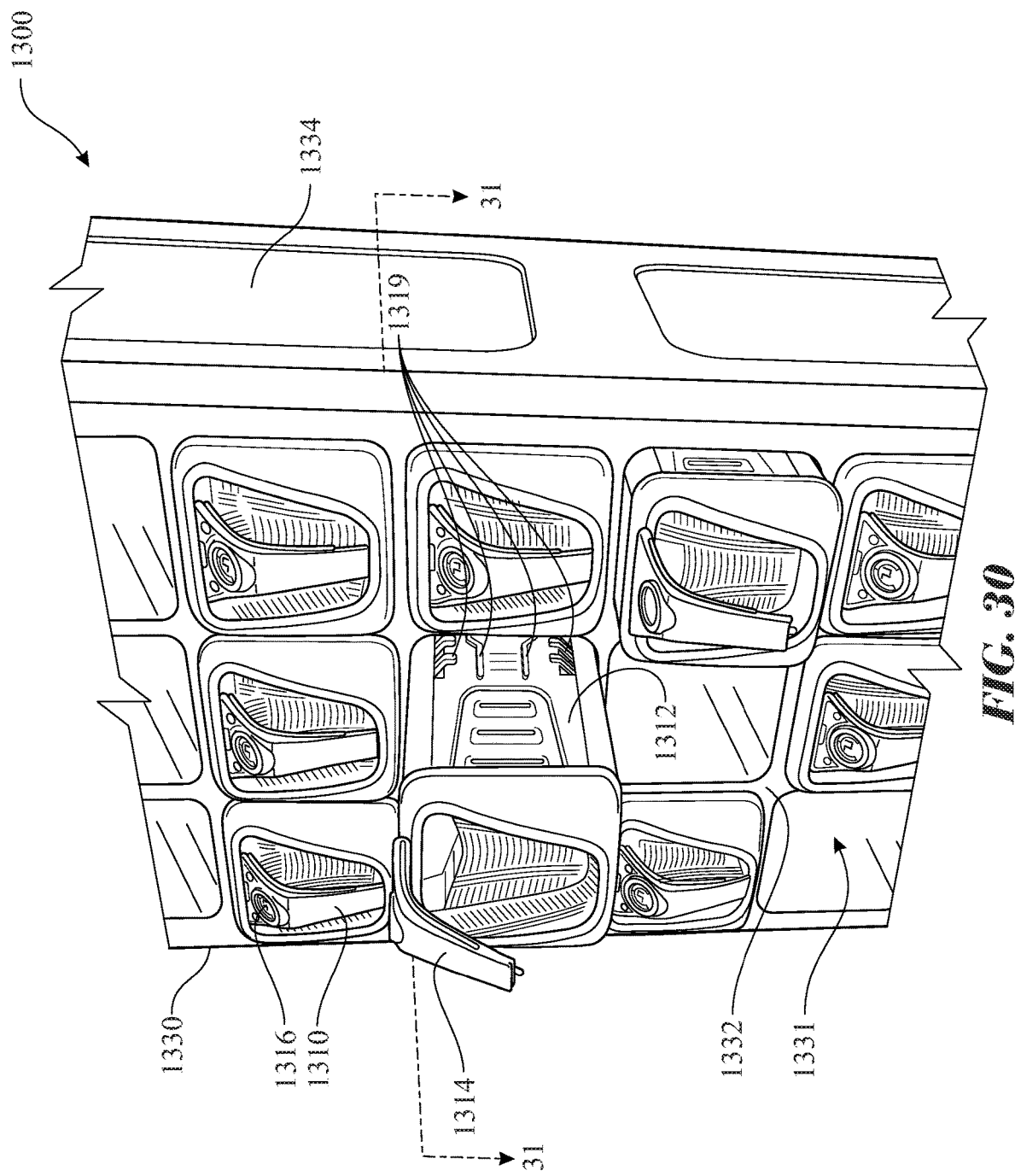
FIG. 30 presents an enlarged isometric front view of the exemplary power bank originally introduced in FIG. 29, the illustration demonstrating an insertion or removal of the micro turbine assembly from one micro turbine assembly receptacle of the series of micro turbine assembly receptacles.

The present system has several applications, including but not limited to:
(a) Hybridization of electric vehicles
(b) Domestic production of power and heat
(c) Smart power grids
(d) Boating power and heat supply
(e) Outdoor applications Examples of the several applications are presented in FIGS. 29 through 33. The output of the micro turbine assembly 100 is scalable. To accommodate the scaleability, multiple micro turbine assemblies 100, identified in the configuration as a micro turbine assembly 1310, are installed into an electric power generating bank 1300, as shown in the illustrations presented in FIGS. 29 through 31. Each micro turbine assembly 1310 includes a 1312, where the micro turbine assembly housing 1312 encases a micro turbine assembly 100. A handle 1314 can be integrated into the micro turbine assembly housing 1312. The handle 1314 can include features to secure the micro turbine assembly 1310 within a micro turbine assembly receptacle 1331 and disengage the micro turbine assembly 1310 from the micro turbine assembly receptacle 1331. In the exemplary embodiment, the handle 1314 secures the micro turbine assembly 1310 within the micro turbine assembly receptacle 1331 when the handle 1314 is oriented in a down position and the handle 1314 releases the micro turbine assembly 1310 from the micro turbine assembly receptacle 1331 when the handle 1314 is oriented in a raised position. The micro turbine assembly 1310 can include an information display 1316 to convey an operating status to a user or operator. The micro turbine assembly 1310 can include insertion registration features 1319 to ensure connecting elements 1320, 1322, 1324 properly align with and connect to the respective mating, connecting elements 1360, 1362, 1364 of the electric power generating bank 1300.

The electric power generating bank 1300 can be provided in a form of an electric power generating bank housing 1330. The electric power generating bank housing 1330 includes an electric power generating bank housing front panel 1332; a pair of electric power generating bank housing side panel 1334, each electric power generating bank housing side panel 1334 extending rearward from a respective left or right edge of the electric power generating bank housing front panel 1332; an electric power generating bank housing bottom panel 1336 extending rearward from a lower edge of the electric power generating bank housing front panel 1332, extending along each lower edge of each of the left electric power generating bank housing side panel 1334 and the right electric power generating bank housing side panel 1334, an electric power generating bank housing top panel 1338 extending rearward from an upper edge of the electric power generating bank housing front panel 1332, extending along each upper edge of each of the left electric power generating bank housing side panel 1334 and the right electric power generating bank housing side panel 1334, and an electric power generating bank housing rear panel 1339 extending along rear edges of each of the left electric power generating bank housing side panel 1334, the right electric power generating bank housing side panel 1334, the electric power generating bank housing bottom panel 1336 and the electric power generating bank housing top panel 1338. Collectively, the panels 1332, 1334, 1336, 1338, 1339 form an enclosure.

The electric power generating bank 1300 includes a plurality of micro turbine assembly receptacles 1331. The electric power generating bank housing 1330 is preferably designed having each of the micro turbine assembly receptacles 1331 accessible from the electric power generating bank housing front panel 1332. More specifically, each micro turbine assembly receptacle 1331 is arranged where the micro turbine assembly 1310 would be insertable and removable through the electric power generating bank housing front panel 1332. The plurality of micro turbine assembly receptacles 1331 are preferably arranged having a series of micro turbine assembly receptacles 1331 in a row, having a series of micro turbine assembly receptacles 1331 in a column, having series of micro turbine assembly receptacles 1331 in multiple rows, having series of micro turbine assembly receptacles 1331 in multiple columns, or having series of micro turbine assembly receptacles 1331 in multiple rows, the arrangement of rows also forming a series of columns of micro turbine assembly receptacles 1331.

Air vents 1340, 1342 can be included in the electric power generating bank housing 1330 to aid in providing air to and removing exhaust from each micro turbine assembly 1310. In the exemplary embodiment, the 1multilevel inverter 340 provides air to each micro turbine assembly 1310 and the exhaust vent 1342 removes exhaust air from each micro turbine assembly 1310.

Figure 31:
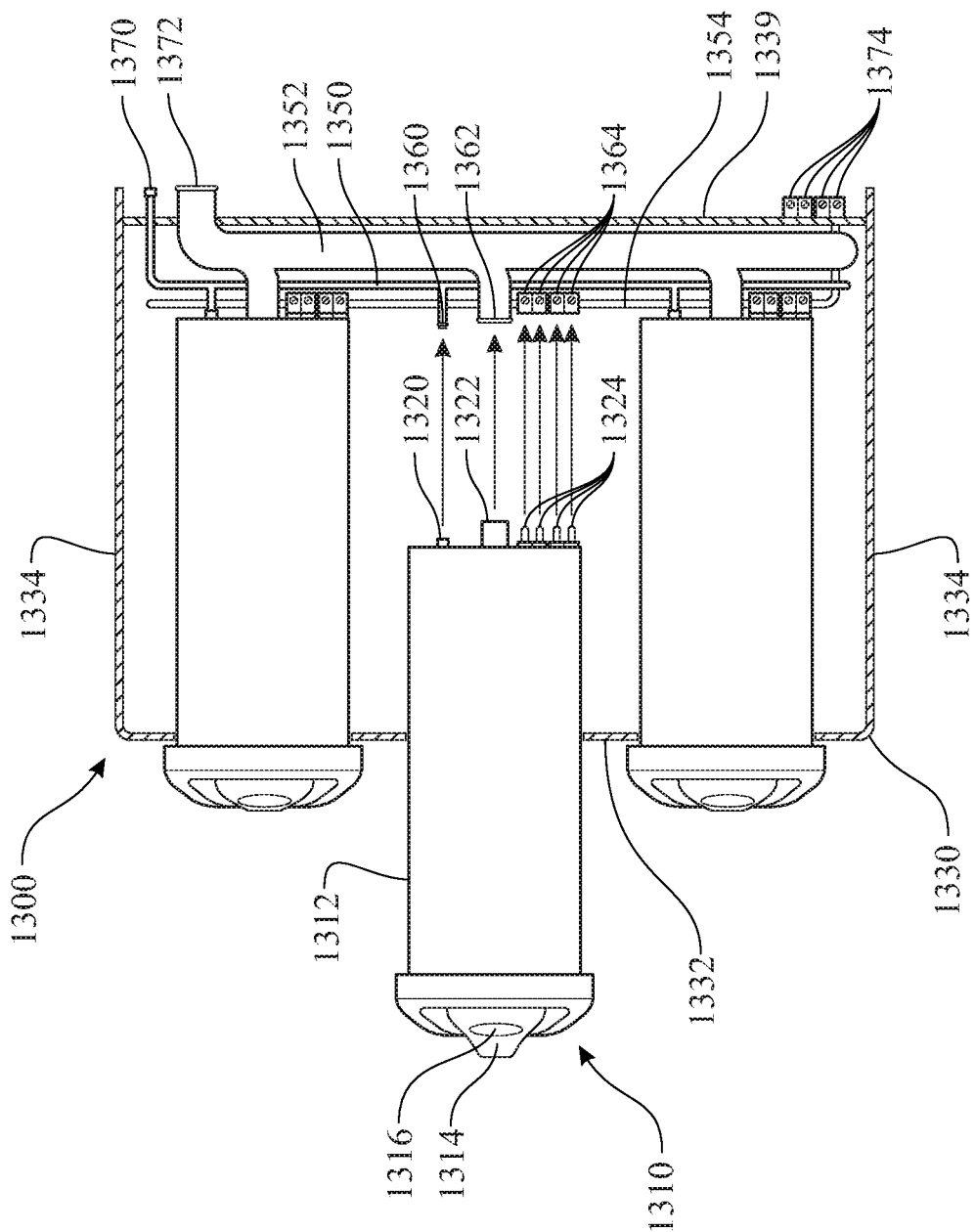
FIG. 31 presents a top section view of the exemplary power bank originally introduced in FIG. 29, the section taken along section line 31-31 of FIG. 30, the illustration demonstrating an insertion or removal of the micro turbine assembly from one micro turbine assembly receptacle of the series of micro turbine assembly receptacles and the connectivity therebetween.

The operating arrangement of the electric power generating bank 1300 is presented in the section view illustrated in FIG. 31. As mentioned above, connecting elements 1320, 1322, 1324 are configured to engage with the respective mating, connecting elements 1360, 1362, 1364 of the electric power generating bank 1300. The electric power generating bank 1300 includes a fuel supply manifold 1350, an exhaust collection manifold 1352, and an electrical power collection harness 1354. The fuel supply manifold 1350 includes a fuel source connector 1370 at a sourcing end and a series of fuel delivery port 1360; each fuel delivery port 1360 being located to engage and couple with a respective fuel inlet port 1320 of the micro turbine assembly 1310 to provide fuel to each operating micro turbine assemblies 1310. The exhaust collection manifold 1352 includes an exhaust discharge connector 1372 at a delivery end and a series of exhaust receiving port 1362; each exhaust receiving port 1362 being located to engage and couple with a respective exhaust discharge port 1322 of the micro turbine assembly 1310 to collect exhaust from the operating micro turbine assemblies 1310. The electrical power collection harness 1354 includes a collection of system electrical output terminals 1374 at a delivery end and a series of electrical power receiving terminals 1364; where a collection of electrical power receiving terminals 1364 are located to engage and couple with a respective collection of electrical output terminals 1324 of the micro turbine assembly 1310 to collect generated electric power from the operating micro turbine assemblies 1310. It is desired that each of the connections are deigned to be engaged during a process of inserting the micro turbine assembly 1310 into the micro turbine assembly receptacle 1331 and disengaged during a process of removing the micro turbine assembly 1310 from the micro turbine assembly receptacle 1331.

Figure 32:
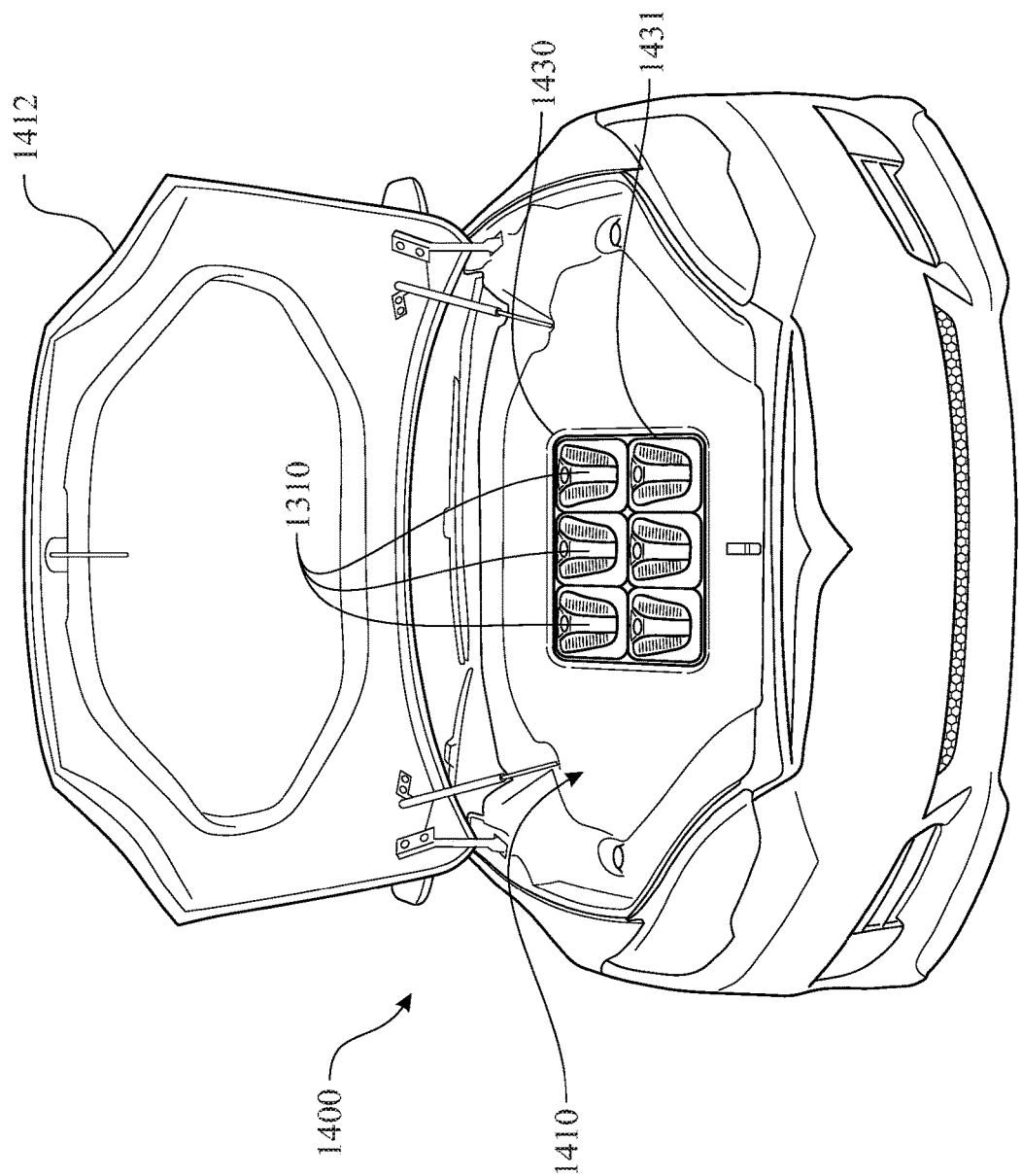
FIG. 32 presents a front isometric view of the exemplary land vehicle adapted to receive at least one micro turbine assembly, wherein the at least one micro turbine assembly is arranged to provide electrical power to the land vehicle.
Figure 33:
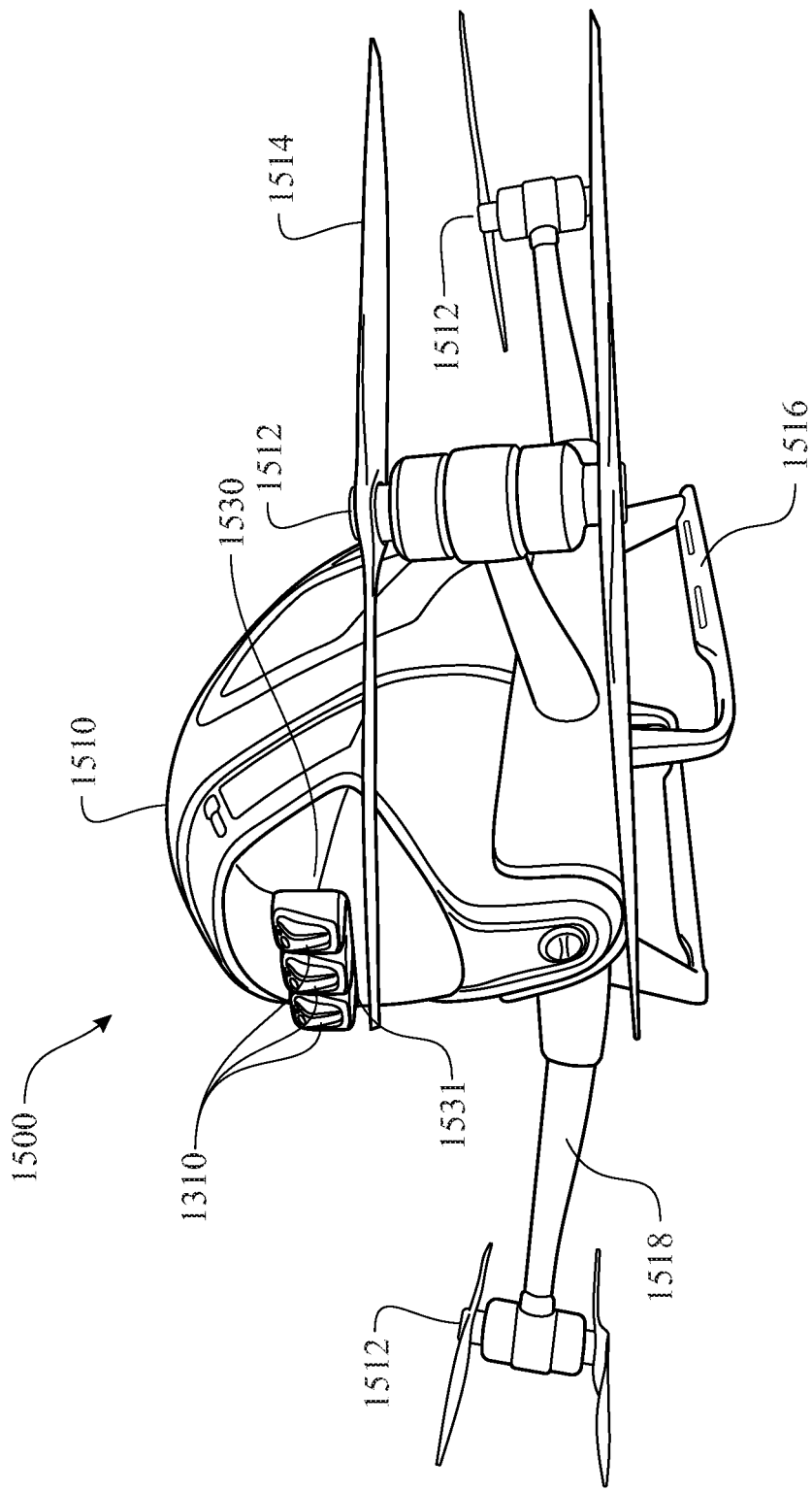
FIG. 33 presents a rear, side isometric view of the exemplary air vehicle adapted to receive at least one micro turbine assembly, wherein the at least one micro turbine assembly is arranged to provide electrical power to the air vehicle.

The electric power generating bank housing 1330 and the respective operational support components fuel supply manifold 1350, the exhaust collection manifold 1352, and the electrical power collection harness 1354 can be adapted to support the implementation, as presented in the exemplary implementations illustrated in FIGS. 32 and 33.

An exemplary electrically powered motor vehicle 1400 is illustrated in FIG. 32. The exemplary electrically powered motor vehicle 1400 includes an electrical power source array housing 1430 integrated into an electrical power source bay 1410. The electrical power source bay 1410 is protected by and made accessible by a 1ceramic turbine and compressor shaft bore 412. The exemplary electrical power source array housing 1430 includes six (6) micro turbine assembly receptacles 1431 arranged in both rows and columns, each micro turbine assembly receptacle 1431 containing a micro turbine assembly 1310. The fuel supply manifold 1350 would be connected to a fuel tank. The exhaust collection manifold 1352 would be integrated into an exhaust system of the electrically powered motor vehicle 1400. The electrical power collection harness 1354 would be integrated into an electrical system of the electrically powered motor vehicle 1400. The electrically powered motor vehicle 1400 is only exemplary, where the electrically powered motor vehicle 1400 is representative of any electrically powered or hybrid powered vehicle. Examples can include: an automobile, a race car, a truck, a motorcycle, a bicycle, a golf cart, a go-cart, a tractor, a farming vehicle, a construction vehicle, a front loader, a military vehicle, a crane, and the like. The same concept can be applied to water vessels, including pleasure boats, race boats, motor assisted sail boats, yachts, cargo vessels, military vessels, underwater vessels, cruise ships, tender vessels, and the like.

An exemplary electrically powered flying machine 1500 is illustrated in FIG. 33. The exemplary electrically powered flying machine 1500 is a vertical take-off and landing (VTOL) aircraft is one that can hover, take off, and land vertically designed as an air taxi. The electrically powered flying machine 1500 is only exemplary, where the electrically powered flying machine 1500 is representative of any electrically powered or hybrid powered flying vehicle. Although the exemplary electrically powered flying machine 1500 is illustrated in a form of a vertical take-off and landing (VTOL) aircraft, it is understood that the electrically powered flying machine 1500 can be any electrically powered or hybrid powered aircraft, including airplanes, drones, helicopters, and the like.

The electrically powered flying machine 1500 includes a flying machine fuselage 1510. Lift and propulsion are provided via a flying machine lifting blade 1514 powered by a flying machine propulsion motor assembly 1512. Each flying machine propulsion motor assembly support arm 1518 is supported by a flying machine propulsion motor assembly support arm 1518 cantilevered from the flying machine fuselage 1510. A pair of flying machine landing gear 1516 extends downward from a bottom of the flying machine fuselage 1510. The exemplary flying machine landing gear 1516 are in a form of skids. It is understood that the flying machine landing gear 1516 can be wheels, floats, or any other suitable form of landing gear in either a fixed or retractable configuration.

The exemplary electrically powered flying machine 1500 includes an electrical power source array housing 1530 integrated into a flying machine fuselage 1510. The exemplary electrical power source array housing 1530 includes three (3) micro turbine assembly receptacle 1531 arranged in a single row, each micro turbine assembly receptacle 1531 containing a micro turbine assembly 1310. The fuel supply manifold 1350 would be connected to a fuel tank. The exhaust collection manifold 1352 would be integrated into an exhaust system of the electrically powered flying machine 1500. The electrical power collection harness 1354 would be integrated into an electrical system of the electrically powered flying machine 1500.

It will be understood that the embodiments shown in the drawings and described above are merely for illustrative purposes, and are not intended to limit the scope of the invention, which is defined by the claims, which follow as interpreted under the principles of patent law including the Doctrine of Equivalents.

REFERENCE ELEMENT LIST

Ref No. Description
- 100 micro turbine assembly
- 102 micro turbine engine subassembly
- 110 turbine spacer
- 112 combustion chamber
- 120 compressor shroud
- 122 compressor side case foil
- 124 hollow section
- 126 compressor air supply passageway
- 140 thrust foil bearing
- 142 first back plate thrust bearing
- 144 second backing plate thrust bearing
- 145 foil thrust bearing
- 146 thrust foil system holder
- 150 magnetic winding stator
- 152 motor stator spacer
- 154 thrust side case foil
- 160 heat sink body
- 162 heat sink body airflow passageways
- 170 ceramic shaft bearing
- 180 motor system lock
- 182 micro turbine engine subassembly seal
- 202 micro turbine air sourcing housing subassembly
- 210 engine housing
- 211 engine housing interior surface
- 212 turbine air intake scroll
- 213 turbine air intake conduit interior surface
- 214 compressor exhaust scroll
- 215 compressor exhaust scroll interior surface
- 218 micro turbine air sourcing housing subassembly to compressor air supply and electronics subassembly mounting interface
- 220 radial turbine shroud
- 221 radial turbine shroud interior surface
- 239 turbine scroll and compressor scroll axial gap
- 280 air supply for compressor
- 288 compressor exhaust
- 290 air supply for turbine
- 298 turbine exhaust
- 302 compressor air supply and electronics subassembly
- 310 compressor air supply housing
- 311 compressor air supply housing interior surface
- 314 compressor air supply housing assembly interface member
- 319 compressor air supply housing assembly airflow passageway
- 320 digital signal processor
- 330 planar transformer
- 332 transformers
- 334 positive power output conductor
- 336 ground power output conductor
- 337 transformer capacitors
- 338 transformer capacitors
- 340 multilevel inverter
- 350 controller assembly
- 400 integrated ceramic compressor and turbine assembly
- 410 ceramic turbine and compressor shaft
- 412 ceramic turbine and compressor shaft bore
- 418 ceramic turbine and compressor shaft conical shaped end
- 419 engine shaft rotational axis
- 420 ceramic turbine
- 421 ceramic turbine base
- 422 ceramic turbine blade
- 424 ceramic turbine blade assembly gap
- 426 turbine blade assembly internal ray port
- 427 turbine blade assembly cylindrical bore
- 428 turbine blade assembly conical bore
- 430 metallic compressor
- 431 metallic compressor base
- 432 metallic compressor larger blade
- 433 metallic compressor smaller blade
- 434 Metallic compressor blade gap
- 437 metallic compressor blade cylindrical bore
- 439 turbine and compressor blade assemblies axial gap
- 440 spacer thrust bearing ceramic integrated shaft
- 442 ceramic spacer thrust bearing first axial facing surface
- 444 ceramic spacer thrust bearing second axial facing surface
- 450 magnetic rotor
- 452 rotor turbine shaft
- 460 ceramic turbine adjoining rod
- 462 ceramic turbine shaft assembly end cap
- 464 ceramic turbine and compressor shaft assembly locking element
- 500 metallic turbine and compressor shaft assembly
- 510 metallic turbine and compressor shaft
- 519 shaft rotational axis
- 520 metallic turbine blade assembly
- 522 metallic turbine blade
- 524 metallic turbine blade assembly flange
- 527 metallic turbine blade assembly cylindrical bore
- 530 metallic compressor blade assembly
- 532 metallic compressor blade
- 534 metallic compressor blade assembly gap
- 539 turbine and compressor blade assemblies axial gap
- 540 metallic spacer thrust bearing metallic integrated shaft
- 542 metallic spacer thrust bearing first axial facing surface
- 544 metallic spacer thrust bearing second axial facing surface
- 550 magnetic rotor
- 600 electrical power generation schematic
- 610 generator
- 612 primary rectifier
- 614 primary filter capacitor
- 616 power factor correction (PFC)
- 618 full bridge
- 620 transformer
- 622 secondary rectifier
- 624 secondary filter capacitor
- 626 output full bridge
- 628 sine wave power output
- 700 microscale energy cogeneration system
- 702 energy generating system housing
- 703 component mounting hardware
- 704 frontal end cap
- 705 ventilation grill
- 706 rear end cap
- 707 heated air exhaust port
- 708 exhaust transfer element
- 709 energy generating system foot
- 720 compressor
- 722 micro/nano-turbine
- 724 micro electric generator
- 726 turbine shaft
- 727 generator shaft 729 fuel supply
730 inverter central processing unit (CPU)
731 wired or wireless communication circuit
732 generated electrical power output
740 heat exchanger
742 heat exchanger (cold side)
744 heat exchanger (hot side)
750 combustor chamber
760 input air to nano-turbine
762 hot exhaust air (combustor)
764 output air (hot side)
770 handle
800 water processing system
802 energy generating system housing
803 component mounting hardware
804 frontal end cap
805 ventilation grill
806 rear end cap
807 heated air exhaust port
808 exhaust transfer element
809 energy generating system foot
840 heat exchanger
842 heat exchanger (hot side)
844 heat exchanger (cold side)
860 input air to nano-turbine
862 hot exhaust air
864 output air (hot side)
870 hot water heater or boiler
871 water
872 condenser
873 potable water
900 air heating system
902 energy generating system housing
903 component mounting hardware
904 frontal end cap
905 ventilation grill
906 rear end cap
907 heated air exhaust port
908 exhaust transfer element
909 energy generating system foot
940 heat exchanger
942 heat exchanger (hot side)
944 heat exchanger (cold side)
960 input air to the heat exchanger
962 hot exhaust air
964 output air (hot side)
970 heating system
972 heat exchanger
974 fan setup
976 heating duct
978 exhaust and/or output heat
1000 Transmission Control Protocol/Internet Protocol (TCP/IP) network
1100 control center
1200 power grid
1210 line
1220 switchboard controller and meter
1300 electric power generating bank
1310 micro turbine assembly
1312 micro turbine assembly housing
1314 handle
1316 information display
1319 insertion registration features
1320 fuel inlet port
1322 exhaust discharge port
1324 electrical output terminals
1330 electric power generating bank housing
1331 micro turbine assembly receptacle
1332 electric power generating bank housing front panel
1334 electric power generating bank housing side panel
1336 electric power generating bank housing bottom panel
1338 electric power generating bank housing top panel
1339 electric power generating bank housing rear panel
1340 air intake vent
1342 exhaust vent
1350 fuel supply manifold
1352 exhaust collection manifold
1354 electrical power collection harness
1360 fuel delivery port
1362 exhaust receiving port
1364 electrical power receiving terminals
1370 fuel source connector
1372 exhaust discharge connector
1374 system electrical output terminals
1400 electrically powered motor vehicle
1410 electrical power source bay
1412 electrical power source bay hood
1430 electrical power source array housing
1431 micro turbine assembly receptacle
1500 electrically powered flying machine
1510 flying machine fuselage
1512 flying machine propulsion motor assembly
1514 flying machine lifting blade
1516 flying machine landing gear
1518 flying machine propulsion motor assembly support arm
1530 electrical power source array housing
1531 micro turbine assembly receptacle

The invention claimed is:
1. A micro turbine assembly comprising:
a micro turbine engine subassembly, including:
  a preassembled engine shaft assembly comprising:
  elements of the preassembled engine shaft assembly onto an engine shaft, the elements being arranged from a first airflow discharge end of the engine shaft to a second, opposite end of the engine shaft in the following order: a turbine, a gap between the turbine and a compressor, a magnetic rotor and a thrust bearing,
  a pair of semi-circularly shaped turbine spacers assembled to one another circumscribing and extending radially into the gap between the turbine and the compressor,
  a compressor shroud in radial alignment with and circumscribing the compressor,
  a stator portion of an electric generator positioned in radial alignment with and circumscribing the magnetic rotor,
  a combustor, and
  a heat sink;
a micro turbine air sourcing housing subassembly, including:
  an engine housing and at least one of a turbine air intake scroll, and a compressor exhaust scroll, the engine housing having an interior surface defining an interior having an interior diameter; and
an air supply and electronics subassembly, including:
  an air supply housing,
  an air inlet at an upstream location of the air supply housing,
  a digital signal processor assembled to the air supply housing, a planar transformer assembled to the air supply housing, and
a multilevel inverter assembled to the air supply housing;
wherein the micro turbine engine subassembly is designed as a compact subassembly having a diameter and shape that is smaller than the interior diameter defined by the interior surface of the engine housing,
wherein the micro turbine engine subassembly is slideably inserted into the interior of the engine housing,
wherein the heat sink is located radially between the engine housing and the stator portion of the electric generator,
wherein the air supply and electronics subassembly is assembled to the engine housing forming the micro turbine assembly,
wherein a compressor air supply passes through the air inlet, the heat sink for cooling the electronics and the electric generator, and flowing into an intake of the compressor in that sequential order.

2. The micro turbine assembly as recited in claim 1, wherein the digital signal processor is assembled to an exterior surface of the air supply housing,
wherein the planar transformer is assembled to the exterior surface of the air supply housing, and
wherein the multilevel inverter is assembled to the exterior surface of the air supply housing.

3. The micro turbine assembly as recited in claim 1, wherein the micro turbine air sourcing housing subassembly includes the engine housing, the turbine air intake scroll, and the compressor exhaust scroll.

4. The micro turbine assembly as recited in claim 1, wherein the turbine is fabricated of a ceramic material.

5. The micro turbine assembly as recited in claim 1, wherein the turbine is fabricated of a metallic material.

6. The micro turbine assembly as recited in claim 1, the micro turbine engine subassembly further comprising:
a first backing plate thrust bearing assembled in contact with a thrust bearing first axial facing surface of the thrust bearing, and
a second backing plate thrust bearing assembled in contact with a thrust bearing second axial facing surface of the thrust bearing.

7. The micro turbine assembly as recited in claim 1, the micro turbine engine subassembly further comprising:
a heat sink body assembled in axial registration with the magnetic winding stator.

8. The micro turbine assembly as recited in claim 1, the engine housing further comprising a radial turbine shroud located at an exhaust end of the engine housing, wherein the micro turbine engine subassembly is slideably inserted into the interior of the engine housing in an axial direction towards the exhaust end of the engine housing.

9. The micro turbine assembly as recited in claim 1, the compressor shroud comprising a pair of semi-circularly shaped compressor shroud members, the pair of semi-circularly shaped compressor shroud members assembled to one another circumscribing the compressor.

10. The micro turbine assembly as recited in claim 1, further comprising a heat sink body positioned in radial alignment with the stator, the heat sink body positioned between the stator and the interior surface of the engine housing.

11. A method of assembling a micro turbine assembly, the method comprising steps of:
creating a micro turbine engine subassembly by:
obtaining an engine shaft assembly comprising elements being arranged from a first airflow discharge end of the engine shaft to a second, opposite end of the engine shaft in the following order: a turbine, a turbine spacer in radial alignment with a gap between the turbine and a compressor, a compressor shroud in radial alignment with the compressor, a magnetic rotor, and a thrust bearing,
assembling a magnetic winding stator to the engine shaft assembly, the magnetic winding stator provided in radial alignment with the magnetic rotor, a combination of the magnetic rotor and the magnetic winding stator creating an electric generator,
assembling a heat sink to the engine shaft assembly, the heat sink provided in radial alignment with the electric generator,
providing a combustion chamber within an interior of the turbine spacer;
creating a micro turbine air sourcing housing subassembly by:
assembling a turbine air intake scroll and a compressor exhaust scroll to an exterior of an engine housing,
assembling a radial turbine shroud to the first airflow discharge end of the engine housing; and
creating an air supply and electronics subassembly by:
assembling a digital signal processor to an air supply housing, the air supply housing having an air inlet provided at an upstream location thereof,
assembling a planar transformer assembled to the air supply housing, and
assembling a multilevel inverter assembled to the air supply housing;
slideably inserting the micro turbine engine subassembly into an interior of the micro turbine air sourcing housing subassembly in a direction towards the radial turbine shroud,
assembling the air supply and electronics subassembly to the engine housing of the micro turbine air housing assembly to form the micro turbine assembly;
wherein a space between the turbine spacer and the compressor shroud directs airflow from the compressor to the compressor exhaust scroll,
wherein a space between the turbine spacer and the radial turbine shroud directs airflow from the turbine air intake scroll to the turbine,
wherein when completed the micro turbine assembly is designed to operate having an air supply pass through the air inlet, the heat sink for cooling the electronics and the electric generator, and into an air intake of the compressor, in that sequential order.

12. The method of assembling a micro turbine assembly as recited in claim 11, the step of creating the air supply and electronics subassembly is accomplished by including steps of:
assembling the digital signal processor to an exterior surface of the air supply housing, and
assembling the planar transformer to the exterior surface of the air supply housing, and
assembling the multilevel inverter to the exterior surface of the air supply housing.

13. The method of assembling the micro turbine assembly as recited in claim 11, further comprising a step of obtaining the engine shaft assembly, the method further comprising steps of:
assembling the magnetic rotor to the engine shaft;
assembling the compressor to the engine shaft; and
assembling the turbine to engine shaft.

14. The method of assembling the micro turbine assembly as recited in claim 11, the step of creating the micro turbine engine subassembly further comprising steps of:
- positioning a thrust foil bearing in axial registration with the thrust bearing,
- positioning a first backing plate thrust bearing in contact with a first axial facing surface of a spacer thrust bearing, and
- positioning a second backing plate thrust bearing in contact with second axial facing surface of the spacer thrust bearing.

15. The method of assembling the micro turbine assembly as recited in claim 13, the method further comprising a step of:
- locating the turbine spacer between the turbine and the compressor.

16. The method of assembling the micro turbine assembly as recited in claim 11, wherein the turbine is fabricated of one of at least one of a ceramic material and a metallic material.

17. The method of assembling the micro turbine assembly as recited in claim 11, further comprising a step of:
- positioning a heat sink body in axial registration with the magnetic winding stator.

18. A micro turbine assembly comprising:
a micro turbine engine subassembly, including:
- elements assembled onto an engine shaft creating a preassembled engine shaft assembly, the elements including and being arranged from a first airflow discharge end of the engine shaft to a second, opposite end of the engine shaft in the following order: a turbine, a gap between the turbine and a compressor, a magnetic rotor and a thrust bearing,
- a turbine spacer circumscribing and extending radially into the gap between the turbine and the compressor,
- a compressor shroud in radial alignment with and circumscribing the compressor, and
- a stator portion of an electric generator positioned in radial alignment with and circumscribing the magnetic rotor,
- a combustor, and
- a heat sink;

a micro turbine air sourcing housing subassembly, including:
- an engine housing and at least one of a turbine air intake scroll, and a compressor exhaust scroll, the engine housing having an interior surface defining an interior having an interior diameter; and an air supply and electronics subassembly, including:
- an air supply housing,
- an air inlet at an upstream location of the air supply housing,
- a digital signal processor assembled to the air supply housing,
- a planar transformer assembled to the air supply housing, and
- a multilevel inverter assembled to the air supply housing;

wherein the micro turbine engine subassembly is designed as a compact subassembly having a diameter and shape that is smaller than the interior diameter defined by the interior surface of the engine housing, wherein the micro turbine engine subassembly is slideably inserted into the interior of the engine housing, wherein the air supply and electronics subassembly is assembled to the engine housing forming the micro turbine assembly, wherein an air supply passes through the air inlet, the heat sink for cooling the electronics and the electric generator, and flowing into an air intake of the compressor in that sequential order.

* * * * *